US012518913B2

(12) United States Patent
Ichihashi et al.

(10) Patent No.: US 12,518,913 B2
(45) Date of Patent: Jan. 6, 2026

(54) MAGNETIC COMPONENT AND POWER CONVERSION APPARATUS INCLUDING THE SAME

(71) Applicant: DENSO CORPORATION, Kariya (JP)

(72) Inventors: Katsuhiro Ichihashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 1079 days.

(21) Appl. No.: 17/535,061

(22) Filed: Nov. 24, 2021

(65) Prior Publication Data

US 2022/0084741 A1 Mar. 17, 2022

Related U.S. Application Data

(63) Continuation of application No. PCT/JP2020/019846, filed on May 20, 2020.

(30) Foreign Application Priority Data

May 24, 2019 (JP) ................................ 2019-097771

(51) Int. Cl.
*H01F 27/28* (2006.01)
*H01F 27/30* (2006.01)

(52) U.S. Cl.
CPC ....... *H01F 27/306* (2013.01); *H01F 27/2804* (2013.01); *H01F 2027/2814* (2013.01)

(58) Field of Classification Search
CPC ............... H01F 27/306; H01F 27/2804; H01F 2027/2814; H01F 27/40; H01F 2027/2809; H01F 2027/2819; H01F 38/08
(Continued)

(56) References Cited

U.S. PATENT DOCUMENTS

2007/0257760 A1 11/2007 Saito et al.
2009/0289751 A1* 11/2009 Nagano ............... H02M 3/1584 336/221

(Continued)

FOREIGN PATENT DOCUMENTS

JP H11-307366 A 11/1999
JP 2000-277343 A 10/2000
JP 2017-060285 A 3/2017

OTHER PUBLICATIONS

Aug. 4, 2020 International Search Report issued in International Patent Application No. PCT/JP2020/019846.

*Primary Examiner* — Shawki S Ismail
*Assistant Examiner* — Kazi S Hossain
(74) *Attorney, Agent, or Firm* — Oliff PLC

(57) ABSTRACT

A magnetic component includes a plurality of coils magnetically coupled with each other; and a core forming a closed magnetic circuit. At least part of portions in inner periphery side regions of respective plurality of coils are arranged overlapping with each other in a coil axial direction. When viewed from the coil axial direction, at least one of the coils is defined as a specific coil, and a region of the specific coil from an inner periphery edge to an outer periphery edge thereof in a coil radial direction is defined as a specific coil region, and the specific coil region has a portion which is not overlapped with at least one coil in the coil axial direction other than the specific coil that constitutes the specific coil region, in a region from the inner periphery edge to the outer periphery edge thereof in the coil radial direction.

10 Claims, 41 Drawing Sheets

(58) Field of Classification Search
USPC .......................................... 336/200, 232, 192
See application file for complete search history.

(56) References Cited

U.S. PATENT DOCUMENTS

| | | | | |
|---|---|---|---|---|
| 2010/0060399 | A1 | 3/2010 | Lai | |
| 2011/0037405 | A1* | 2/2011 | Suganuma | H02M 7/003 336/200 |
| 2013/0154787 | A1* | 6/2013 | Maeda | H01F 27/326 336/220 |
| 2016/0104569 | A1* | 4/2016 | Kato | H01F 27/2804 336/200 |
| 2017/0047155 | A1* | 2/2017 | Yao | H01F 3/10 |

* cited by examiner

MAGNETIC COMPONENT AND POWER CONVERSION APPARATUS INCLUDING THE SAME

CROSS-REFERENCE TO RELATED APPLICATION

This application is the U.S. bypass application of International Application No. PCT/JP2020/19846 filed on May 20, 2020, which designated the U.S. and claims priority to Japanese Application No. 2019-097771 filed on May 24, 2019, the contents of these are incorporated herein by reference.

BACKGROUND

Technical Field

The present disclosure relates to a magnetic component and a power conversion apparatus provided therewith.

Description of the Related Art

A transformer-reactor integrated magnetic element is known as a magnetic component. The transformer-reactor integrated magnetic element is provided with a core including a center leg portion and leg portions in both ends, a first primary side transformer coil wound around either one of legs in both ends of the core, a second primary transformer coil and a secondary side transformer coil in the output side. The transformer-reactor integrated magnetic element supplies in-phase current to the first primary side transformer coil and the second primary side transformer coil, thereby serving as a reactor and supplies reverse-phase current thereto, thereby serving as a transformer.

SUMMARY

One aspect of the present disclosure is a magnetic component including: a plurality of coils magnetically coupled with each other and a core forming a closed magnetic circuit, in which at least part of portions in inner periphery side regions of respective plurality of coils are arranged overlapping with each other in a coil axial direction; when viewed from the coil axial direction, at least one of the plurality of coils is defined as a specific coil, and a region of the specific coil from an inner periphery edge to an outer periphery edge thereof in a coil radial direction is defined as a specific coil region; and the specific coil region has a portion which is not overlapped with at least one coil in the coil axial direction other than the specific coil that constitutes the specific coil region, in a region from the inner periphery edge to the outer periphery edge thereof in the coil radial direction.

BRIEF DESCRIPTION OF THE DRAWINGS

The above-described object and other objects, features and advantages of the present disclosure will be more clarified with the following detailed description with reference to the attached drawings. The drawings are:

FIG. 8A is a graph showing a time t1 at which the current value of AC current flowing through the circuit becomes the maximum, FIG. 8B is a schematic cross-sectional view showing magnetic flux formed in the reactor at time t1, and FIG. 8C is a schematic cross-sectional view showing magnetic flux formed in the transformer at time t1;

FIG. 9A is a graph showing a time t2 at which current value of AC current flowing through the circuit becomes 0, FIG. 9B is a schematic cross-sectional view showing no magnetic flux formed in the reactor at time t2, and FIG. 9C is a schematic cross-sectional view showing magnetic flux formed in the transformer at time t2;

FIG. 24 is a cross-sectional view sectioned in XXIV-XXIV line shown in

FIG. 23;

DETAILED DESCRIPTION OF THE PREFERRED EMBODIMENTS

A patent literature, JP-A-2017-60285 discloses a transformer-reactor integrated magnetic element as a magnetic component. The transformer-reactor integrated magnetic element is provided with a core including a center leg portion and leg portions in both ends, a first primary side transformer coil wound around either one of legs in both ends of the core, a second primary transformer coil and a secondary side transformer coil in the output side. The transformer-reactor integrated magnetic element supplies in-phase current to the first primary side transformer coil and the second primary side transformer coil, thereby serving as a reactor and supplies reverse-phase current thereto, thereby serving as a transformer.

According to the transformer-reactor integrated magnetic element, phases of the current supplied to respective first primary side transformer and second primary side transformer are switched, thereby serving as either a transformer or a reactor. Hence, the transformer-reactor integrated magnetic element is unable to accomplish both functions of the transformer and the reactor at the same time. Accordingly, this configuration is required to be improved.

With reference to the drawings, embodiments of the present disclosure will be described as follows.

First Embodiment

With reference to FIGS. 1 to 6, embodiment of a magnetic component will be described. A magnetic component 1 is provided with a plurality of coils which are magnetically coupled with each other and a core 2 forming a closed magnetic circuit.

In inner periphery side regions of respective plurality of coils, at least part of portions are arranged overlapping with each other in a coil axial direction Z. When viewed from the coil axial direction Z, at least one of the plurality of coils is defined as a specific coil, and a region of the specific coil from an inner periphery edge to an outer periphery edge of the specific coil in the coil radial direction is defined as a specific coil region. The specific coil region has a portion which is not overlapped with at least one coil in the coil axial direction Z other than the specific coil that constitutes the specific coil region, in a region from the inner periphery edge to the outer periphery edge thereof in the coil radial direction.

Figure 1:
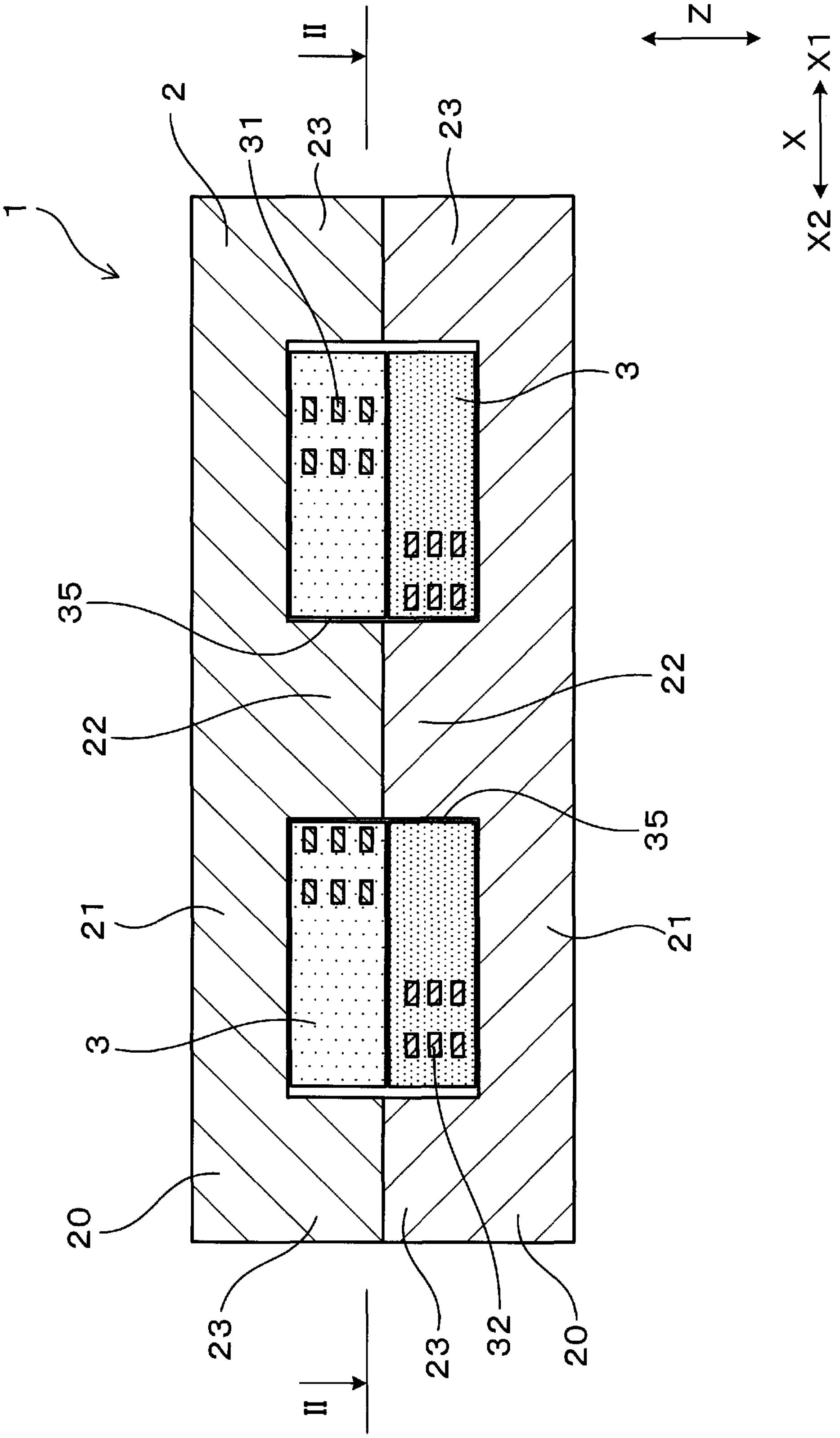
FIG. 1 is a cross-sectional view of a magnetic component disposed parallel to a coil axial direction according to a first embodiment.
Figure 2:
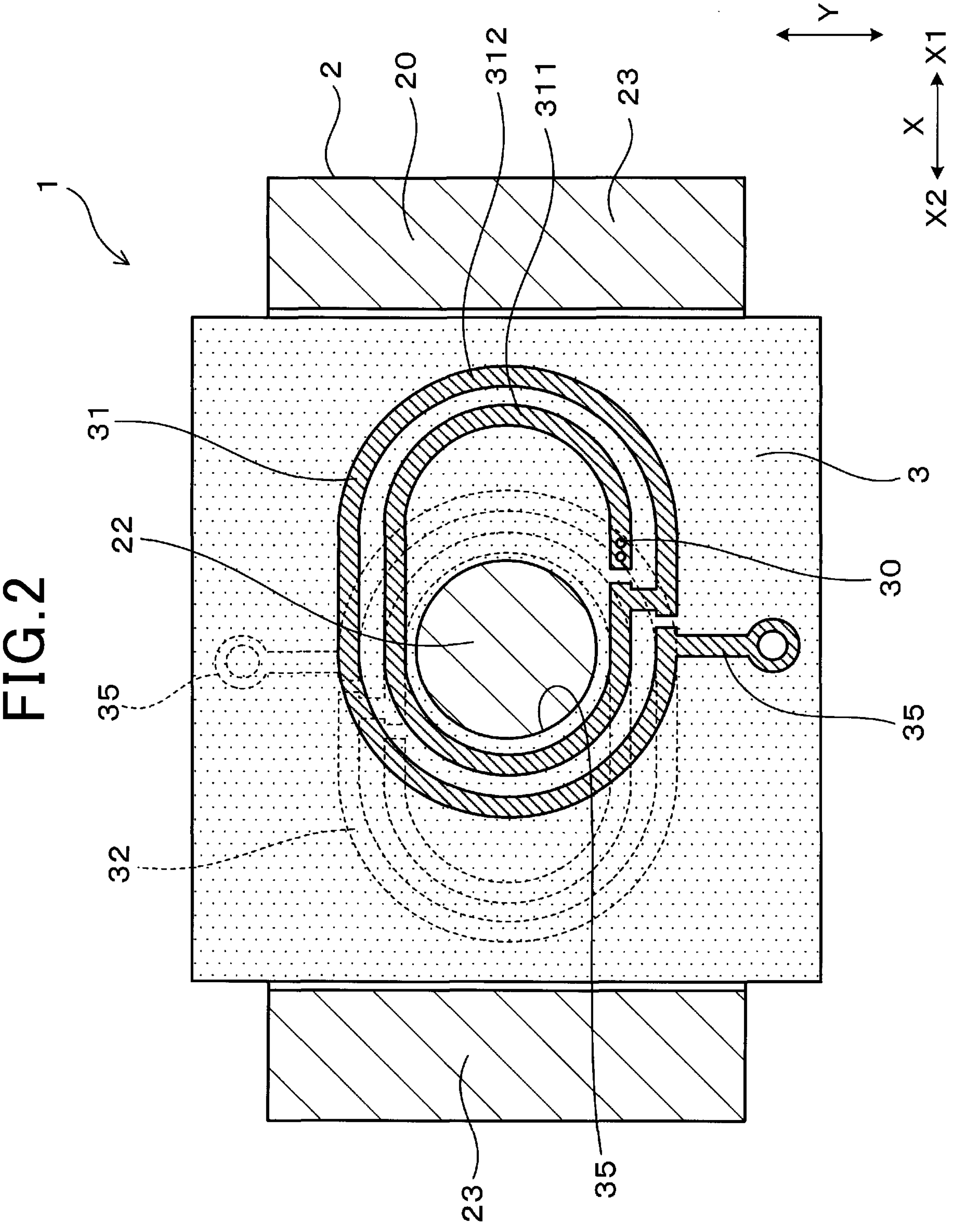
FIG. 2 is a cross-sectional view sectioned in the II-II line shown in FIG. 1.
Figure 3:
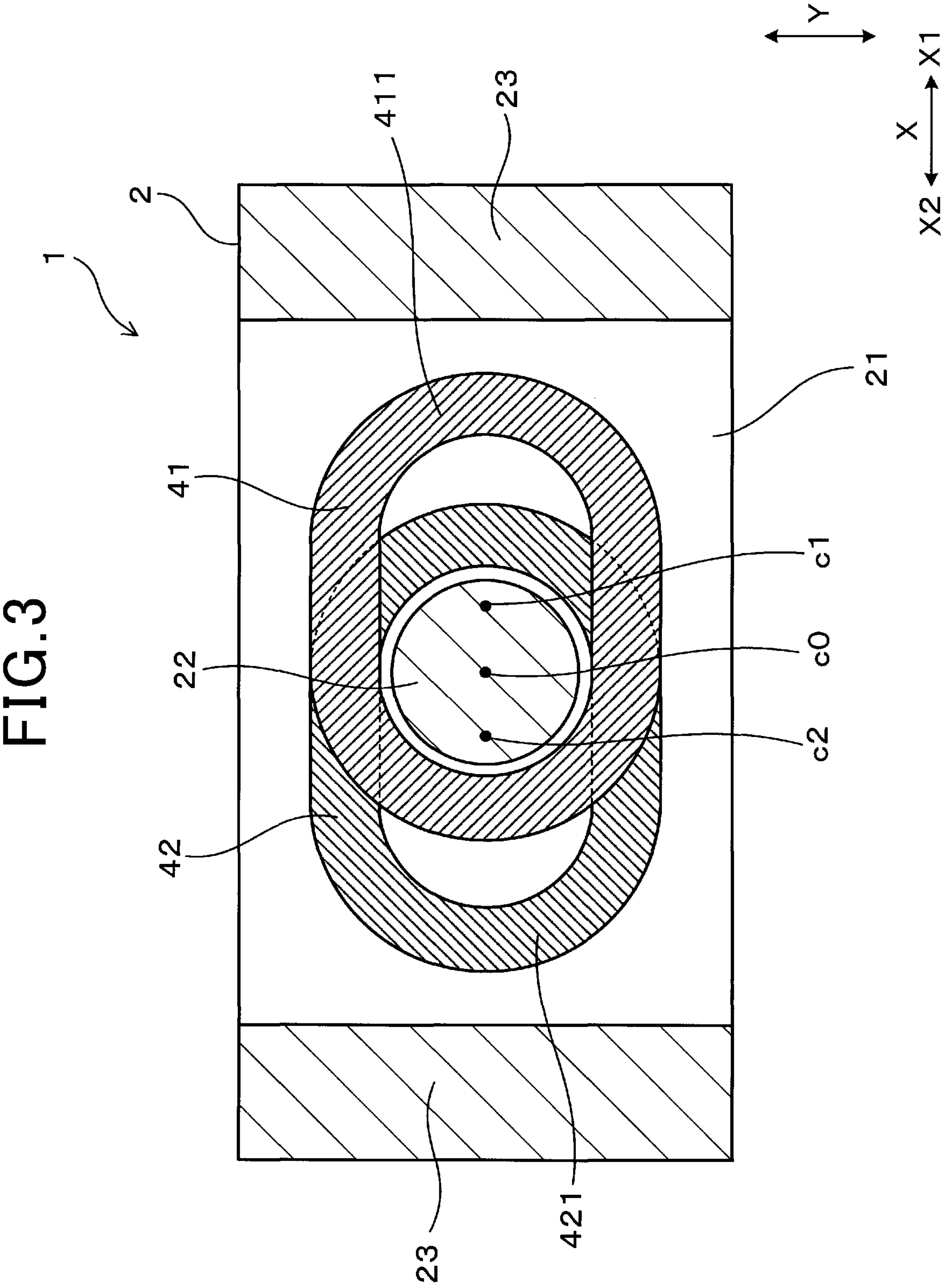
FIG. 3 is the cross-sectional view the same as that of FIG. 2, showing a core, a first coil region and a second coil region.

As shown in FIGS. 1 and 2, according to the present embodiment, the magnetic component 1 includes two coils of a first coil 31 and a second coil 32. As shown in FIG. 3, when viewed from the coil axial direction Z, a region of the first coil 31 from an inner periphery edge to an outer periphery edge in the coil radial direction is defined as a first coil region 41. Also, when viewed from the coil axial direction Z, a region of the second coil 32 from an inner periphery edge to an outer periphery edge in the coil radial direction is defined as a second coil region 42. Note that hatching is applied for convenience to the first coil region 41 and the second coil region 42 shown in FIG. 3.

According to the present embodiment, the first coil 31 and the second coil 32 each constitutes the specific coil, and the first coil region 41 and the second coil region 42 each constitutes the specific coil region. That is, the first coil region 41 has a portion which is not overlapped with the second coil 32 in the coil axial direction Z, in a region from the inner periphery edge to the outer periphery edge thereof in the coil radial direction, and the second coil region 42 has a portion which is not overlapped with the first coil 31 in the coil axial direction Z, in a region from the inner periphery edge to the outer periphery edge thereof in the coil radial direction. Hereinafter, the present embodiment will be described in detail.

Note that in the present specification, the coil axial direction Z refers to a direction where the winding axis of the first coil 31 extends. Also, one direction orthogonal to the coil axial direction Z is referred to as a lateral direction X. The lateral direction X is referred to as a direction where a pair of outer leg portions 23 of the core 2 (described later) are arranged. Moreover, a direction orthogonal to both of the coil axial direction Z and the lateral direction X is referred to as a vertical direction Y.

The core 2 is made of a magnetic body such as ferrite. As shown in FIG. 1, the core 2 is constituted of combination of a pair of divided cores 20 provided in both sides in the coil axial direction Z. According to the present embodiment, the pair of divided cores 20 each have mutually the same shape. The divided core 20 has a base portion 21, an inner leg portion 22 and a pair of outer leg portions 23 extended from the base portion 21.

The base portion 21 is formed on a plane orthogonal to the coil axial direction Z. As shown in FIG. 3, the base portion 21 has a longitudinal side in the lateral direction X and formed in a rectangular plate shape having a thickness in the coil axial direction Z. As shown in FIG. 1, the pair of divided cores 20 are formed such that respective base portions 21 face in the coil axial direction Z.

The inner leg portion 22 and the pair of outer leg portions 23 protrude towards a divided core 20 in other side with respect to the coil axial direction Z from the base portion 21 of each divided core 21.

As shown in FIG. 2, the inner leg portion 22 shows a columnar shape having a circular cross-sectional shape sectioned along a line orthogonal to the coil axial direction Z. The inner leg portion 22 is formed at the center of the base portion 21 with respect to both the lateral direction X and the vertical direction Y.

The inner leg portion 22 is provided in an inner periphery side of the first coil 31 and the second coil 32. The inner leg portion 22 is formed to be positioned in an inner periphery side of both the first coil 31 and the second coil 32 when viewed from the coil axial direction Z. The inner leg portion 22 is provided not to overlap with both of the first coil 31 and the second coil 32 in the coil axial direction Z.

As shown in FIG. 2, the outer leg portion 23 shows a rectangular shape in its cross-section sectioned along a line orthogonal to the coil axial direction Z where the longitudinal side is in the vertical direction Y and short side is in the lateral direction X. The outer leg portion 23 protrudes from entire base portion 21 with respect to the Y direction. The pair of outer leg portions 23 are formed in both outer sides of the first coil 31 and the second coil 32 with respect to the lateral direction X.

As shown in FIG. 1, each divided core 20 is provided such that a surface of the inner leg portion 22 which is opposite to the base portion 21 and a surface of the outer leg portion which is opposite to the base portion 21 face with each other. Then, a printed writing board 3 provided with a first coil 31 and a printed wiring board 3 provided with a second coil 32 are arranged in a region between the pair of base portions 21 in the coil axial direction Z and between the pair of outer leg portions 23 in the lateral direction X.

The printed wiring boards 3 each have a thickness in the coil axial direction Z and are provided overlapping with each other in the coil axial direction Z. With this configuration, the first coil 31 and the second coil 32 are formed at different positions in the coil axial direction Z. The printed wiring board 3 has a hole portion 35 at the center portion thereof penetrating in the coil axial direction Z, allowing the inner leg portion 22 of the core 2 to be inserted inside the hole portion 35.

The printed wiring board 3 is constituted by a multi-layered substrate, for example. The first coil 31 is formed by a conductor pattern of one printed wiring board 3 and the second coil 32 is formed by a conductor pattern of the other printed wiring board 3. In each printed wiring board 3, the conductor pattern is formed at three conductor layers in the coil axial direction Z.

As shown in FIG. 2, the first coil 31 has the same shape in the respective conductor layers. The first coil 31 is formed in a double spiral shape in each conductor layer. That is, the first coil 31 includes, in each conductor layer, an inner periphery conductor 311 positioned in the inner periphery and an outer periphery conductor 312 positioned in the outer periphery side of the inner periphery conductor 311.

According to the present embodiment, the inner periphery conductor 311 and the outer periphery conductor 312 of the first coil 31 have the substantially similar shape. Each of the inner periphery conductor 311 and the outer periphery conductor 312 of the first coil 31 has a rounded rectangular shape (i.e. racetrack shape) having a longitudinal side in the lateral direction X and arcuate sides positioned in both sides in the lateral direction X.

Note that a lead pattern portion 11 is connected to the end portion of the first coil 31 in order to electrically connect the first coil 31 with an external device. However, when the term first coil is used in this specification, the term first refers to a portion without the lead pattern portion 11.

As shown in FIG. 1, portions in the respective conductor layers of the first coil 31 are formed overlapping with each other in the coil axial direction Z. In the first coil 31, different conductor layers are electrically connected by a via 30 formed in the printed wiring board 3. The first coil 31 is configured such that directions of current flowing through respective conductor layers in the coil circumferential direction are the same.

Here, when viewed from the coil axial direction Z, center of gravity of two-dimensional figure formed in the inner periphery side of the first coil 31 is defined as first gravity-center c1. The two-dimensional figure is a region surrounded by the first coil region 41 shown in FIG. 3, showing a rounded rectangular shape along the inner periphery surface of the first coil region 41. Also, center of gravity of the two-dimensional figure formed in an existing region of the inner leg portion 22 (i.e. hatching region of the inner leg portion shown in FIG. 2) when viewed from the coil axial direction Z is defined as an inner leg gravity-center c0. Note that mass distribution in a surface direction orthogonal to the coil axial direction Z is uniform in the two-dimensional figure defined for identifying the center of gravity. Specifically, for the two-dimensional figure, the mass per unit area of respective portions in the surface direction orthogonal to the coil axial direction are mutually the same.

At this moment, when viewed from the coil axial direction Z, as shown in FIG. 3, the first gravity-center c1 is present at one side in the lateral direction X with respect to the inner leg gravity-center c0. Hereinafter, a portion in the first gravity-center c1 side with respect to the inner leg gravity-center c0 in the lateral direction X is referred to as X1 side, and a portion opposite to the X1 side in the lateral direction X is referred to as X2 side. For the inner periphery edge of the first coil 31, a portion in the X2 is positioned relatively away from the inner leg portion 22 towards the X2 side, and portion in the X1 side is positioned relatively close to the inner leg portion.

Figure 4:
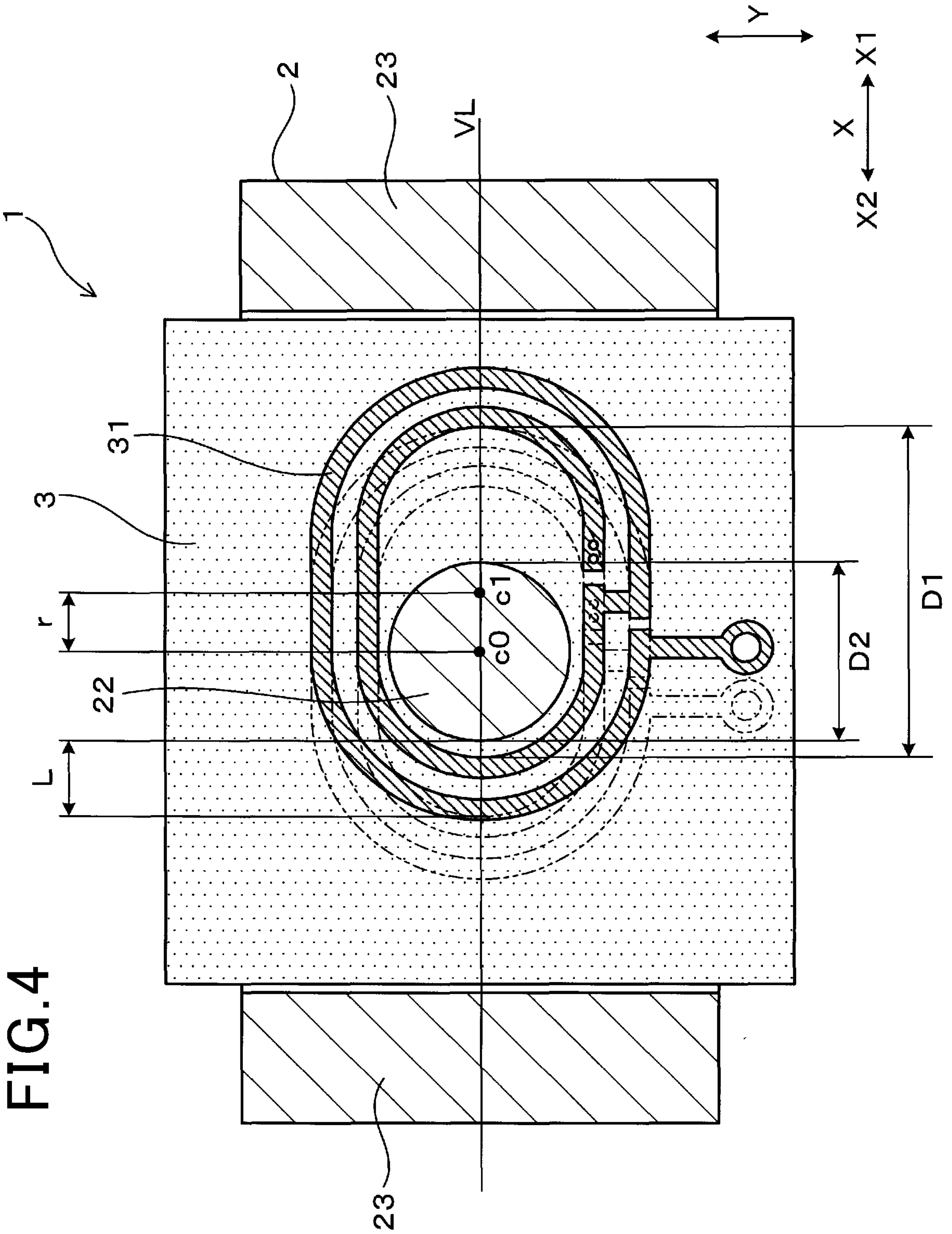
FIG. 4 is the cross-sectional view the same as that of FIG. 2, showing an amount of eccentricity r and a variable length L.

Further, when viewed from the coil axial direction Z, as shown in FIG. 4, the shortest distance between the first gravity-center c1 and the inner leg gravity-center c0 is defined as an amount of eccentricity r [mm]. Moreover, when viewed from the coil axial direction Z, the distance D1 [mm] is defined as the shortest distance between cross points where the inner periphery edges of the first coil 31 cross a virtual line VL passing through the first gravity-center c1 and the inner leg gravity-center. Further, when viewed from the coil axial direction Z, D2 [mm] is defined as a distance between cross points at which the outer periphery edges of the inner leg portion 22 cross the virtual line VL. Also, a variable length L is defined as $L=(D1-D2)/2$. At this moment, the ratio of an amount of eccentricity r to the variable length L, that is, r/L satisfies a relationship $r/L \geq 0.25$.

The variable length $L=(D1-D2)/2$ refers to, as shown in FIG. 4, the shortest distance between the inner leg portion 22 and the first coil 31 in the lateral direction X, when assuming that the first coil 31 and the inner leg portion 22 are not at mutually eccentric positions (i.e. assuming that the first gravity-center c1 and the inner leg gravity-center c0 are at the same position). In FIG. 4, the outline of the first coil 31 is indicated by a two-dot chain line when assuming that the first coil 31 and the inner leg portion 22 are not at mutually eccentric positions. The ratio r/L refers to a degree of eccentricity of the first coil 31 with respect to the inner leg portion 22.

Since r=L states that the inner periphery edge of the first coil 31 comes into contact with the inner leg portion 22, the maximum value of r becomes L geometrically. Thus, the maximum value of r/L becomes 1.

As shown in FIG. 2, the second coil 32 has a shape as same as that of the first coil 31 and is disposed in a state of being rotated by 180 degrees in the coil circumferential direction with respect to the first coil 31. In the second coil 32, explanation is omitted for the shape similar to that of the first coil. For names of respective portions of the second coil 32, the same names as the respective portions of the first coil 31 having similar configurations will be applied.

When viewed from the coil axial direction Z, the gravity-center of the two-dimensional figure formed in the inner periphery side of the second coil 32 is defined as a second gravity-center c2. The two-dimensional figure is a region surrounded by the second coil region 42 shown in FIG. 3, showing a rounded rectangular shape along the inner periphery surface of the second coil region 42. The mass distribution in a surface direction orthogonal to the coil axial direction Z is uniform in the two-dimensional figure. Specifically, for the two-dimensional figure, the mass per unit area of respective portions in the surface direction orthogonal to the coil axial direction Z are mutually the same. When viewed from the coil axial direction Z, the second gravity-center c2 is eccentric towards the X2 side with respect to the inner leg gravity-center c0. Thus, the inner periphery edge of the second coil 32 for the inner periphery edge of the second coil 32, portion on the X2 side, is positioned relatively away from the inner leg portion 22, and the portion on the X1 side is positioned relatively close to the inner leg portion 22.

Also, the second gravity-center C2 is positioned away from the first gravity center c1, towards the X2 side. Then, the first gravity-center c1 and the second gravity-center c2 are provided at mutually shifted positions. According to the present embodiment, the first gravity-center c1 and the second gravity-center c2 are provided at mutually opposite sides in the lateral direction with respect to the inner leg gravity-center c0.

For the second coil 32, similar to the first coil 31, the above-described ratio r/L satisfies the relationship r/L≥0.25.

As shown in FIG. 3, each of the first coil region 41 and the second coil region 42 has a rounded rectangular shape (i.e. racetrack shape). Each of the first coil region 41 and the second coil region 42 has a portion not overlapping with the other side's coil in a region from the inner periphery edge to the outer periphery edge thereof in the coil radial direction.

Further, when viewed from the coil axial direction, the first coil region 41 has a first protruded region 411 which protrudes from the second coil region 42 towards X1 side, and the second coil region 42 has a second protruded region 421 which protrudes from the first coil region 41 towards X2 side.

According to the present embodiment, when viewed in the coil axial direction Z, an area of a region from the outer periphery edge to the inner periphery edge of the specific coil (i.e. first coil 31 or second coil 32) is defined as a coil area A. Also, when viewed in the coil axial direction Z, an area of a region, where a region from the outer periphery edge to the inner periphery edge of the first coil 31 and a region from the outer periphery edge to the inner periphery edge of the second coil 32 are overlapped with each other, is defined as an overlapped area B. At this moment, the coil area A and the coil area B for the respective first coil 31 and the second coil 32 satisfy a relationship B/A≤0.9. This means that the smaller the ratio B/A, the narrower the overlapped region between the first coil 31 and the second coil 32 in the coil axial direction Z. An leakage inductance can readily be secured as B/A becomes smaller.

Next, usages of the magnetic component 1 will be described.

Figure 5:
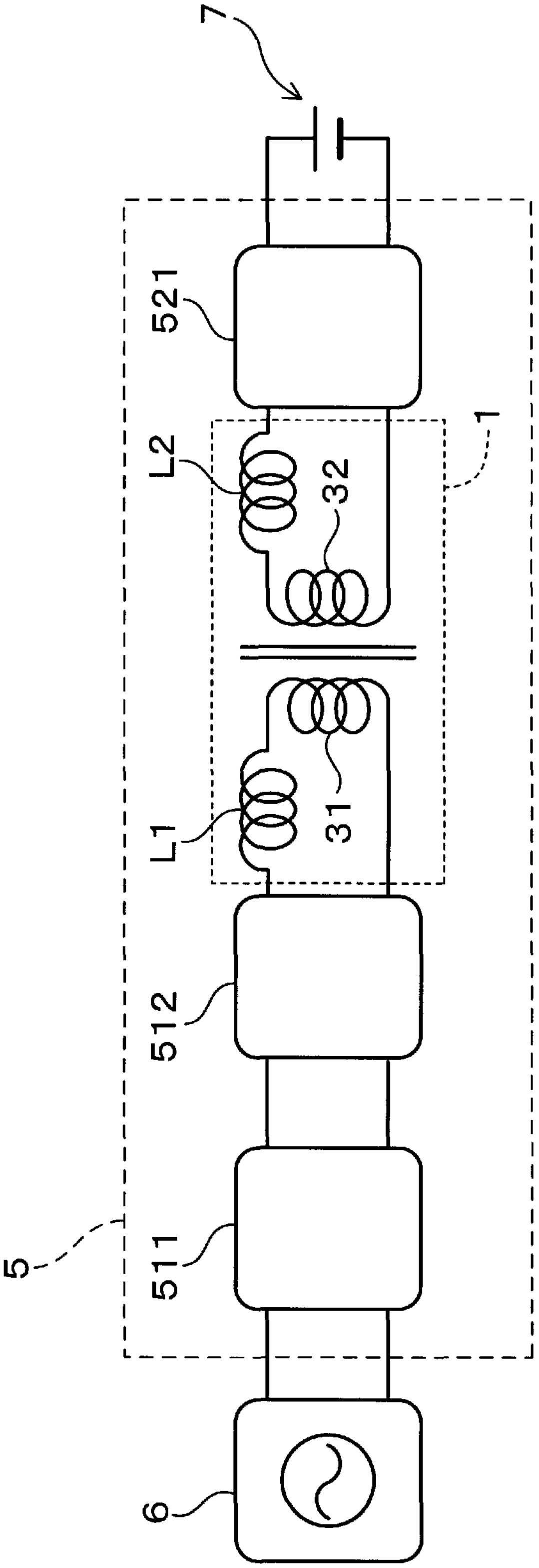
FIG. 5 is a circuit configuration of a bi-directional charger provided with a magnetic component according to the first embodiment.

The magnetic component 1 according to the present embodiment can be configured to constitute a part of an on-vehicle bidirectional charger 5, for example. The bidirectional charger 5 is provided with the magnetic component 1, a first circuit connected to the first coil 31 of the magnetic component 1, a second circuit connected to the second coil 32 of the magnetic component 1. In FIG. 5, a leakage inductance formed around the first coil 31 of the magnetic component 1 is indicated by L1, and a leakage inductance formed around the second coil 32 is indicated by L2. The first coil 31 of the magnetic component 1 is connected to an AC power source 6 via the first circuit, and the second coil 32 is connected to a battery 7 via the second circuit.

The AC power source 6 is a power supply unit for supplying power to the battery 7 from outside of the vehicle. As the AC power source 6, for example, an AC charger used for a power supply station or the like is expected.

The AC power source 6 is connected to a first coil 31 via an AC-DC converter 511 and a first switching circuit 512 which constitute the first circuit. In other words, the AC-DC converter 511 and the first switching circuit 512 constitute a power conversion circuit that couples the AC power source 6 (i.e. voltage unit) and the first coil 31. The AC-DC converter 511 converts AC power of the AC power source 6 to be DC power and outputs the converted power to the first switching circuit 512 side. The first switching circuit 512 converts the current transmitted from the AC-DC converter 511 to be pulse current and outputs the converted power to the first coil 31 side.

Further, the first switching circuit 512 is configured to convert the pulse current transmitted from the first coil 31 side to be DC current and outputs the converted current to the AC-DC converter 511. The AC-DC converter 511 is configured to convert the DC power transmitted from the first switching circuit 512 to be AC power and output the converted power to the AC power source 6 side.

Further, the battery 7 is connected to the second coil 32 via the second switching circuit 521 that constitutes the second circuit. That is, the second switching circuit 521 constitutes a power conversion circuit that couples the battery 7 (i.e. voltage unit) and the second coil 32. The second switching circuit 521 converts the pulse current transmitted from the second coil 32 side to be DC current and outputs the converted current to the battery 7 side. Further, the second switching circuit 521 is configured to convert the DC current transmitted from the battery 7 side to be a pulse current and outputs the converted current to the second coil 32 side.

The bidirectional charger 5 converts the voltage of the AC power source 6 with a transformer and outputs the converted voltage to the battery 7 side, thereby charging the battery 7. Conversely, the bidirectional charger 5 converts the voltage of the battery 7 with the transformer and outputs the converted voltage to the AC power source 6 side, thereby charging the AC power source 6. The magnetic component 1 according to the present disclosure can be used for the above-described usages.

Figure 6:
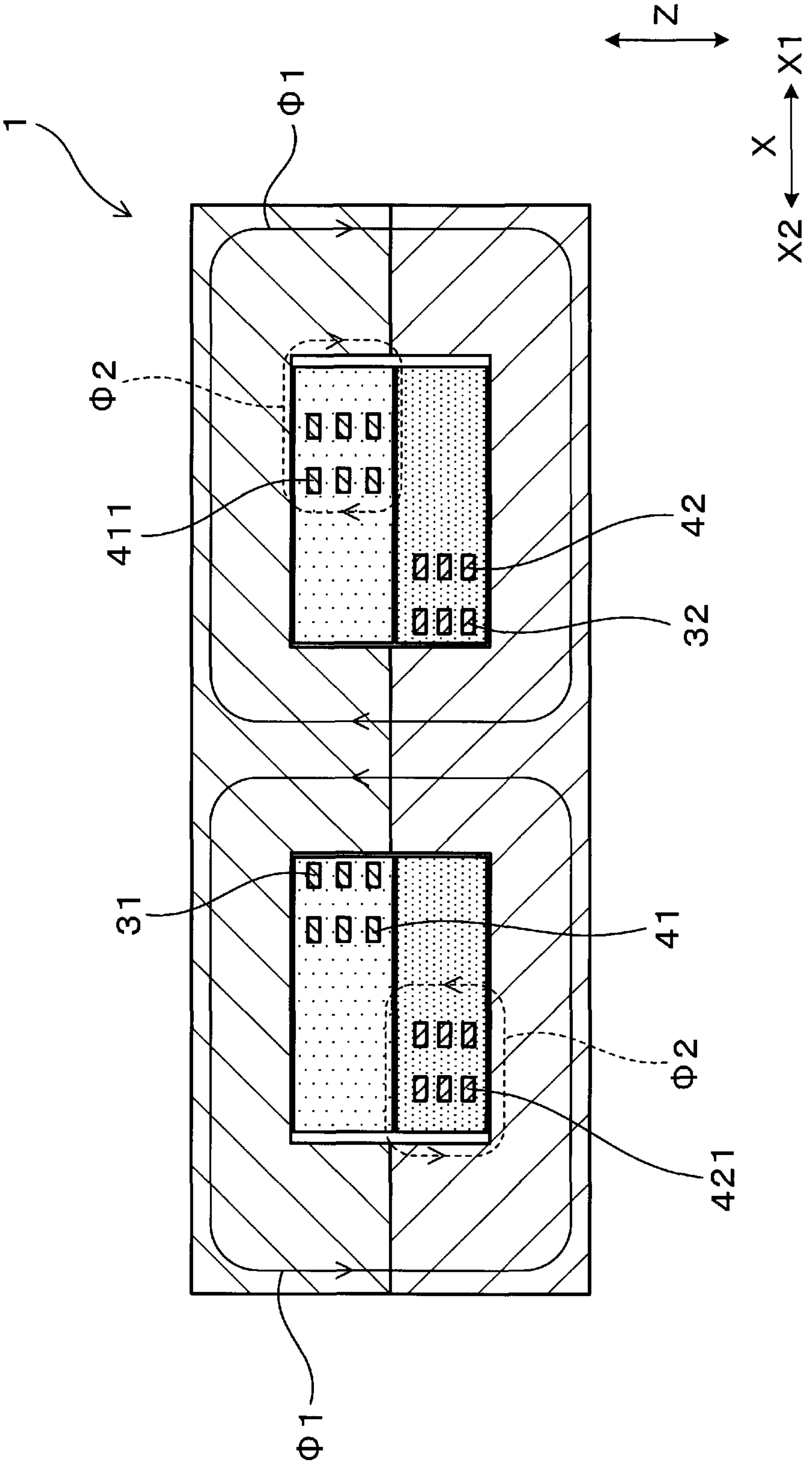
FIG. 6 is the cross-sectional view the same as that of FIG. 1, schematically showing magnetic flux being formed.

Next, effects and advantages of the present disclosure will be described. In the magnetic component 1 of the present disclosure, the first coil 31 and the second coil 32 are magnetically coupled with each other. Hence, as shown in FIG. 6, magnetic flux Φ1 is produced which passes through the inner periphery side of both the first coil 31 and the second coil 32, and the first coil 31 and the second coil 32 function as a transformer.

Then, the first coil region 41 has a portion which is not overlapped with the second coil 32 in the coil axial direction Z in a region from the inner periphery edge to the outer periphery edge in the coil radial direction, and the second coil region 42 has a portion which is not overlapped with the first coil 31 in the coil axial direction Z in a region from the inner periphery edge to the outer periphery edge in the coil radial direction. Thus, as shown in FIG. 6, a leakage flux Φ2, which flows only in the vicinity of the above portion and does not magnetically couple with other coil, can readily be secured so that leakage inductance of the magnetic component 1 can be secured. Hence, in the above-described portions, function of a reactor can readily be accomplished.

Also, according to the present embodiment, the first protruded region 411 in the first coil region 41 is formed, which more protrudes towards the X1 side than the second coil region 42, and the second protruded region 421 in the second coil region is formed, which protrudes towards X2 side with respect to the first coil region 41. Hence, each of the first protrude region 411 and the second protruded region 421 are positioned relatively away from each other. Hence, as shown in FIG. 6, leakage flux Φ2 is likely to be formed around the first protruded region 411 and the second protruded region 421. Hence, leakage inductance in the magnetic component 1 can readily be secured and a function of reactor can readily be accomplished.

Also, when viewed from the coil axial direction Z, the first gravity center c1 and the second gravity center c2 are at mutually shifted positions. In other words, the first coil 31 and the second coil 32 are at mutually eccentric positions. Hence, when viewed from the coil axial direction Z, the first protruded region 411 of the first coil region 31 can readily be protruded significantly from the second coil region 42, and the second protruded region 421 can readily be protruded significantly from the first coil region 41. Therefore, leakage flux can more readily be formed around the first protruded region 411 and the second protruded region 421. Accordingly, leakage inductance in the magnetic component 1 can readily be secured and a function of the reactor can readily be accomplished.

Also, in addition to a fact that the first coil 31 and the second coil 32 are at mutually eccentric positions, the core 2 has an inner leg portion 22 provided at an inner periphery side of the first coil 31 and an inner periphery side of the second coil 32, and the pair of outer leg portions 23 provided at outside of both the first coil 31 and the second coil 32. Further, when viewed from the coil axial direction Z, each of the first gravity-center c1 and the second gravity-center c2 is provided being shifted in the lateral direction X with respect to the inner leg gravity-center c0. Hence, the outer leg portion 23 is provided in the vicinity of a portion in the farther side from each inner leg portion 22 of the first coil 31 and the second coil 32. Thus, leakage flux formed around the first protruded region 411 and the second protruded region 421 can be led through the outer leg portion 23. Likewise, with this configuration, leakage inductance in the magnetic component 1 can readily be secured and a function of reactor can readily be accomplished.

Also, for the first coil 31 and the second coil 32, ratio of an amount of eccentricity r to the variable length L, that is, r/L satisfies a relationship $r/L \geq 0.25$. Specifically, each of the first coil 31 and the second coil 32 has relatively large degree of eccentricity (i.e. $r/L \leq 0.25$). Hence, each portion of the first protruded region 411 and the second protruded portion 421 can be positioned away from each other so that leakage inductance can readily be secured in these regions. Note that these values are supported by experimental examples which will be described later.

As described, according to the present embodiment, a magnetic component that simultaneously accomplishes both functions of the transformer and the reactor can be obtained.

Reference Example

Figure 7:
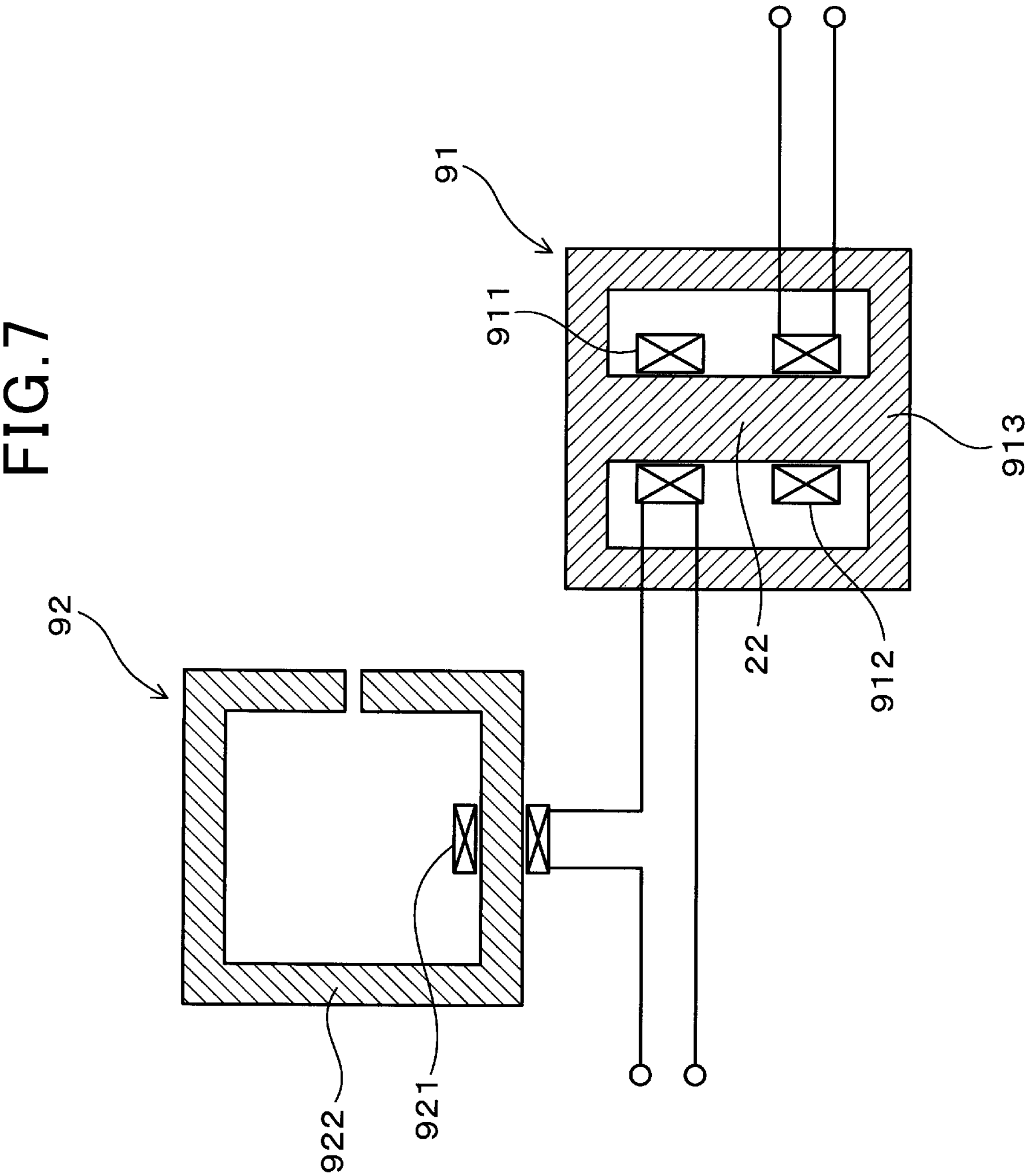
FIG. 7 is a diagram showing a circuit configuration provided with a transformer and a reactor which are mutually separated according to a reference embodiment.
Figure 8A:
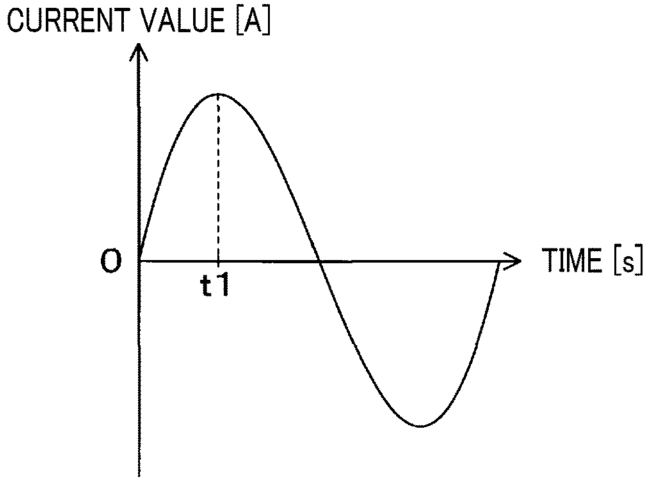
FIGS. 8A-8C is a set of diagrams in the reference embodiment where
Figure 8B:
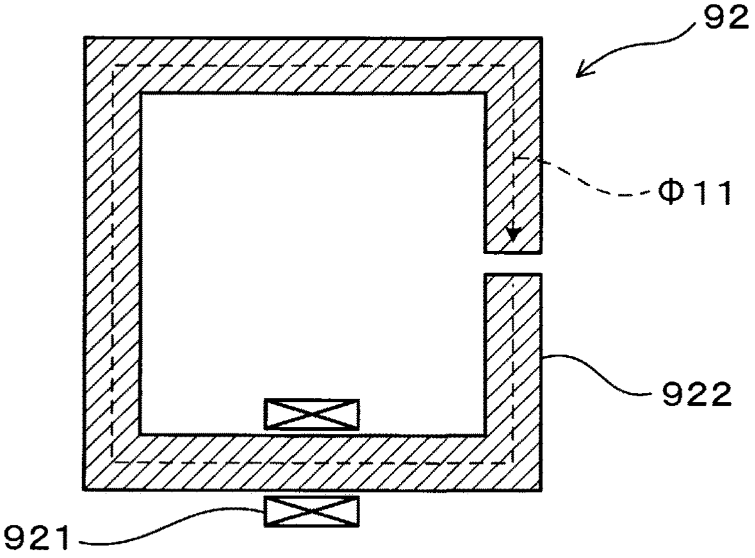
Figure 8C:
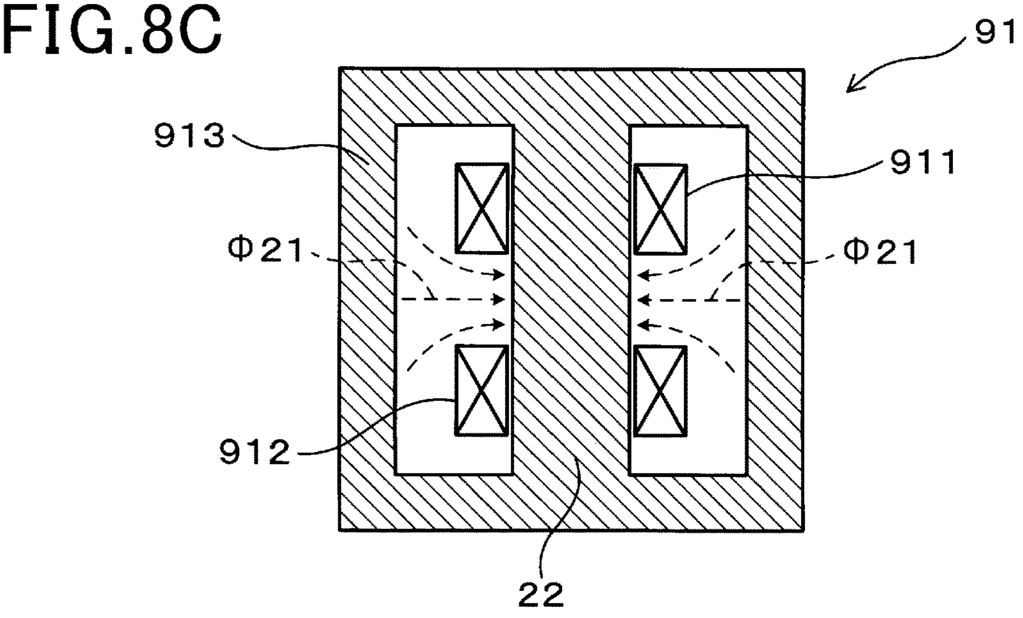
Figure 9A:
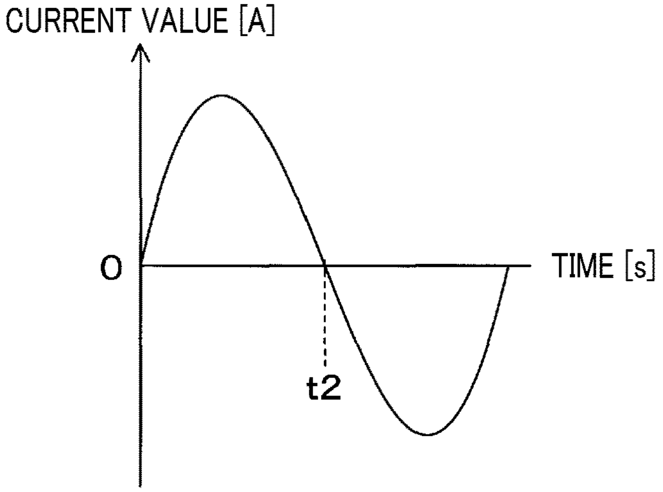
FIGS. 9A-9C is a set of diagrams in the reference embodiment where
Figure 9B:
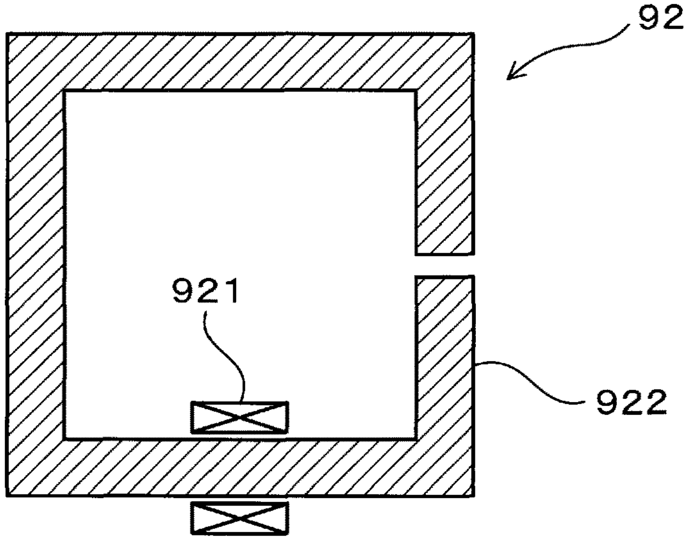
Figure 9C:
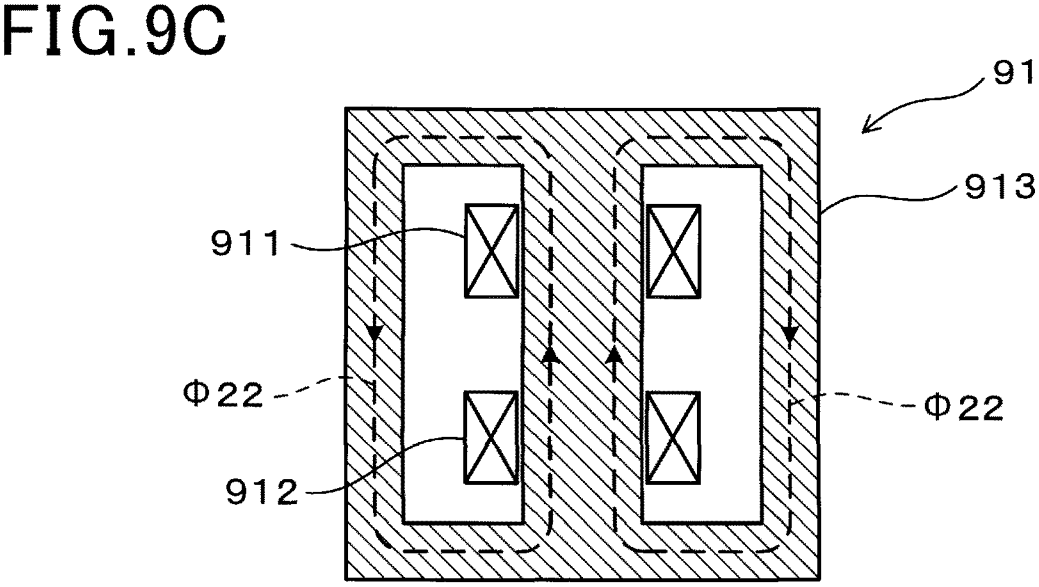

According to the present embodiment, as shown in FIGS. 7 to 9, a simulation is applied for a circuit provided with mutually separated transformer 91 and a reactor 92, to obtain state of magnetic flux produced when applying current having the same phase to a primary coil 911 (i.e. input side coil) of the transformer 91 and the reactor coil 921. In particular, state of magnetic flux produced in the transformer 91 and the reactor 92 is checked for cases where the current value of the primary coil 911 of the transformer 91 and the reactor coil 921 become the maximum and zero.

As shown in FIG. 7, the reactor 92 is provided with a reactor core 922 having a rectangular ring shape and a reactor coil 921 wound around one side of the reactor core 922. The reactor core 922 has a gap at a part of portion in the circumferential direction. The reactor core 92 has a function of smoothing the current by energizing the reactor coil 921. The reactor coil 921 is connected to the primary coil 911 of the transformer 91.

The transformer 91 is provided with a transformer core 913, a primary coil 911 and a secondary coil 912. Since the transformer core 913 is the same as the core 2 described in the first embodiment, as the names of respective portions of the transformer coil 912, the same names as those of the core 2 in the first embodiment will be applied. The input side primary coil 911 and the output side secondary coil 912 are wound coaxially around the inner leg portion 22 of the transformer core 913. The primary coil 911 and the secondary coil 912 are not eccentrically positioned with each other, but are formed at a position mutually overlapping in the coil axial direction Z through the entire periphery.

Then, in the case where AC current is applied to the reactor coil 921 and the primary coil 911 of the transformer 91, a state of magnetic flux produced in the transformer 91 and the reactor 92 is simulated when the current value of the reactor coil 921 and the primary coil 911 become the maximum and zero. The simulation result is schematically shown in FIG. 8 and FIG. 9.

FIG. 8 schematically illustrates the simulation result of the magnetic flux produced in the reactor 92 and the transformer 91 at a time t1 where the current value of current flowing through the respective reactor coils 921 and the primary coil 911 of the transformer 91 become the maximum. In FIG. 8, for the reactor 92, magnetic flux Φ11 annularly flows through the reactor core 922. On the other hand, for the transformer 91, at time t1, magnetic flux is unlikely to be formed at the transformer core 913, but magnetic flux Φ21 is likely to be formed in the space in the vicinity of the first coil 31 and the second coil 32.

FIG. 9 illustrates a result of simulation for magnetic flux in the reactor 92 and the transformer 91 produced at time t2 where the current value of the current flowing through the respective reactor coil 921 and the primary coil 911 becomes zero. In FIG. 9, it is realized that the magnetic flux is unlikely to be formed for the reactor 92 at time t2 where the current value becomes 0. On the other hand, for the transformer 91, the magnetic flux Φ22 is likely to be formed in the transformer core 913 but the magnetic flux is unlikely to be formed in the space around the first coil 31 and the second coil 32.

Specifically, when AC current is applied to the reactor coil 921 and the primary coil 911, it is realized that a timing at which magnetic flux is produced in the reactor coil 922 and a timing at which leakage flux are the same.

In this respect, similar to the magnetic component according to the first embodiment, as shown in FIG. 6, the first coil 31 and the second coil 32 are set to be at mutually eccentric positions, thereby positively forming leakage flux Φ2. Thus, in the magnetic component 1, the magnetic flux Φ1 formed in the core 2 and passing through the inner periphery sides of both the first coil 31 and the second 32, and the leakage flux Φ2 formed only around the first coil 31 and the second coil 32 can be formed simultaneously. Thus, the magnetic component 1 can be designed to have a function of the transformer and a function of the reactor at the same time. Hence, according to the magnetic component 1 of the first embodiment, it is realized that both functions of transformer and the reactor can be applied to one component.

Experiment Example

In this example, in the magnetic component 1 of which is basic configuration is similar to that of the first embodiment, leakage inductance when changing a degree of eccentricity between the first coil 31 and the second coil 32 with respect to the inner leg portion 22 is evaluated by a simulation.

According to the present example, leakage inductance was evaluated for the magnetic component 1 of which the basic structure is similar to that of the first embodiment under a condition where the ratio r/L is changed by changing an amount of eccentricity r of the first coil 31 and the second coil 32. According to the present example, six magnetic components 1 having mutually different ratios r/L are utilized. Note that the ratio r/L for the first coil 31 and the ratio r/L are set to be the same value in respective magnetic components 1.

For one of the six magnetic components 1, each of the ratio r/L of the first coil 31 and the ratio r/L of the second coil 32 is 0. In other words, this is a magnetic component 1 in which each of the first coil 31 and the second coil 32 has 0 amount of eccentricity r. Further, another one of six magnetic components 1 is configured such that each of the ratio r/L of the first coil 31 and the ratio r/L of the second coil 2 is 1. This is a magnetic component 1 in which a X2 side end portion of the first coil 31 comes into contact with a X2 side end portion of the inner leg portion 22, and a X1 side end portion of the second coil 32 comes into contact with the X1 side end portion of the inner leg portion 22.

A leakage inductance is evaluated for each of the six magnetic components 1. The result of the evaluation will be shown in FIG. 10.

Figure 10:
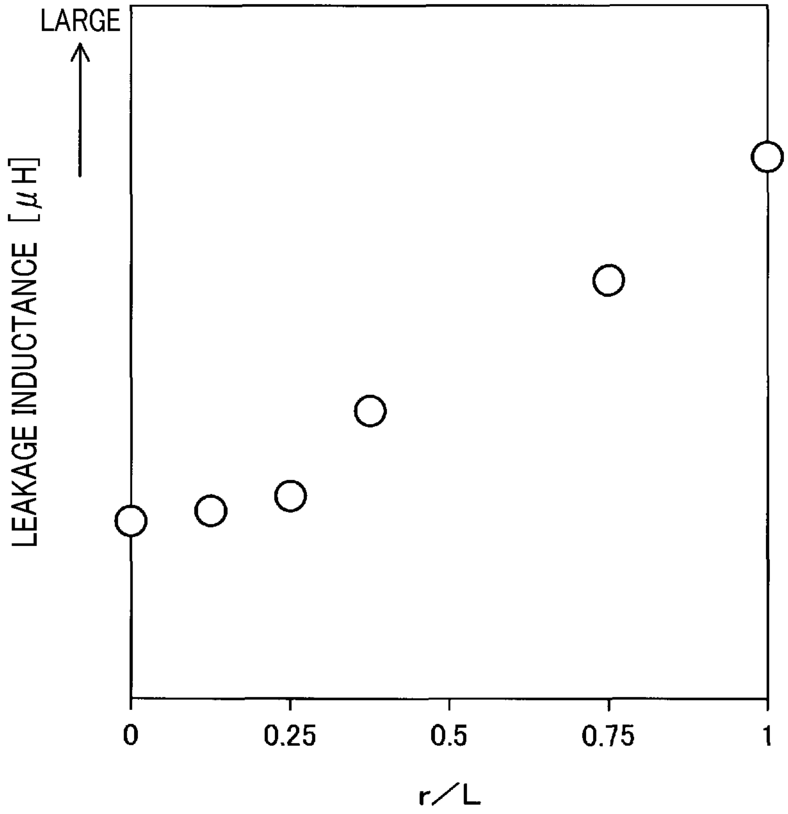
FIG. 10 is a graph showing a relationship between a ratio r/L and leakage induction in an experiment example.

As shown in FIG. 10, the leakage inductance can readily be secured as the ratio r/L is set to be larger. It is realized that the leakage inductance rapidly increases when the ratio r/L becomes 0.25 or larger. Hence, by setting the ratio r/L to be 0.25 or larger, the leakage inductance can readily be secured, and a function of a reactor in the magnetic component can readily be accomplished.

Second Embodiment

Figure 11:
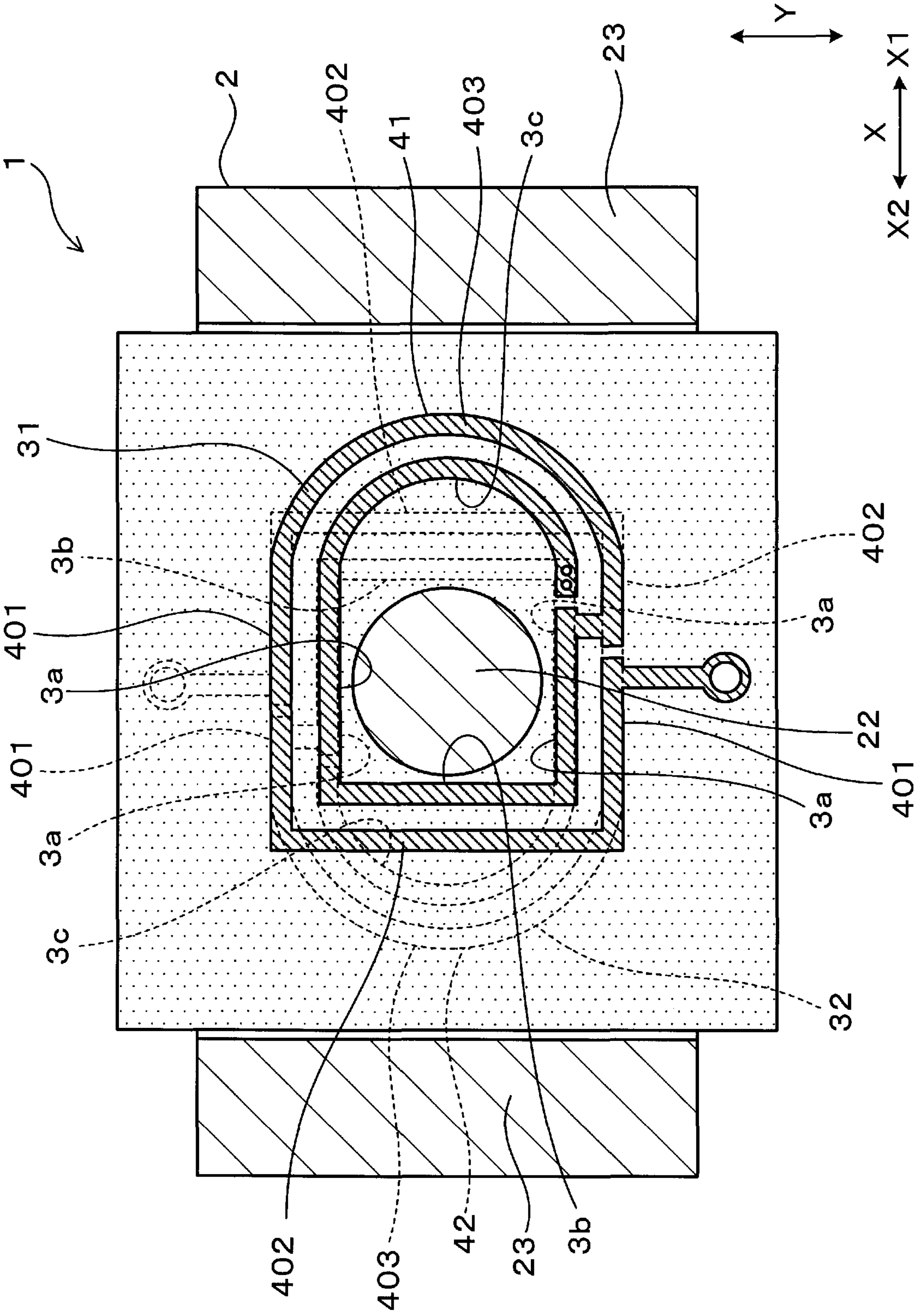
FIG. 11 is a cross-sectional view corresponding to FIG. 2 according to a second embodiment.

According to the present embodiment, as shown in FIG. 11, the first coil 31 and the second coil 32 are changed in their shapes while having the basic configuration similar to that of the first embodiment.

Each of the first coil region 41 and the second coil region 42 is formed in a D-shape when viewed from the coil axial direction Z. Each of the first coil region 41 and the second coil region 42 is provided with a pair of first linear regions 401 and a second linear region 402, and a protrusion 403.

Each pair of first linear regions 401 in the first coil region 41 and the second coil region 42 are formed along the lateral direction X and facing with each other in the vertical direction Y.

In the first coil region 41, the second linear region 402 couples the X2 side end portions of the pair of first linear regions 301 straight in the vertical direction Y. Thus, the pair of first linear region 401 and the second linear region 402 of the first coil region 41 has a corner portion having a right angle and a U-shape opened in the X1 side.

In the first coil region 41, the protrusion 403 couples the X1 side end portions of the pair of first linear regions 401 and is formed protruding in the X1 side. The protrusion 403 of the first coil region 31 has an arc-shape which expands in the X1 side.

With this configuration, similarly, the inner periphery edge of the first coil 311 is formed in D-shape when viewed from the coil axial direction Z. The inner periphery edge of the first coil 31 includes a pair of first linear edges 3*a*, a second linear edge 3*b* and protruded edge 3*c*. The pair of first straight edges 3*a* are inner side edges of the pair of first linear regions 401 of the first coil region 41. The pair of first linear edges 3*a* is formed along the lateral direction X and facing each other in the vertical direction Y.

The second linear edge 3*b* is a X1 side edge of the second linear region 402 in the first coil region 41. The second linear edge 3*b* couples, in the vertical direction Y, the end portions of the pair of first linear edge 3*a* in the X2 side. Thus, the pair of first linear edges 3*a* and the second linear edge 3*b* have a U-shape in which a corner portion has a right angle and opening in the X1 side.

The protruded edge 3*c* is a X2-side edge of the protrusion 403 in the first coil region 41. The protruded edge 3*c* couples the end portions of the X1-side in the pair of first linear edges 3*a* and is formed protruding in the X1-side. The protruded edge 3*c* has an arc shape which expands in the X1 side. The protruded edge 3*c* is formed in a curved shape along the X1 side surface of the inner leg portion 22.

The first linear edge 3*a* and the second linear edge 3*b* are formed at positions relatively close to the inner leg portion 22, and the protruded edge 3*c* is provided at a position relatively apart from the inner leg portion 22 in the X1 side.

The second coil region 42 has a shape which is substantially symmetric to the first coil region 41 in the lateral direction X. According to the present embodiment, as names of respective portions of the second coil 32, the same names as the respective portions of the first coil 31 having similar configurations will be applied.

In the second coil 22, the second linear edge 3*b* couples, in the vertical direction Y, the end portions of the first linear edge 3*a* in the X1 side. The protruded edge 3*c* of the second coil 32 is formed in an arc shape which expands in the X2 side from the X2 side end portion of the first linear edge 3*a*. The protruded edge 3*c* of the second coil 32 is formed in a curved shape along the X2 side surface of the inner leg portion 22. For the second coil 32, the first linear edge 3*a* and the second linear edge 3*b* are each formed at a position relatively close to the inner leg portion 22, and the protruded edge 3*c* is provided at a position relatively apart from the inner leg portion 22 in the X2 side.

The first linear region 401 of the first coil region 41 and the first linear region 401 of the second coil region 42 are formed at positions which are mutually overlapped in the coil axial direction Z.

Other portions are the same as those in the first embodiment. Note that reference symbols the same as those used in the existing embodiment among reference symbols used after the second embodiment represent constituents or the like similar to those in the existing embodiments.

Next, effects and advantages of the present embodiment will be described. When viewed from the coil axial direction Z, the first linear edge 3*a* and the second linear edge 3*b* which have linear shape are formed in a region opposite to a portion in eccentric to the inner leg portion 22 in each of the first coil 31 and the second coil 32. Hence, portions constituting the first linear edge 3*a* and the second linear edge 3*b* in the first coil 31 and the second coil 32 can readily be overlapped in the coil axial direction with the coil in the other side. Also, magnetic coupling with the other coil can readily be secured in the portions constituting the first linear edge 3*a* and the second linear edge 3*b* in the first coil 31 and the second coil 32. On the other hand, in the case where the portions are formed in a curved shape such as a circuit or an ellipse, the portions are difficult to overlap with the other coil in the coil axial direction so that the first coil 31 and the second coil 32 are difficult to magnetically couple.

Then, the above-described protruded edge 3*c* is provided in a portion which is eccentric to the inner leg portion 22 in each of the first coil 31 and the second coil 32. Accordingly, heat generated in the first coil 31 and the second coil 32 can be effectively reduced. Specifically, the portion which is eccentric to the inner leg portion 22 in each of the first coil 31 and the second coil 32 is protruded in the lateral direction X relative to the other side coil such that leakage flux is likely to be formed therearound, thus causing a large heat production due to a proximity effect. Therefore, an inner periphery edge of the portion in eccentric to the inner leg portion 22 in each of the first coil 31 and the second coil 32 is formed in a protruded shape such as the protruded edge 3*c* of the present embodiment, whereby the portion constituting the protruded edge 3*c* is positioned apart from the other side coil to shorten the length of the portions while securing leakage inductance. Thus, heat generated in the first coil 31 and the second coil 32 can be reduced. In addition to this, effects and advantages similar to the first embodiment can be obtained.

Third Embodiment

Figure 12:
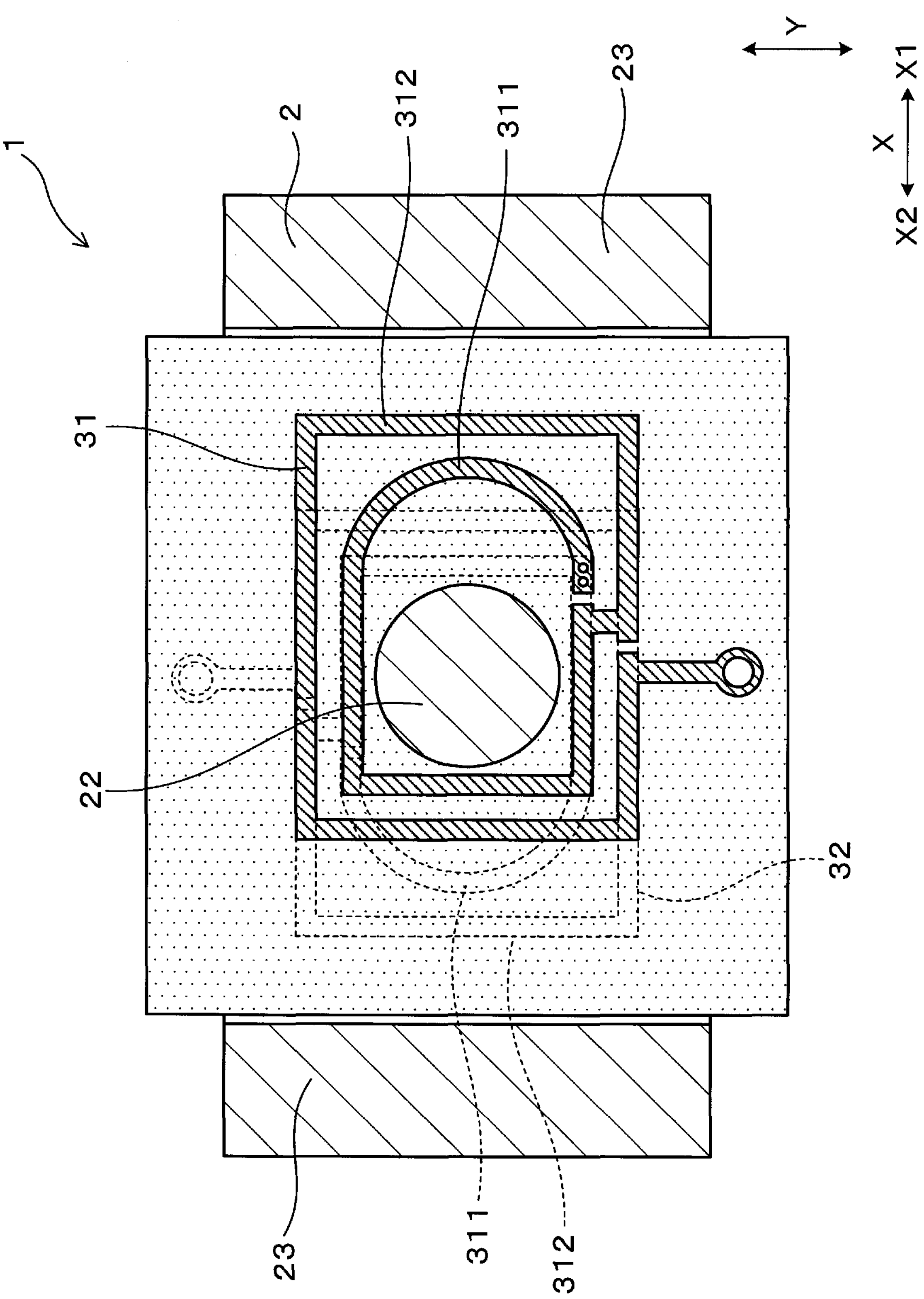
FIG. 12 is a cross-sectional view corresponding to FIG. 2 according to a third embodiment.

As shown in FIG. 12, basic configuration of the present embodiment is the same as that of the second embodiment, and the shape of the outer periphery conductor 312 in the respective conductor layers in each of the first coil 31 and the second coil 32 is modified.

When viewed from the coil axial direction Z, each of the inner periphery conductor 311 of the first coil 31 and the inner periphery conductor 311 of the second coil 32 has a D-shape which is similar to the second embodiment. The outer periphery conductor 312 of the first coil 31 and the outer periphery conductor 312 of the second coil 312 are formed in a rectangular shape having a slightly longer side in the lateral direction X. Other configurations are the same as the second embodiment.

According to the present embodiment, effects and advantages similar to those in the second embodiment can be obtained.

Fourth Embodiment

Figure 13:
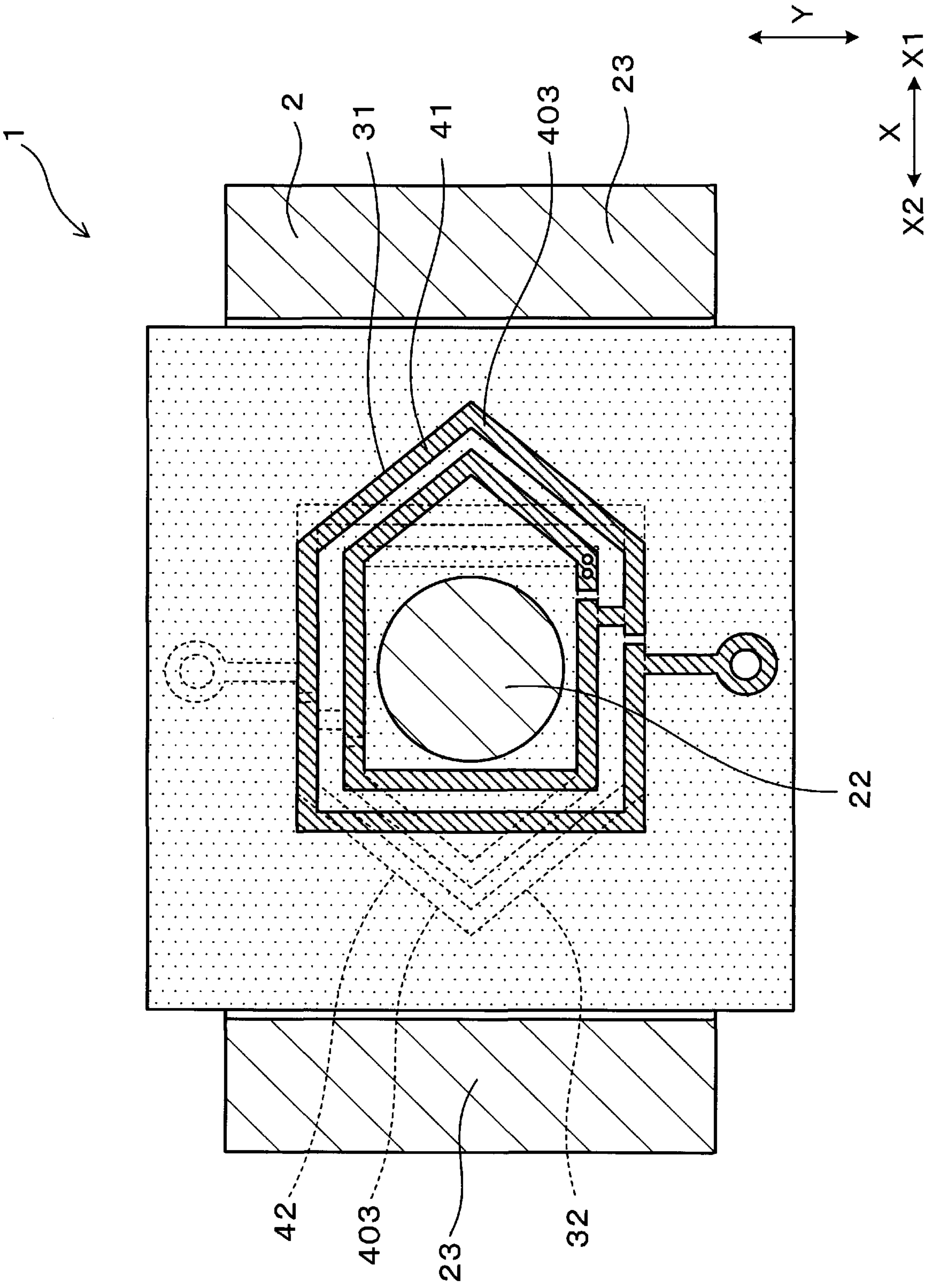
FIG. 13 is a cross-sectional view corresponding to FIG. 2 according to a fourth embodiment.

As shown in FIG. 13, the basic configuration of the present embodiment is the same as that of the second embodiment, and the shapes of the first coil region 41 and the second coil region 42 are modified.

When viewed from the coil axial direction Z, the protrusion 403 in each of the first coil region 41 and the second coil region 42 is formed in a doglegged shape. Specifically, in each of the first coil region 41 and the second coil region 42, the protrusion 403 is configured of two sides having a doglegged shape in which the width in the vertical direction Y becomes narrower as it recedes from the pair of first linear regions 401 in the lateral direction X. Other configurations are the same as the second embodiment.

According to the present embodiment, effects and advantages similar to those in the second embodiment can be obtained.

Fifth Embodiment

Figure 14:
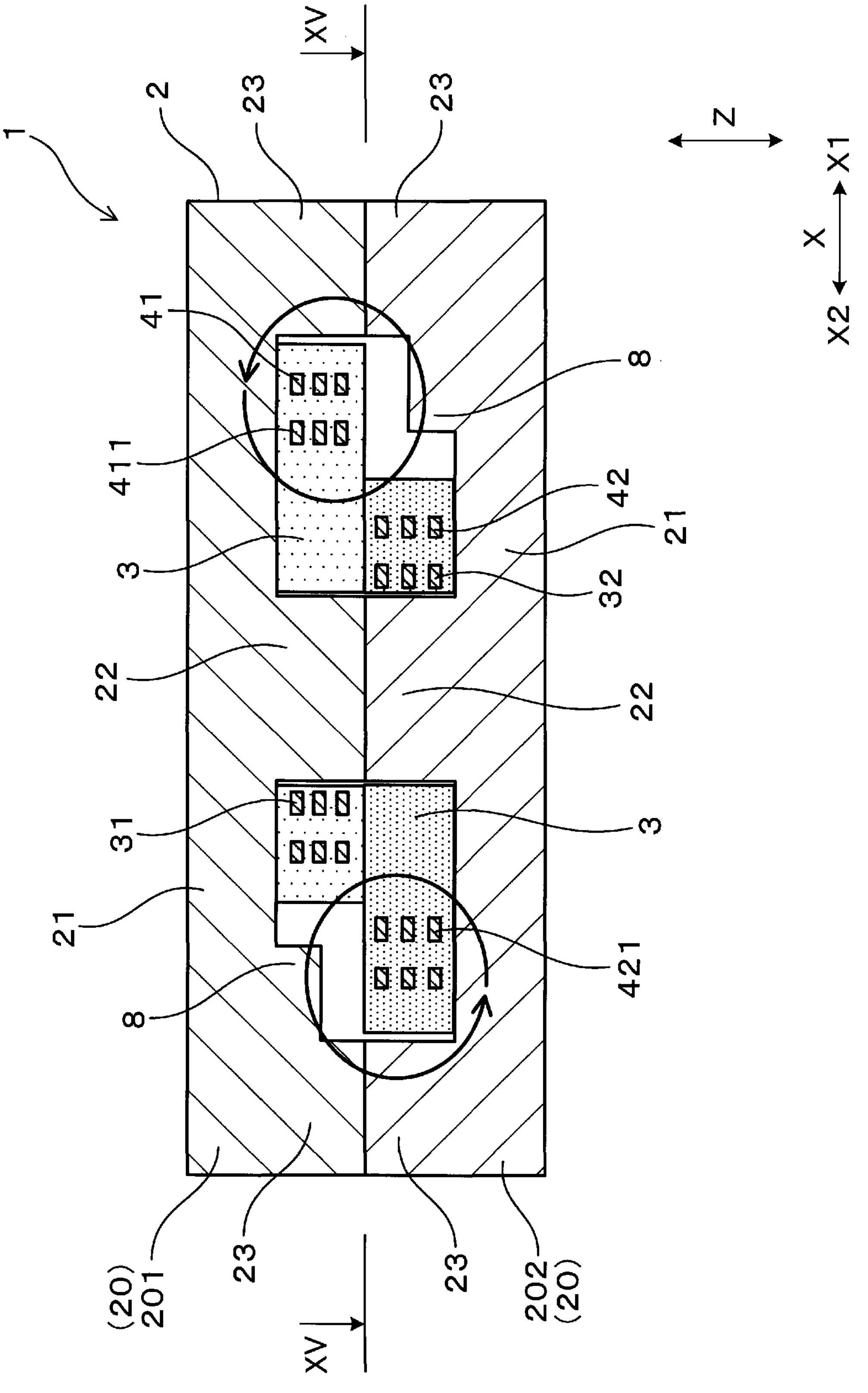
FIG. 14 a cross-sectional view of a magnetic component disposed parallel to a coil axial direction according to a fifth embodiment.
Figure 15:
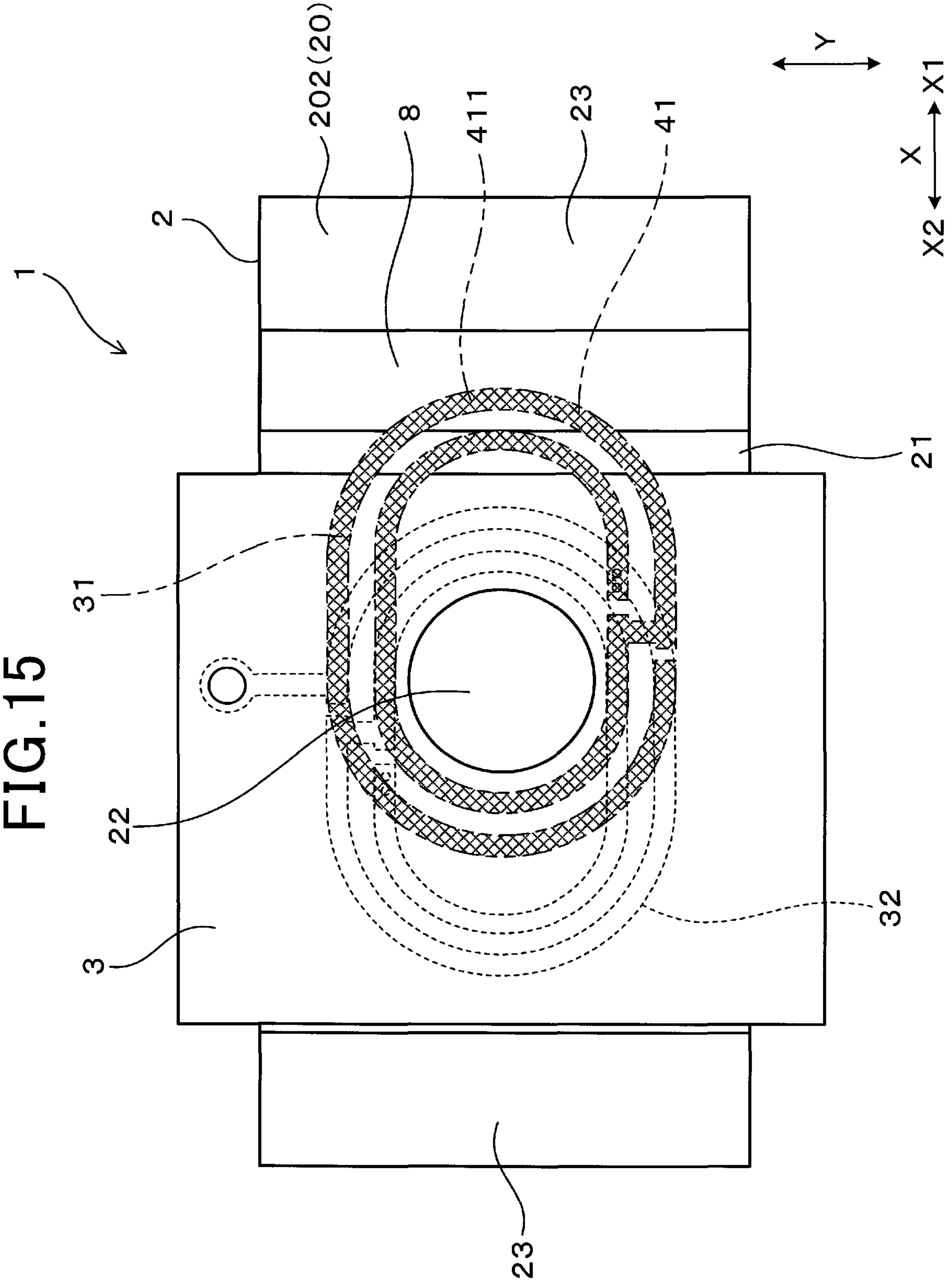
FIG. 15 is a cross-sectional view sectioned in XV-XV line shown in FIG. 14.

As shown in FIGS. 14 and 15, according to the present embodiment, the shape of the core 2 is modified compared to the first embodiment.

As shown in FIG. 14, in the present embodiment, the core 2 is further provided with a flux forming portion 8 in addition to the base portion 21, the inner leg portion 22 and the outer leg portions 23. The flux forming portion 8 is formed outside the inner leg portion 22 in the lateral direction X and inside the pair of outer leg portions 23 in the lateral direction X. The flux forming portion 8 is made of a material having a permeability higher than air.

According to the present embodiment, the flux forming portion 8 is formed in each divided core 20, and protruding in a direction the same as a direction in which the inner leg portion 22 and the outer leg portions 23 protrude from the base portion 21 in the coil axial direction Z. Each divided core 20 is provided with the base portion 21, the inner leg portion 22, the outer leg portion 23 and the flux forming portion 8 which are integrated therein.

As shown in FIG. 14, a first divided core 201, as the divided core 20 provided with the inner leg portion 22 inserted inside the first coil 31, includes the flux forming portion 8 in the X2 side of the first coil 31. The flux forming portion 8 of the first divided core 201 is formed to be adjacent to the outer leg portions 23 in the X2 side of the first divided core 201. The flux forming portion 8 of the first divided core 201 is formed to couple both the base portion 21 of the first divided core 201 and the outer leg portions 23 in the X2 side. Also, the flux forming portion 8 of the first divided core 201 is formed over substantially the entire base portion 21 of the first divided core 201 in the vertical direction Y.

The flux forming portion 8 of the first divided core 201 is formed at a portion overlapping, in the coil axial direction Z, with the second protruded region 421 of the second coil region 421 protruding in the X2 side from the first coil region 41.

Further, the length of the flux forming portion 8 of the first divided core 201 in the coil axial direction Z corresponds to a half-length or larger of each outer leg portion 23 of the first divided core 201. The length of the flux forming portion 8 of the first divided core 201 in the coil axial direction Z is set such that the longer the length, the closer to the second protruded portion 421. Hence, leakage flux around the second protruded region 421 can readily be secured. The flux forming portion 8 of the first divided core 201 is formed at a portion overlapping with the first coil 31 in the coil radial direction.

An end portion of the printed wiring board 3 in the X2 side provided inside the first divided core 201 is formed closer to the X1 side than the flux forming portion 8 of the first divided core 201 is positioned. That is, the printed wiring board 3 provided inside the first divided core 201 is disposed in a position avoiding the flux forming portion 8 of the first divided core 201.

As shown in FIGS. 14 and 15, the second divided core 202 as the divided core 20 provided with the inner leg portion 22 inserted inside the second coil 32 includes the flux forming portion 8 in the X1 side of the second coil 32. The flux forming portion 8 of the second divided core 202 is formed to be adjacent to the outer leg portions 23 in the X1 side of the second divided core 202. The flux forming portion 8 of the second divided core 202 is formed to couple both the base portion 21 of the second divided core 202 and the outer leg portions 23 in the X1 side. Also, the flux forming portion 8 of the second divided core 202 is formed over substantially the entire base portion 21 of the first divided core 201 in the vertical direction Y.

The flux forming portion 8 of the second divided core 202 is formed at a portion overlapping, in the coil axial direction Z, with the first protruded region 411 of the first coil region 41 protruding in the X1 side from the second coil region 42. Note that the outline of the first coil 31 when being projected in the coil axial direction Z is indicated by a two-dot chain line in FIG. 15.

As shown in FIG. 14, the height of the flux forming portion 8 of the second divided core 202 in the coil axial direction Z corresponds to a half-length or larger of each outer leg portion 23 of the second divided core 202. The length of the flux forming portion 8 of the second divided core 202 in the coil axial direction Z is set such that the longer the length, the closer to the first protruded portion 411. Hence, leakage flux around the first protruded region 411 can readily be secured. The flux forming portion 8 of the second divided core 202 is formed at a portion overlapping with the second coil 32 in the coil radial direction.

An end portion of the printed wiring board 3 in the X1 side provided inside the second divided core 202 is formed closer to the X2 side than the flux forming portion 8 of the second divided core 202 is positioned. That is, the printed wiring board 3 provided inside the second divided core 202 is disposed in a position avoiding the flux forming portion 8 of the second divided core 202. Other configurations are the same as those in the first embodiment.

According to the present embodiment, the flux forming portion 8 is provided between the pair of base portions 21 in the coil axial direction Z and between the pair of outer leg portions 23 in the lateral direction X. Hence, the leakage flux formed around the first protruded region 411 can be formed in the flux forming portion 8 of the second divided core 202, and the leakage flux formed around the second protruded region 421 can be formed in the flux forming portion 8 of the first divided core 201. Hence, leakage flux can readily be formed in the magnetic component 1 and function of a reactor can readily be accomplished.

Further, the flux forming portion 8 of the first divided core 201 is provided at a portion overlapping with the first coil 31 in the coil radial direction, and the flux forming portion 8 of the second divided core 202 is provided at a portion overlapping with the second coil 32 in the coil radial direction. In other words, the flux forming portion 8 has a certain amount of length in the coil axial direction Z. Hence, the flux forming portion 8 can readily be close to the first protruded region 411 or the second protruded region 412 so that leakage flux formed in the flux forming portion 8 can readily be secured.

The core 2 is provided with the base portion 21, the inner leg portion 22, the outer leg portion 23 and the flux forming portion 8 which are integrated therein.

Hence, the number of components as magnetic flux components can readily be reduced. In addition to this, effects and advantages similar to the first embodiment can be obtained.

Sixth Embodiment

Figure 16:
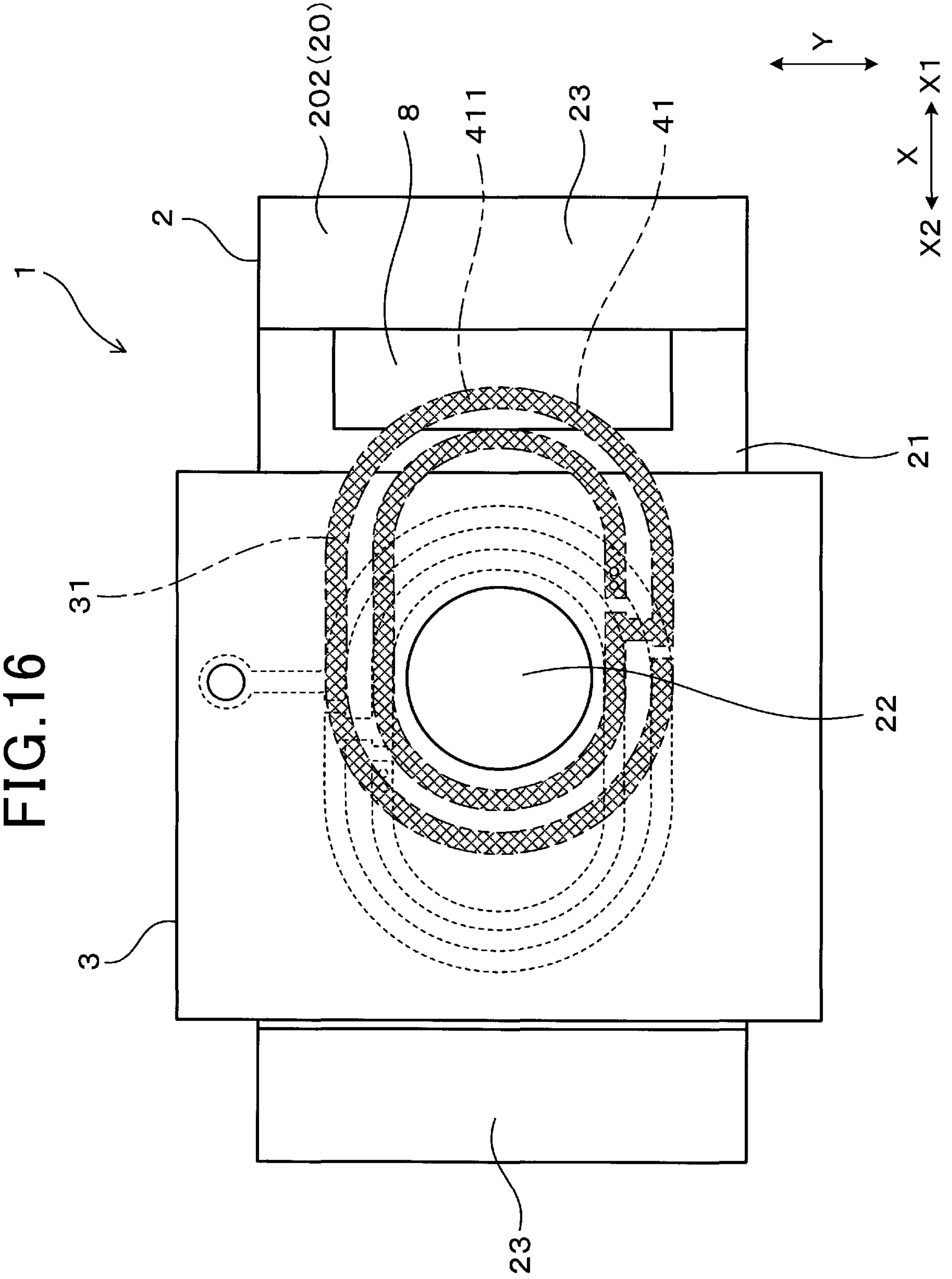
FIG. 16 is a diagram corresponding to FIG. 15 according to a sixth embodiment.

According to the present embodiment, as shown in FIG. 16, the configuration of the flux forming portion 8 is modified from the fifth embodiment.

The flux forming portion 8 is formed to be accommodated inside the base portion 21 of the divided core 20 in the vertical direction Y. That is, the length of the flux forming portion 8 in the vertical direction Y is shorter than the length in the vertical direction Y of the base portion 21 of the divided core 21 where the flux forming portion 8 is formed. Other configurations are the same as the fifth embodiment.

According to the present embodiment, effects and advantages similar to those in the fifth embodiment can be obtained.

Seventh Embodiment

Figure 17:
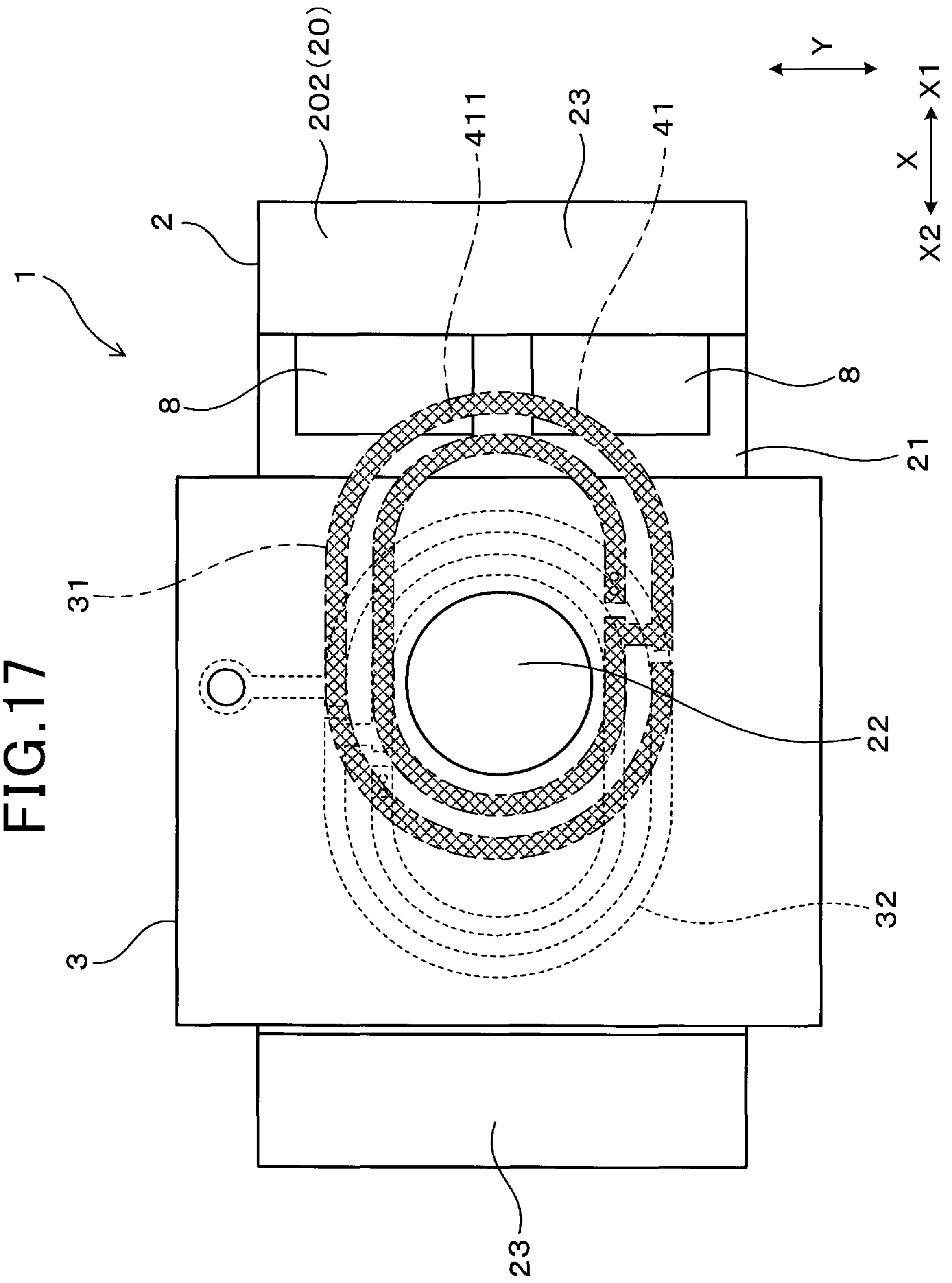
FIG. 17 is a diagram corresponding to FIG. 15 according to a seventh embodiment.

According to the present embodiment, as shown in FIG. 17, the configuration of the flux forming portion 8 is modified from the fifth embodiment.

The flux forming portion 8 is formed, in each divided core 20, to be divided into a plurality of portions in the vertical direction Y. According to the present embodiment, the flux forming portion 8 is formed in two regions of each divided core 20 in the vertical direction Y. Other configurations are the same as the fifth embodiment.

According to the present embodiment, effects and advantages similar to those in the fifth embodiment can be obtained.

Eighth Embodiment

Figure 18:
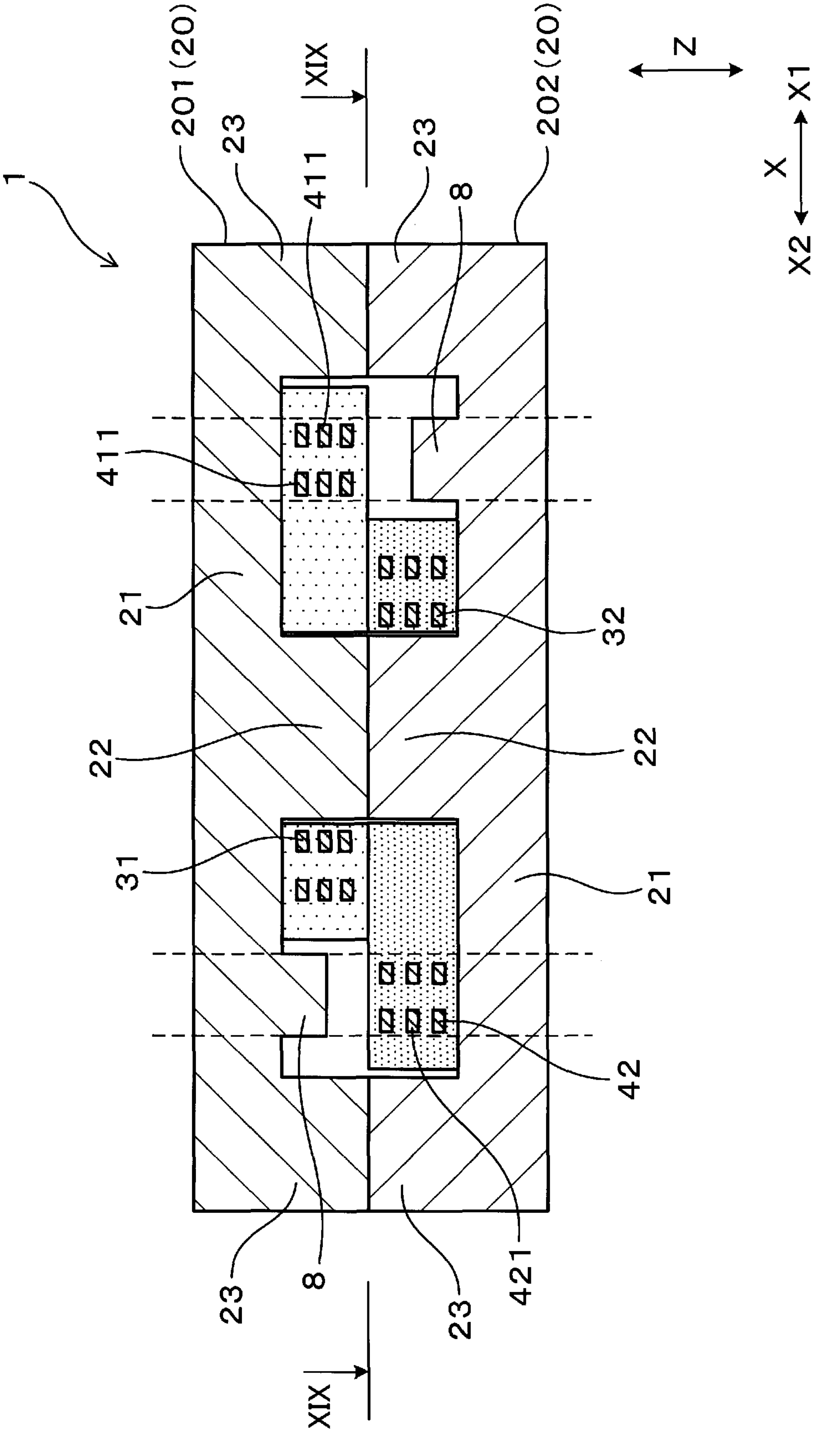
FIG. 18 is a cross-sectional view of a magnetic component disposed parallel to a coil axial direction according to an eighth embodiment.
Figure 19:
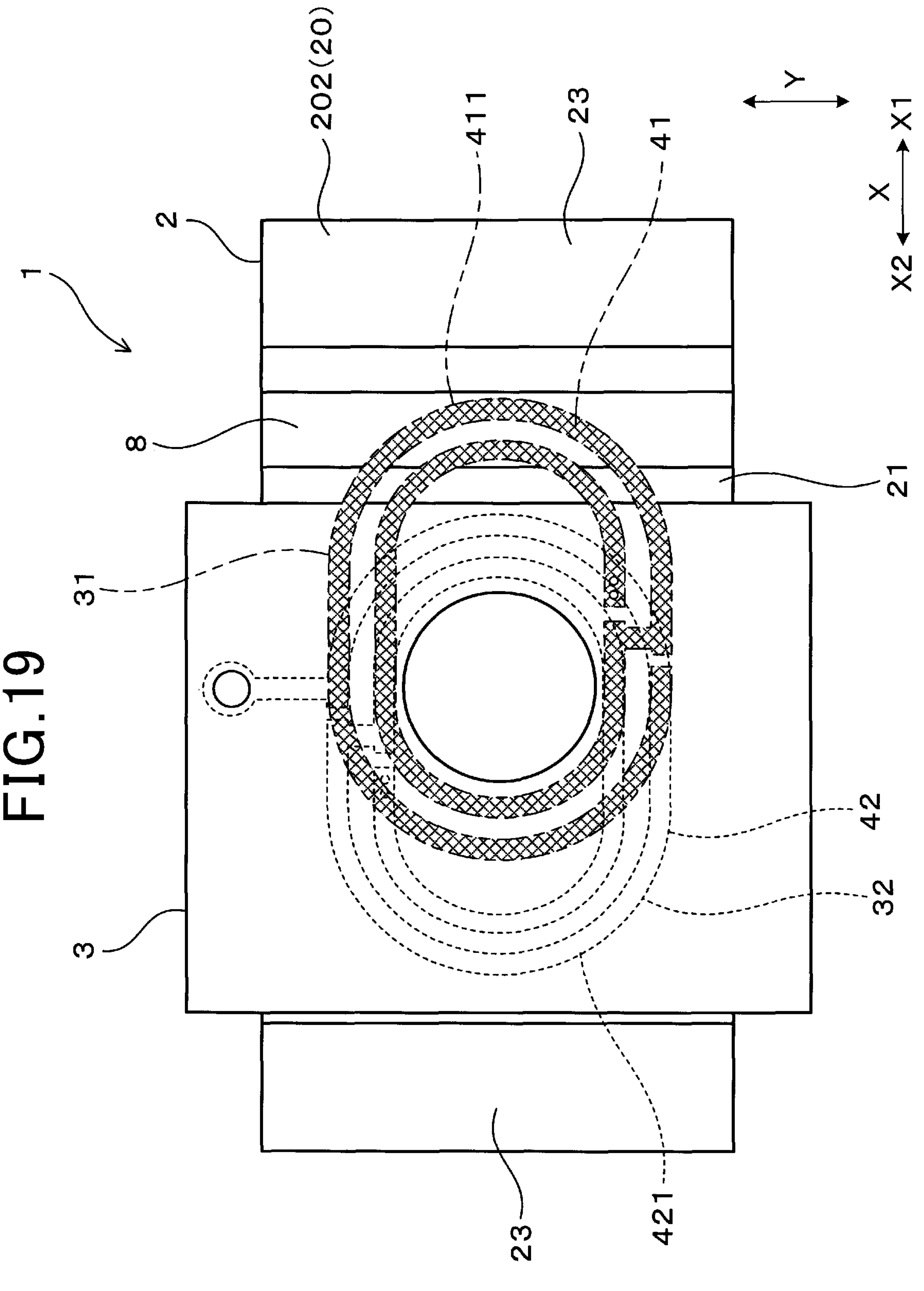
FIG. 19 is a cross-sectional view sectioned in XIX-XIX line shown in FIG. 18.

According to the present embodiment, as shown in FIGS. 18 and 19, the configuration of the flux forming portion 8 is modified from the fifth embodiment.

The flux forming portion 8 is formed in a portion apart from the outer leg portion 23 of the divided core 20 in the lateral direction X. Also, at least a part of a region in the first protruded region 411 of the first coil region 41 in the circumferential direction faces the flux forming portion 8 through the entire region from the inner periphery edge to the outer periphery edge in the coil radial direction. Similarly, at least a part of region in the second protruded region 421 of the second coil region 42 in the circumferential direction faces the flux forming portion 8 through the entire region from the inner periphery edge to the outer periphery edge in the coil radial direction. Other configurations are the same as the fifth embodiment.

According to the present embodiment, since an area of the overlapped region in the coil axial region between the flux forming portion 8 and the first protruded region 411 or the second protruded region 421 can be increased, leakage flux formed around the first protruded region 411 and the second protruded region 421 can be more secured. Hence, leakage flux can readily be formed in the magnetic component 1 and function of a reactor can readily be accomplished. According to the present embodiment, effects and advantages similar to those in the fifth embodiment can be obtained.

Ninth Embodiment

Figure 20:
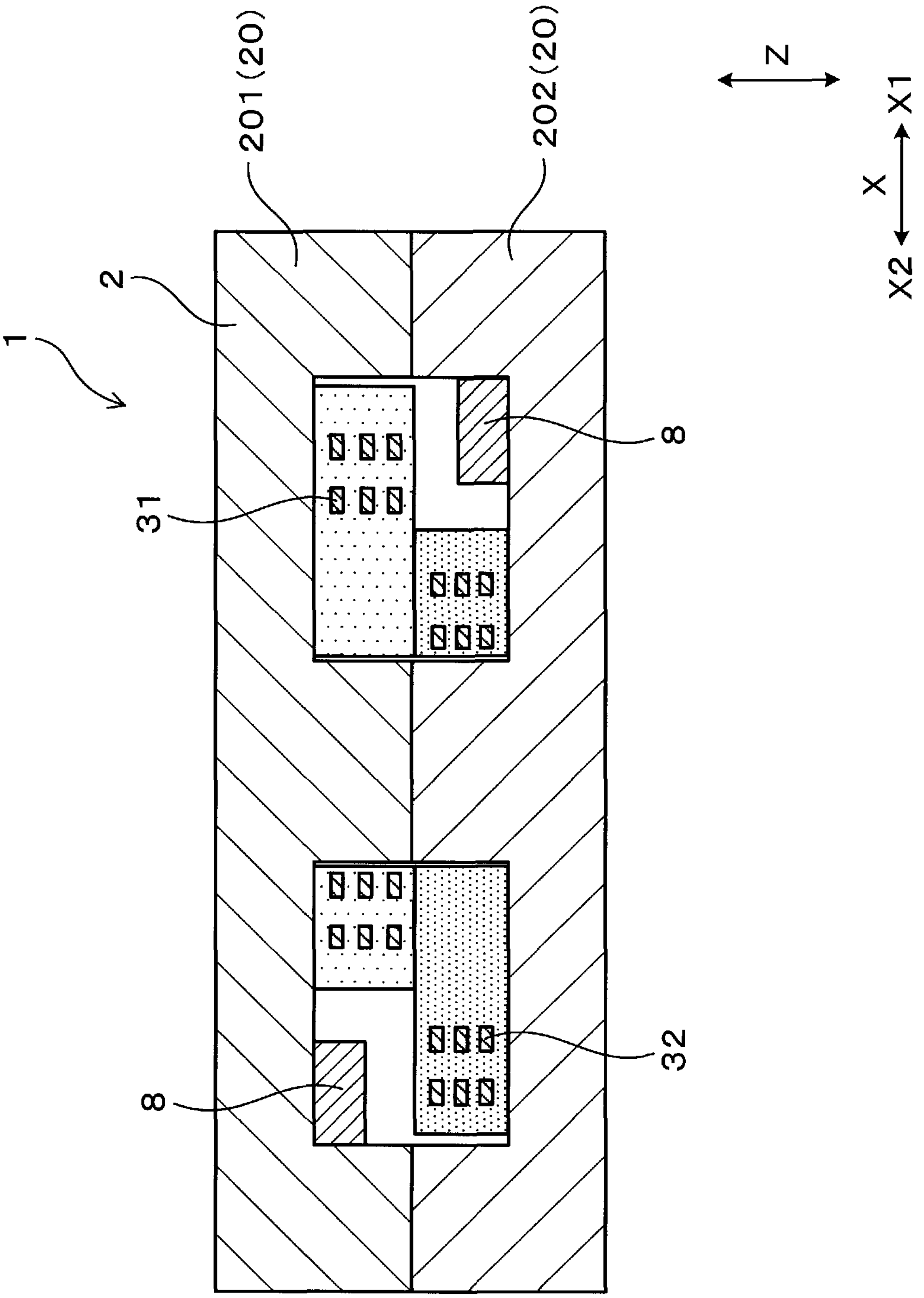
FIG. 20 a cross-sectional view of a magnetic component disposed parallel to a coil axial direction according to a ninth embodiment.

According to the present embodiment, as shown in FIG. 20, the flux forming portion 8 is formed separately from the core 2 while having a basic configuration similar to that of the fifth embodiment.

The flux forming portion 8 may be formed with the same material as that of the core 2, or may be formed with different material from that of the core 2. The flux forming portion 8 is fixed to the core 2 by bonding or adhesion. Other configurations are the same as the fifth embodiment.

According to the present embodiment, for a general existing core 2 having no flux forming portion 8, the flux forming portion 8 is formed separately from this core 2, whereby the flux forming portion 8 can be formed with the existing core 2. According to the present embodiment, effects and advantages similar to those in the fifth embodiment can be obtained.

Tenth Embodiment

Figure 21:
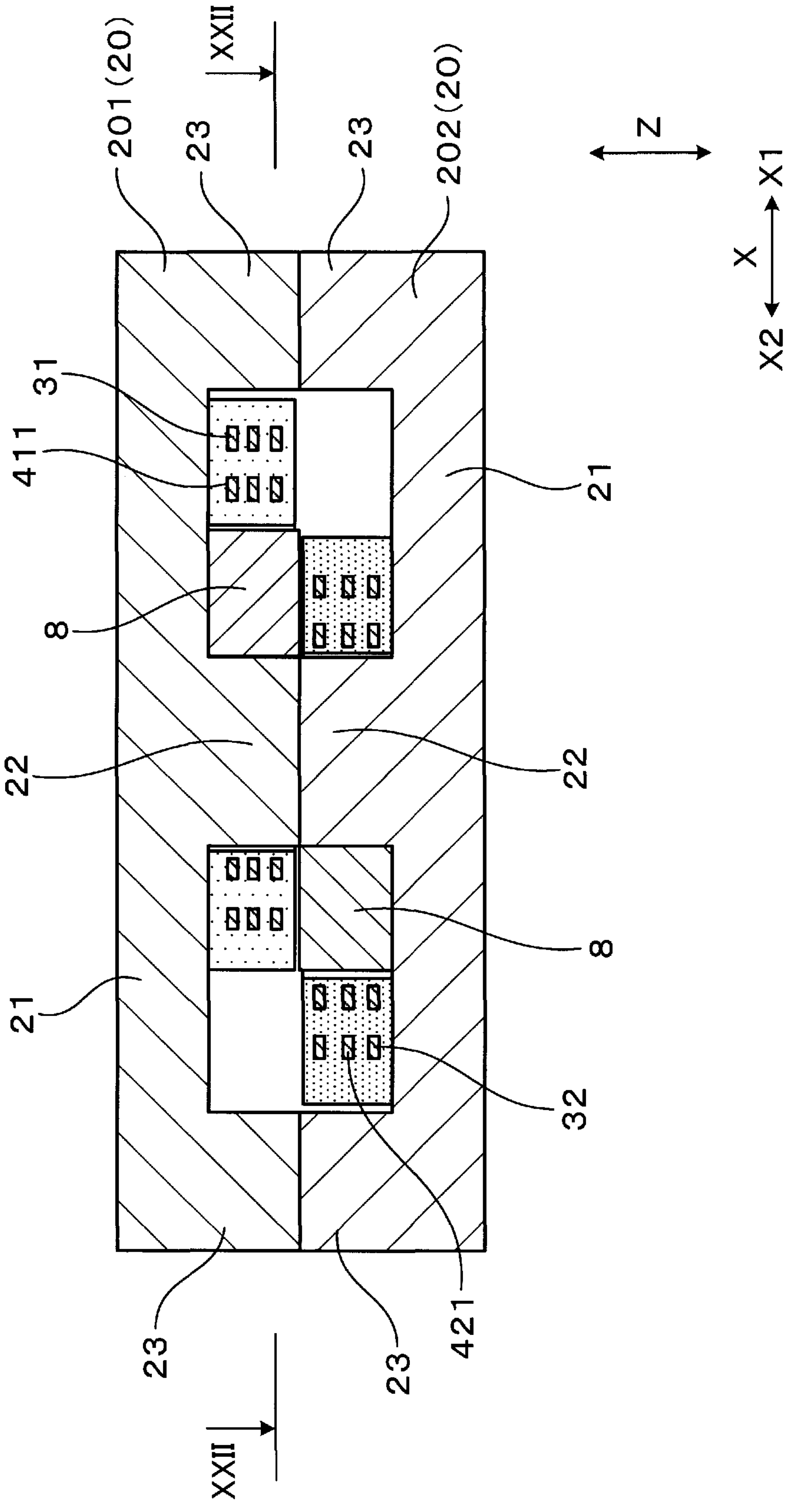
FIG. 21 a cross-sectional view of a magnetic component disposed parallel to a coil axial direction according to a tenth embodiment.
Figure 22:
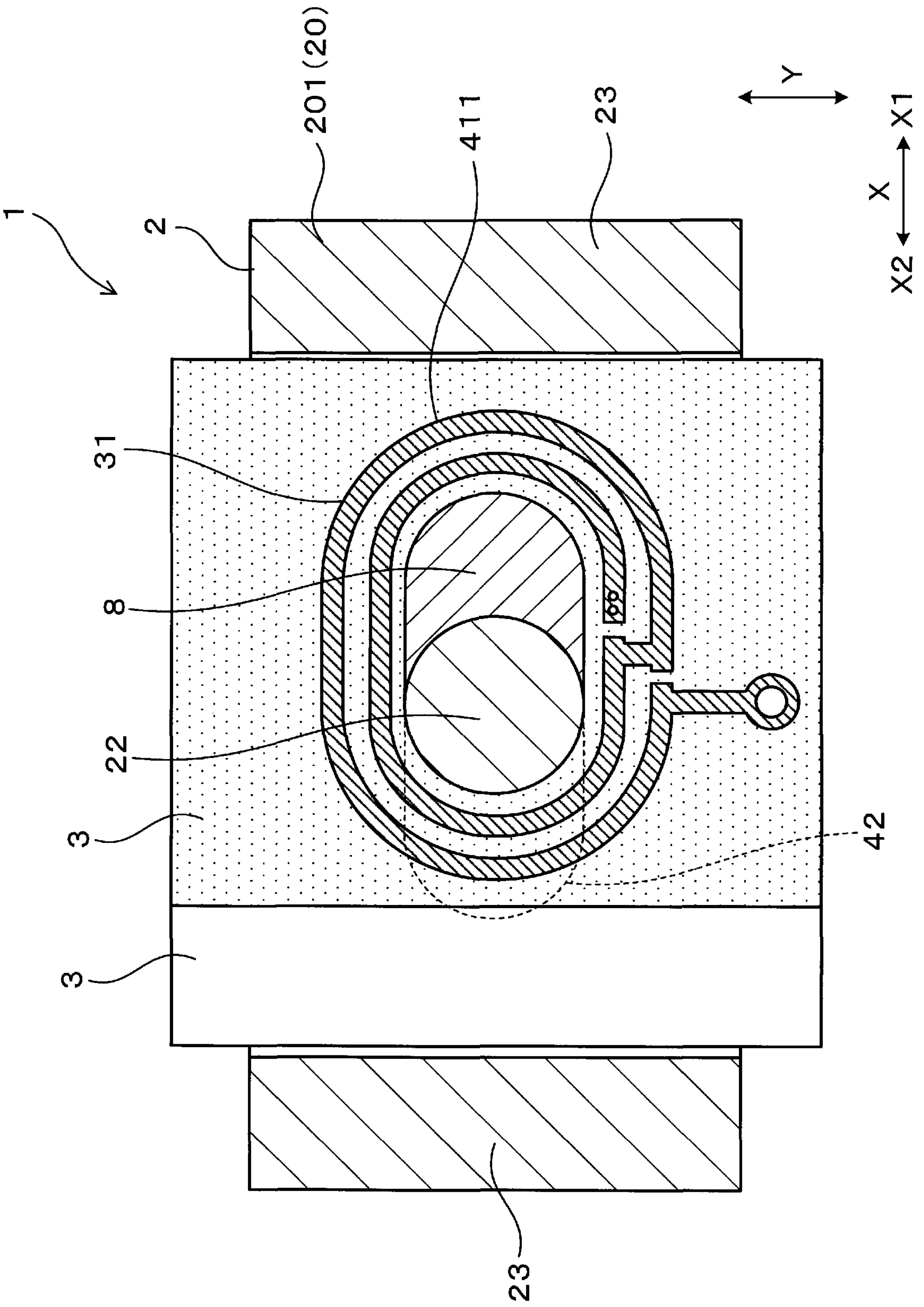
FIG. 22 is a cross-sectional view sectioned in XXII-XXII line shown in FIG. 21.

According to the present embodiment, as shown in FIGS. 21 and 22, the flux forming portion 8 is formed separately from the core 2 while having a basic configuration similar to that of the first embodiment.

According to the present embodiment, the flux forming portion 8 is provided for each of the inner periphery side of the first coil 31 and the inner periphery side of the second coil 32.

The flux forming portion 8 in the inner periphery side of the first coil 31 is provided to be adjacent to the X1 side of the inner leg portion 22 of the first divided core 201. An outer periphery portion of the flux forming portion 8 in the inner periphery side of the first coil 31 is formed along the inner periphery edge of the first coil 31 and the inner leg portion 22 of the first divided core 201. Thus, the portion in the X1 side of the flux forming portion 8 of the first coil 31 is disposed in the vicinity of the first protruded region 411. Further, as shown in FIG. 21, the length in the coil axial direction Z of the flux forming portion 8 in the inner periphery side of the first coil 31 is similar to the length in the coil axial direction Z of the inner leg portion 22 of the first divided core 201.

The flux forming portion 8 in the inner periphery side of the second coil 32 is provided to be adjacent to the X2 side of the inner leg portion 22 of the second divided core 202. An outer periphery portion of the flux forming portion 8 in the inner periphery side of the second coil 32 is formed along the inner periphery edge of the second coil 32 and the inner leg portion 22 of the second divided core 202. Thus, the flux forming portion 8 in the inner periphery side of the second coil 32 is disposed in the vicinity of the second protruded region 421. Further, the length in the coil axial direction Z of the flux forming portion 8 in the inner periphery side of the first coil 31 is similar to the length in the coil axial direction Z of the inner leg portion 22 of the second divided core 202. Other configurations are the same as the fifth embodiment.

According to the present embodiment, the flux forming portion 8 can be disposed in a region in the vicinity of the X2 side of the first protruded region 411 and a region in the vicinity of the X1 side of the second protruded region 421. Hence, the leakage flux formed around the first protruded region 411 and the second protruded region 421 can readily be more secured. Hence, leakage flux can readily be formed in the magnetic component 1 and function of a reactor can readily be accomplished. According to the present embodiment, effects and advantages similar to those in the fifth embodiment can be obtained.

Eleventh Embodiment

Figure 23:
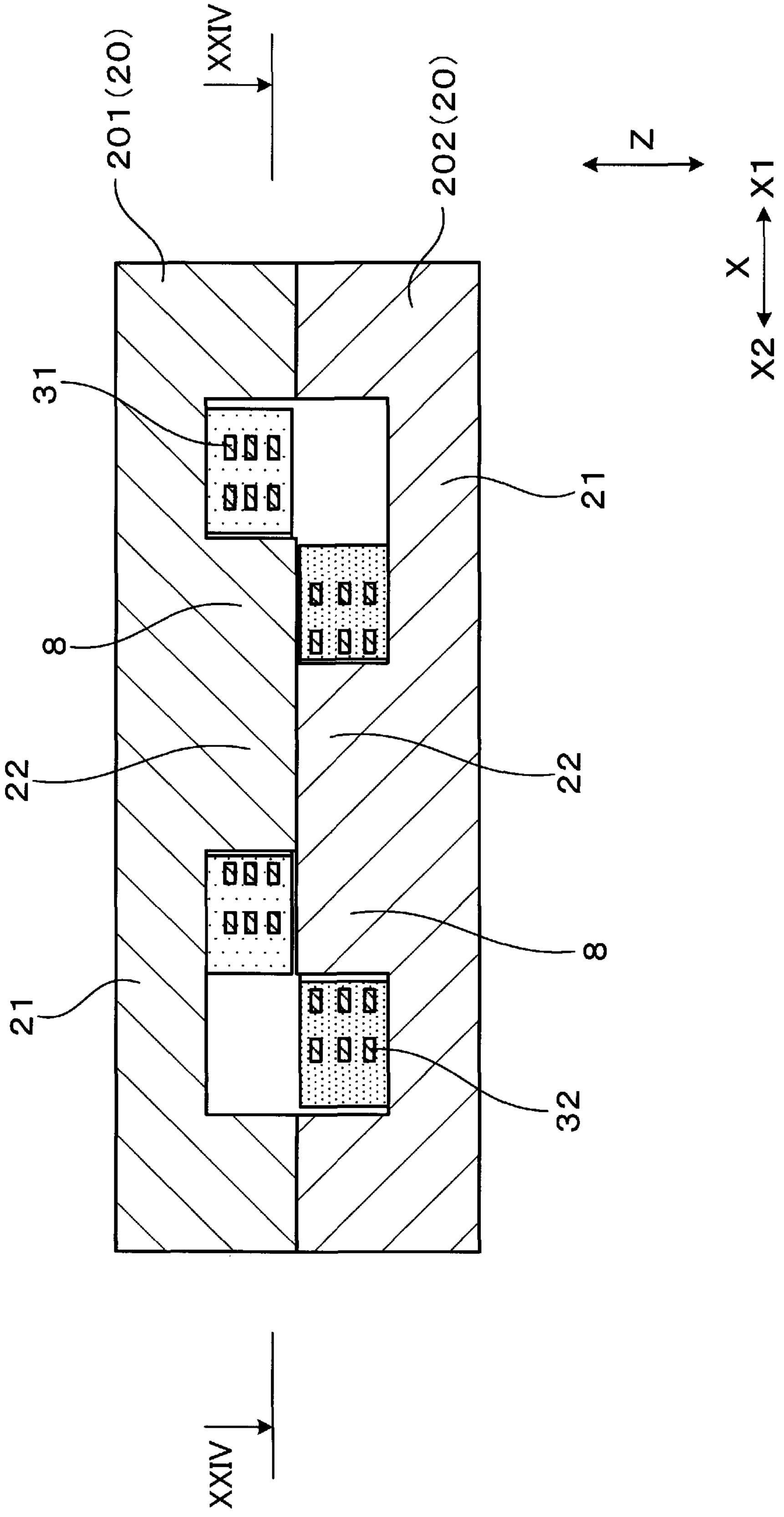
FIG. 23 is a cross-sectional view of a magnetic component disposed parallel to a coil axial direction according to an eleventh embodiment.
Figure 24:
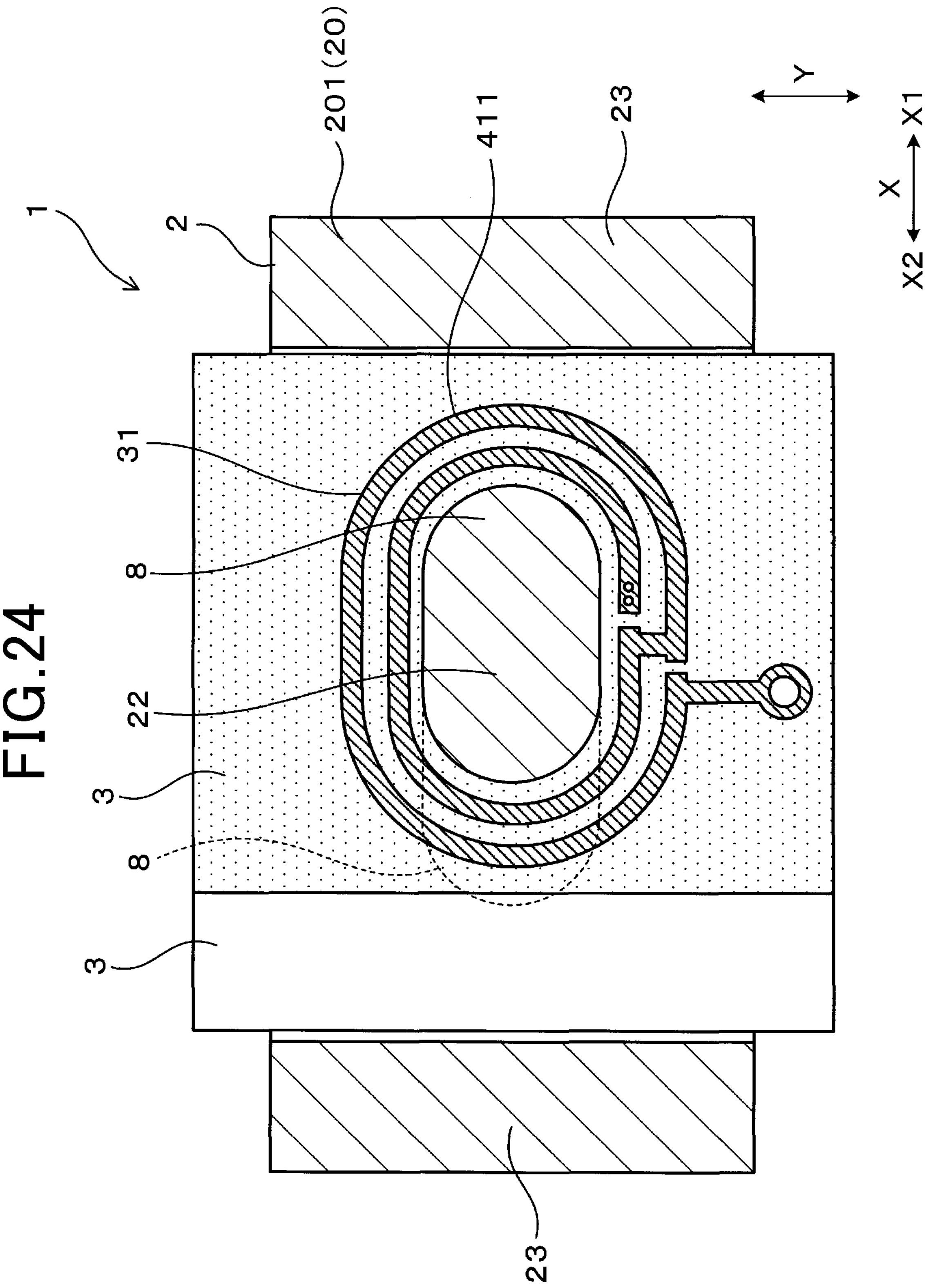

According to the present embodiment, as shown in FIGS. 23 and 24, the flux forming portion 8 is formed integrally with the core 2 while having a basic configuration similar to that of the tenth embodiment.

The first divided core 201 includes the flux forming portion 9 extended in the X1 side from the inner leg portion 22. As described above, the inner leg portion 22 is a portion disposed at an inner periphery side of both the first coil 31 and the second coil 32 when viewed from the coil axial direction Z. In the first divided core 201, a surface opposite to the base portion 21 in the inner leg portion 22 and the flux forming portion 8 is formed flat on one face. When viewed from the coil axial direction Z, in the first divided core 201, the inner leg portion 22 and the flux forming portion 8 is formed in a rounded rectangular shape (i.e. racetrack shape) as being along the inner periphery surface of the first coil 31.

The second divided core 202 has the same shape as that of the first divided core 201. When viewed from the coil axial direction Z, in the second divided core 202, the inner leg portion 22 and the flux forming portion 8 are formed in a rounded rectangular shape (i.e. racetrack shape) as being along the inner periphery surface of the second coil 32. Other configurations are the same as the tenth embodiment.

According to the present embodiment, since the flux forming portion 8 and the divided core 20 are integrally formed, the number of components as flux components can readily be reduced. According to the present embodiment, effects and advantages similar to those in the tenth embodiment can be obtained.

Twelfth Embodiment

Figure 25:
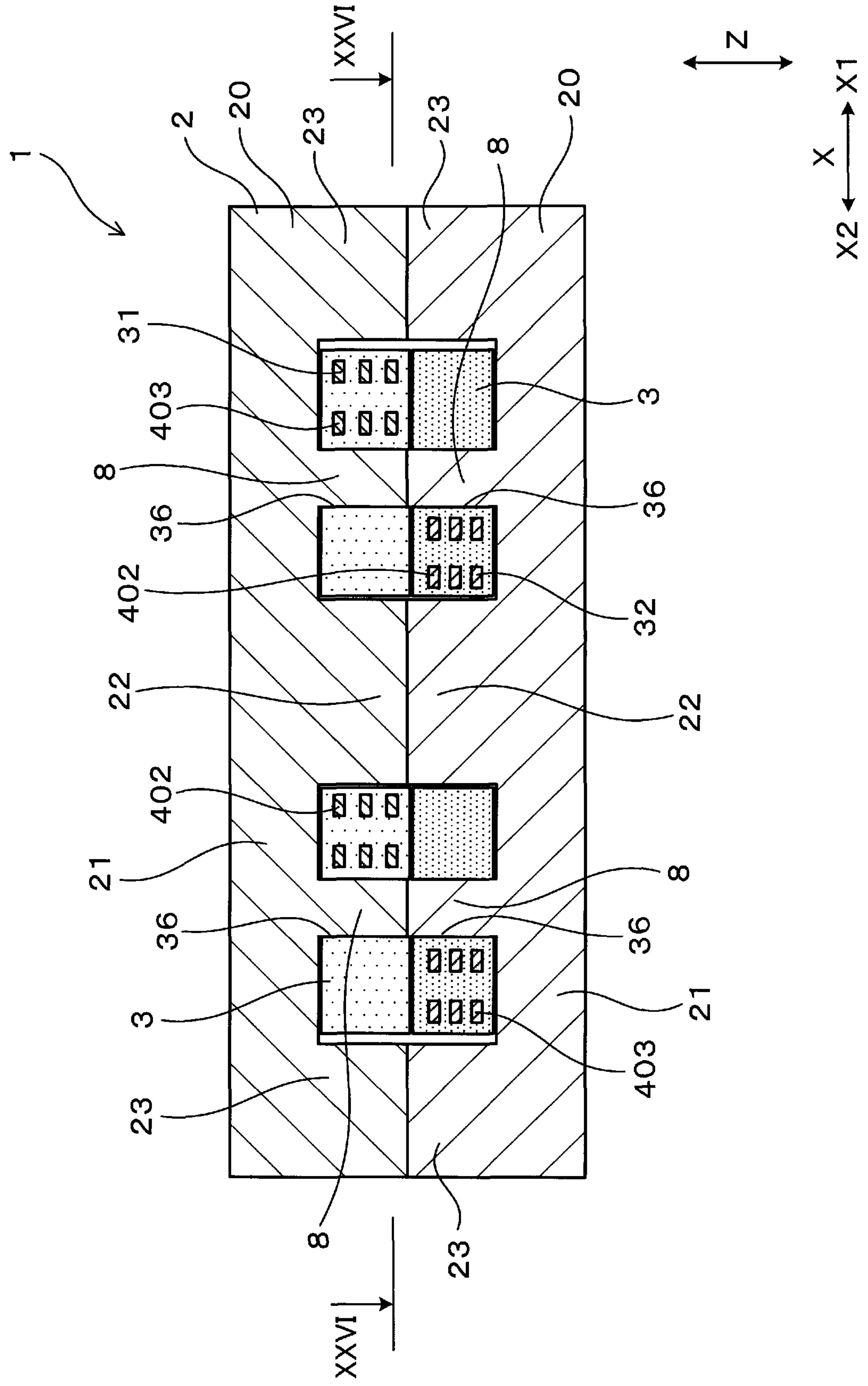
FIG. 25 is a cross-sectional view of a magnetic component disposed parallel to a coil axial direction according to a twelfth embodiment.
Figure 26:
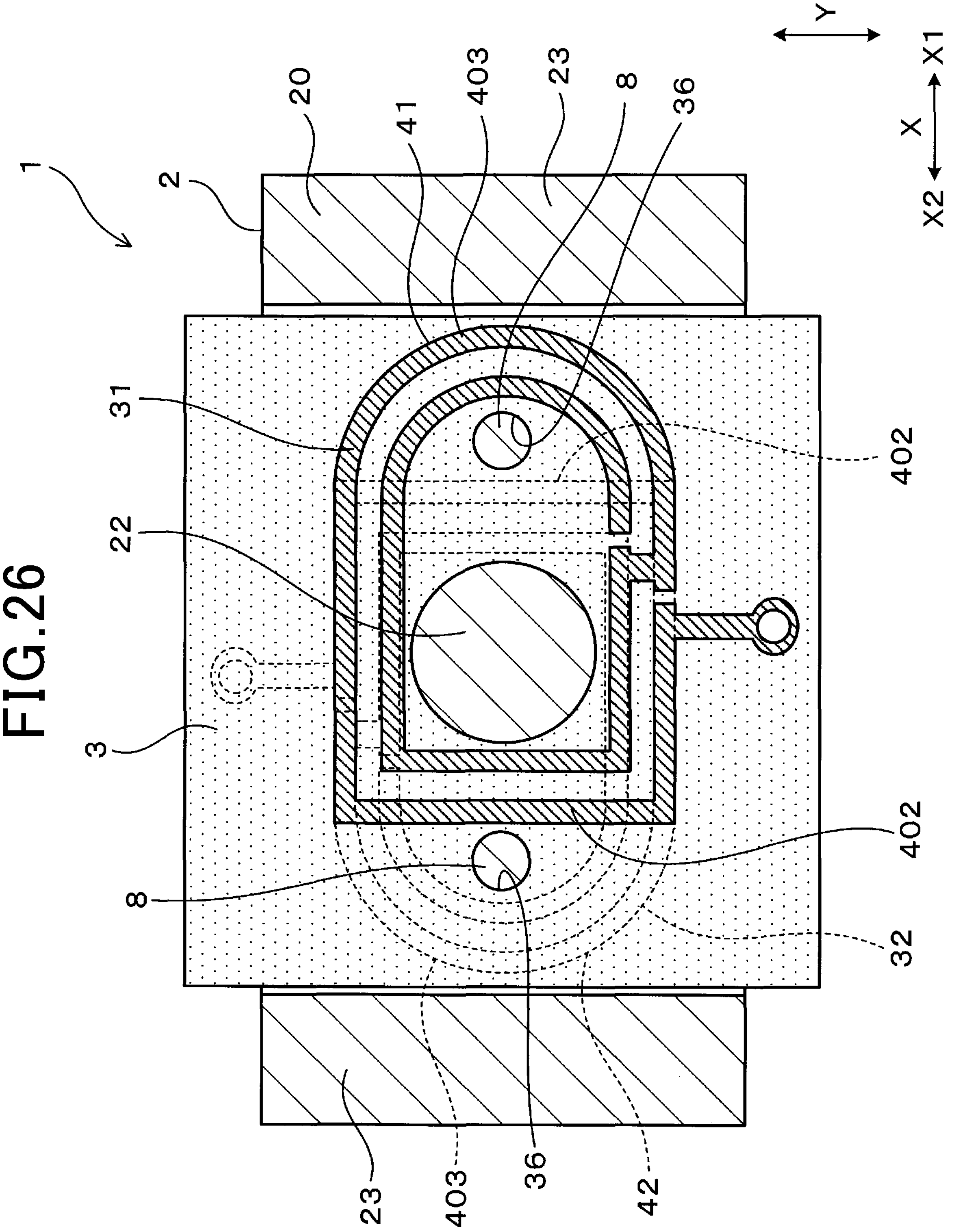
FIG. 26 is a cross-sectional view sectioned in XXVI-XXVI line shown in FIG. 25.

According to the present embodiment, as shown in FIGS. 25 and 26, the flux forming portion 8 is provided in the inner periphery side and the outer periphery side of the first coil 31 and the inner periphery side and the outer periphery side of the second coil 32 while the basic configuration of the first coil 31 and the second coil 32 are similar to those in the second embodiment.

As shown in FIG. 26, each flux forming portion 8 shows a columnar shape having a circular cross-sectional shape sectioned along a line orthogonal to the coil axial direction Z. As shown in FIGS. 25 and 26, each divided core 20 has a flux forming portion 8 at two positions. In each divided core 20, one flux forming portion 8 is formed between each inner leg portion 22 and one outer leg portion 23 in the lateral direction X, and the other flux forming portion 8 is formed between the inner leg portion 22 and the other outer leg portion 23 in the lateral direction X.

In the two divided cores 20, two flux forming portions 8 formed in the X1 side of respective inner leg portions 22 are formed at a portion where the two flux forming portions 8 are overlapped with each other in the coil axial direction Z. In the two divided cores 20, two flux forming portions 8 formed in the X1 side of respective inner leg portions 22 are formed in a region between the protruded region 403 of the first coil region 41 and the second linear region 402 of the second coil 42 when viewed from the coil axial direction Z. According to the present embodiment, when viewed from the coil axial direction Z, the whole protruded region 403 of the first coil region 41 is positioned in the X1 side with respect to the second linear region 402 of the second coil 32. In the two divided cores 20, two flux forming portions 8 formed in the X2 side of respective inner leg portions 22 are formed at a portion where the two flux forming portions 8 are overlapped with each other in the coil axial direction Z. In the two divided cores 20, two flux forming portions 8 formed in the X2 side of respective inner leg portions 22 are formed in a region between the protruded region 403 of the second coil region 42 and the second linear region 402 of the first coil 41 when viewed from the coil axial direction Z. According to the present embodiment, when viewed from the coil axial direction Z, the whole protruded region 403 of the second coil region 42 is positioned in the X2 side with respect to the second linear region 402 of the first coil region 41.

The printed wiring board 3 includes a through hole 36 for inserting the flux forming portion 8. The flux forming portion 8 is inserted into the through hole 36. Then, two upper and lower flux forming portions 8 formed in the X1 side of the inner leg portion 22 in the core 2 come into contact with each other on an surface opposite to the base portion 21 or approach to face each other. Similarly, two upper and lower flux forming portions 8 formed in the X2 side of the inner leg portion 22 come into contact with each other on an surface opposite to the base portion 21 or approach to face each other.

Other configurations in the flux forming portion 8 are the same as those in the fifth embodiment, and other configurations are the same as those in the second embodiment.

According to the present embodiment, effects and advantages similar to those in the second embodiment and the fifth embodiment can be obtained.

Thirteenth Embodiment

Figure 27:
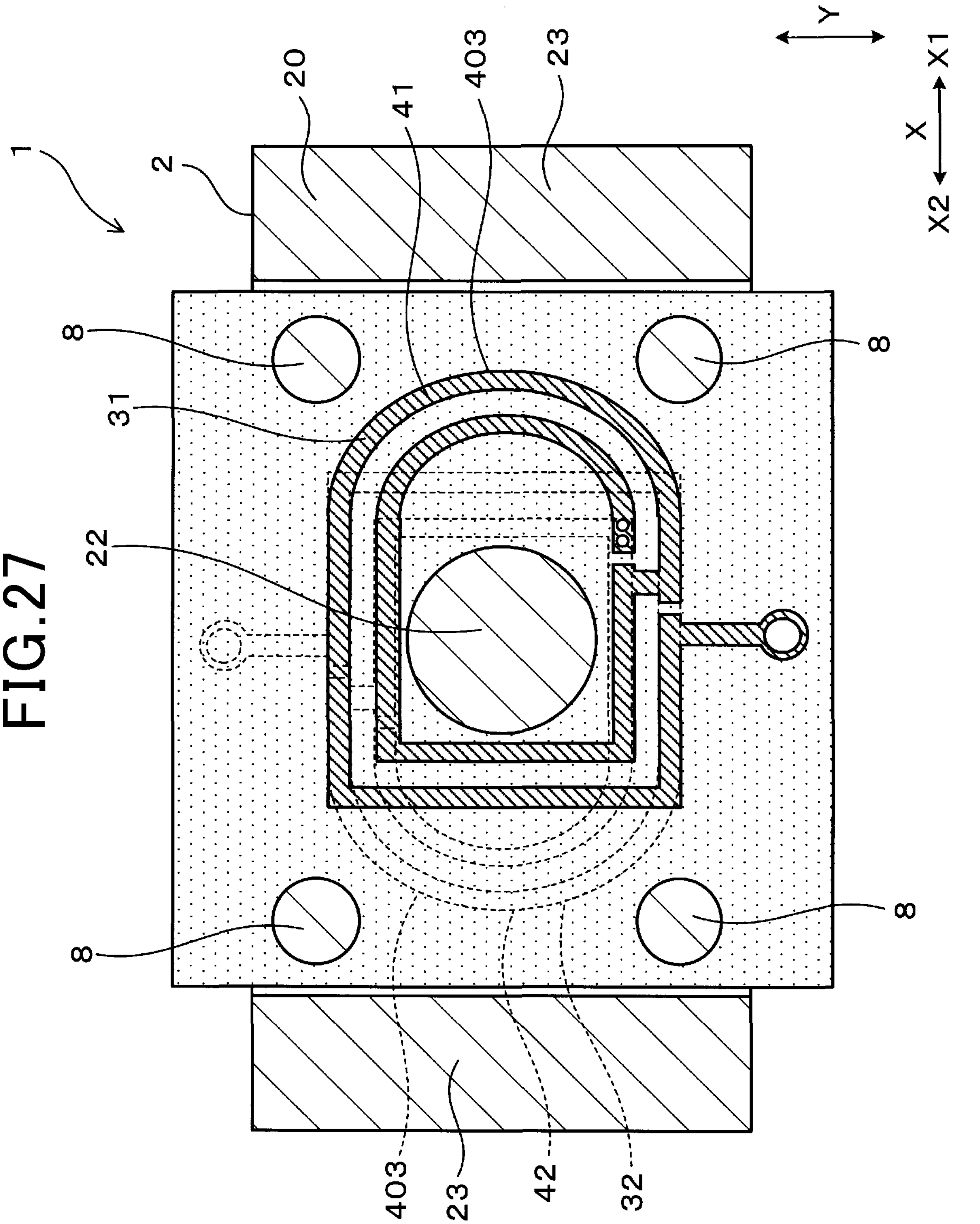
FIG. 27 is a diagram corresponding to FIG. 26 according to a thirteenth embodiment.

According to the present embodiment, as shown in FIG. 27, position at which the flux forming portion 8 is formed is changed from the twelfth embodiment.

Four flux forming portions 8 are formed in each divided core 20. When viewed from the coil axial direction Z, two flux forming portions 8 in each divided core 20 are provided in the vicinity of the X1 side outer leg portion 23, and other two flux forming portions 8 are provided in the vicinity of the X2 side outer leg portion 23.

In each divided core 20, the two X1 side flux forming portions 8 are provided in the vicinity of the outer periphery side of the protruded region 403 of the first coil region 41. Also, in each divided core 20, the two flux forming portions 8 are provided in the vicinity of the outer periphery side of the protruded region 403 of the second coil region 42.

In each divided core 20, the two X1 side flux forming portions 8 are provided in the vicinity of both end portions in the vertical direction Y of the base portion 21. Moreover, in each divided core 20, the two X2 side flux forming portions 8 are formed in the vicinity of both end portions in the vertical direction Y of the base portion 21.

The flux forming portion 8 is not formed in the inner periphery side of the first coil 31 and the inner periphery side of the second coil 32 when viewed from the coil axial direction Z. Other configurations are the same as the twelfth embodiment.

According to the present embodiment, effects and advantages similar to those in the twelfth embodiment can be obtained.

Fourteenth Embodiment

Figure 28:
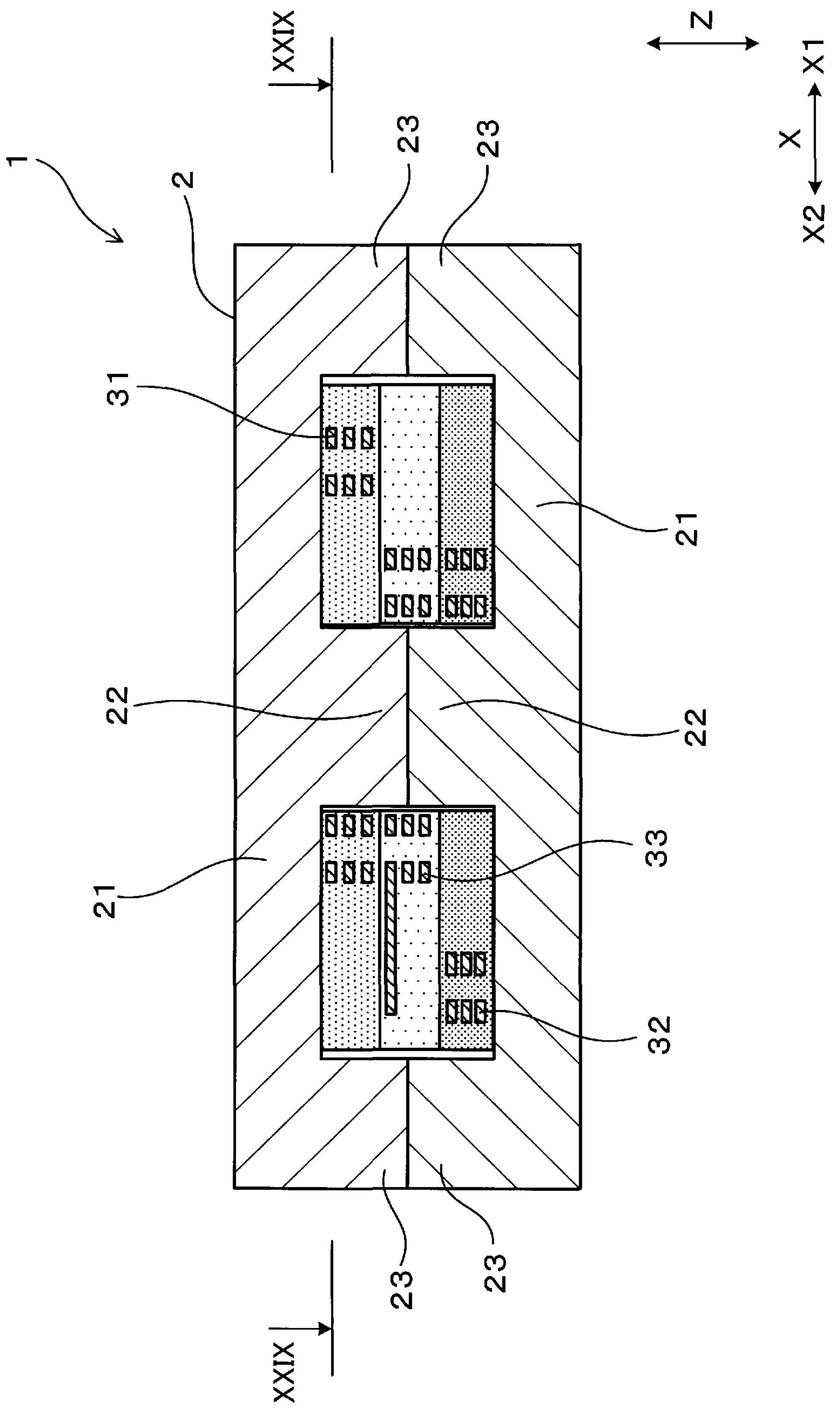
FIG. 28 is a cross-sectional view of a magnetic component disposed parallel to a coil axial direction according to a fourteenth embodiment.
Figure 29:
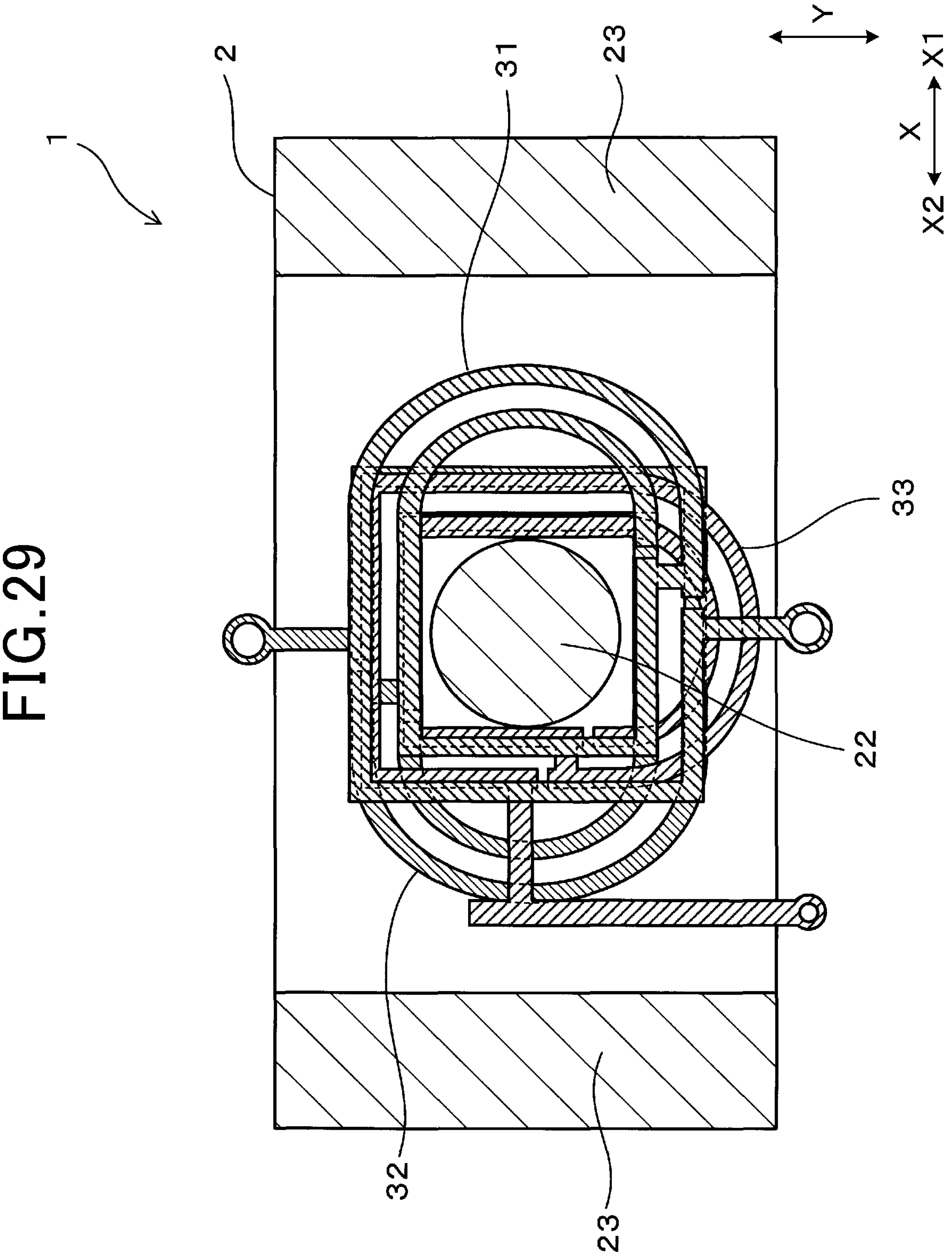
FIG. 29 is a cross-sectional view sectioned in XXIX-XXIX line shown in FIG. 28 showing a core, a first coil, a second coil and a third coil.
Figure 30:
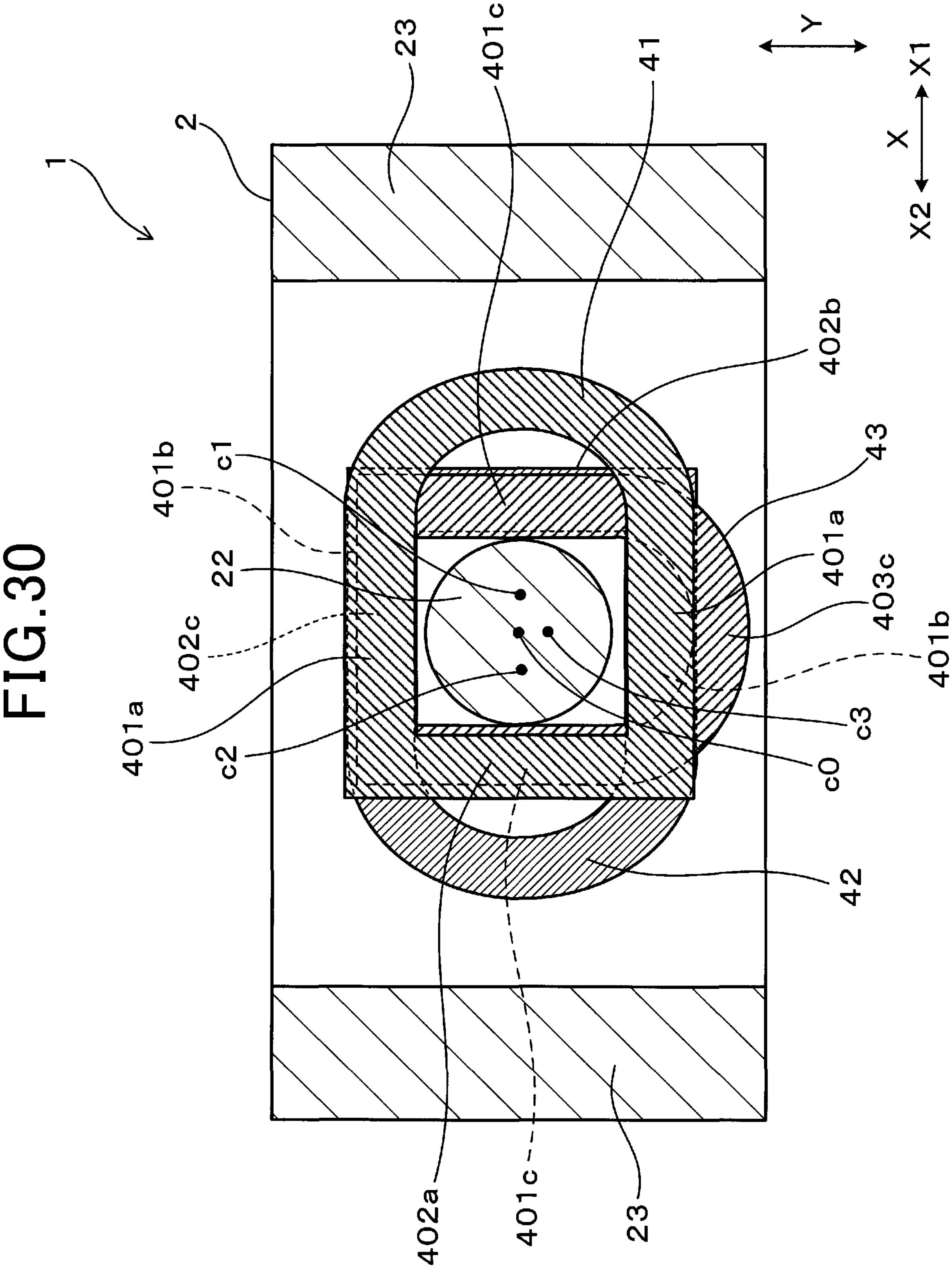
FIG. 30 is the cross-sectional view the same as that of FIG. 29, showing a core, a first coil region, a second coil region and a third coil region.

According to the present embodiment, as shown in FIGS. 28 to 30, the magnetic component 1 is provided with a third coil 33 in addition to the first coil 31 and the second coil 32 while the basic configuration of the first coil 31 and the second coil 32 are similar to those in the second embodiment.

As shown in FIG. 28, the third coil 33 is provided between the first coil 31 and the second coil 32 in the coil axial direction Z. According to the present embodiment, the first coil 31, the second coil 32 and the third coil 33 have substantially the same shape and are provided such that the postures thereof in the coil circumferential direction are mutually different. The postures of the first coil 31 and the second coil 32 are the same as those in the second embodiment. Also, for respective name of portions in the third coil 33, the same name as those in the first coil 31 and the second coil 32 having similar configuration are used.

When viewed from the coil axial direction Z, a region of the third coil 33 from an inner periphery edge to an outer periphery edge in the coil radial direction is defined as a third coil region 43. As shown in FIG. 30, a pair of first linear regions 401*c* of the third coil region 43 is formed along the vertical direction Y and facing with each other in the lateral direction Y. The second linear region 402*c* of the third coil region 43 couples one end portions in the vertical direction Y of the pair of first linear regions 401*c* straight in the lateral direction X. Then, the protruded region 403*c* of the third coil region 43 couples the other end portions in the vertical direction Y which is opposite to the second linear region 402*c* side of the pair of first linear region 401*c*, and is protruded towards opposite side of the second linear region 402*c*.

When viewed from the coil axial direction Z, a third gravity-center c3 defined as a center of gravity of a two-dimensional figure formed in the inner periphery side of the third coil 33 is provided close to a portion where the protruded region 403 of the third coil region 43 is positioned, relative to the inner leg gravity-center c0 in the vertical direction Y. In other words, the third coil 33 is eccentric towards one side in the vertical direction Y with respect to the inner leg portion 22.

When viewed from the coil axial direction Z, the first gravity-center c1, the second gravity-center c2 and the third gravity-center c3 are provided at mutually different positions. In other words, the first coil 31, the second coil 32 and the third coil 33 are at mutually eccentric positions. Further, when viewed from the coil axial direction Z, the first gravity-center c1 side, the second gravity-center c2 side and the third gravity center c3 side are mutually different with respect to the inner leg gravity-center c0.

The second linear region 402 of the third coil region 43 is provided at a portion overlapping with the first linear region 401*a* of the first coil region 41 and the first linear region

401*b* of the second coil region 42 in the coil axial direction Z. The first linear region 401*c* in the X1 side of the third coil region 43 is provided at a portion overlapping with the second linear region 402*b* of the second coil region 42 in the coil axial direction Z, and the first linear region 401*c* in the X2 side of the third coil 43 is provided at a portion overlapping with the second linear region 402*b* of the first coil region 41.

The third coil region 43 does not have a portion not overlapping with the first coil region 41 or the second coil region 42 in the coil axial direction Z in a region from the inner periphery edge to the outer periphery edge in the coil radial direction. That is, the third coil 33 is not the above-described specific coil. However, the third coil 33 may be configured to be the specific coil. Other configurations are the same as the second embodiment.

According to the present embodiment, the third gravity-center c3 with respect to the inner leg gravity-center c0 is provided in a different side from both of the first gravity center c1 side with respect to the inner leg gravity-center c0 and the second gravity-center c2 side with respect to the inner leg gravity-center c0. Hence, leakage flux is likely to be formed also around the protruded region 403*c* in the third coil region 43. According to the present embodiment, although the third coil region 43 does have a portion not overlapping with the first coil region 41 or the second coil region 42 in the coil axial direction Z in a region from the inner periphery edge to the outer periphery edge in the coil radial direction, the first coil 31, the second coil 32 and the third coil 33 are provided at mutually eccentric portions, whereby the leakage flux is likely to be formed around a part of the third coil. According to the present embodiment, effects and advantages similar to those in the second embodiment can be obtained.

Fifteenth Embodiment

Figure 31:
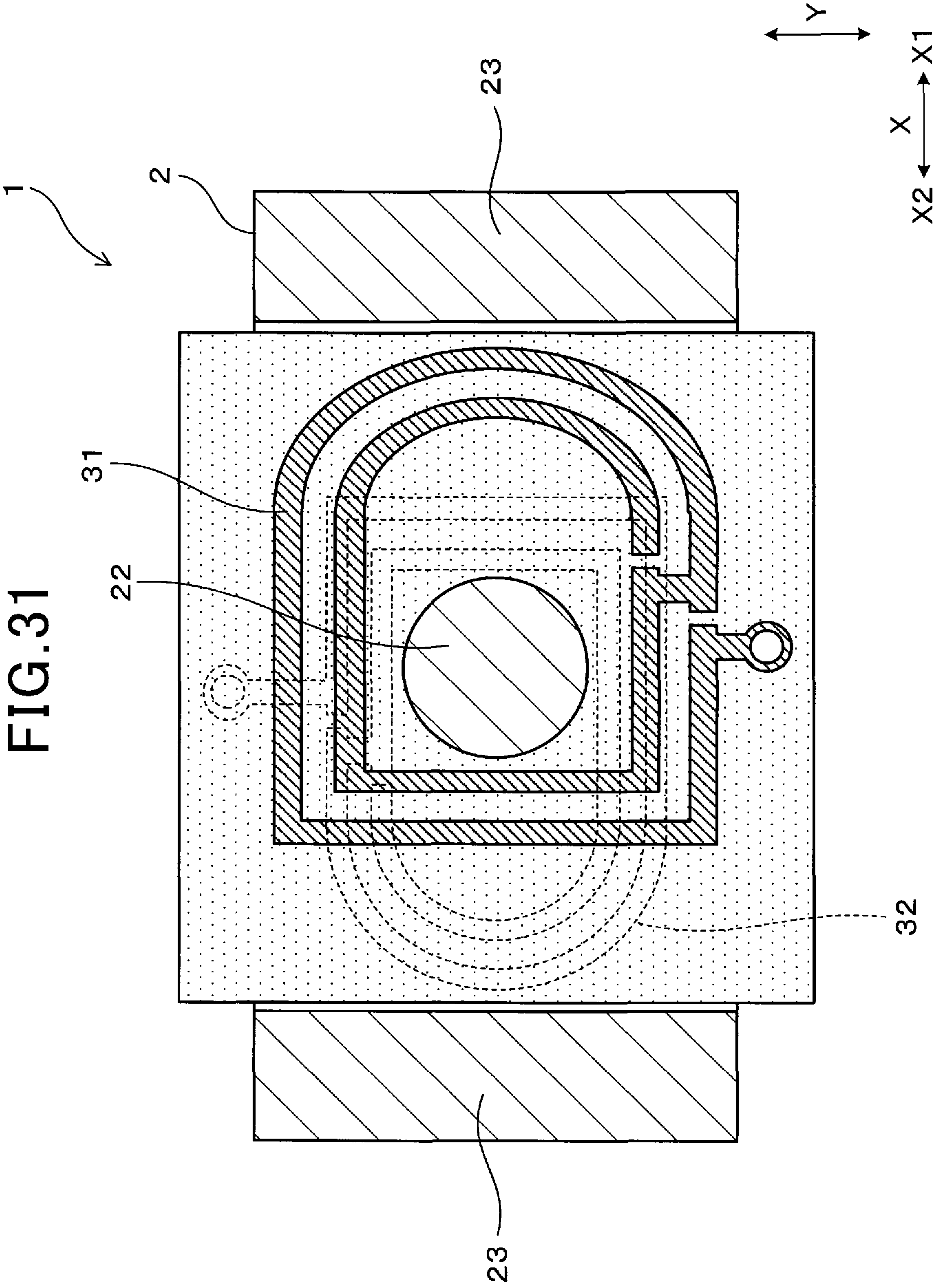
FIG. 31 is a cross-sectional view corresponding to FIG. 11 according to a fifteenth embodiment.

According to the present embodiment, as shown in FIG. 31, sizes of the outline of the first coil 31 and the second coil 32 are changed when viewed from the coil axial direction Z, while the basic configuration is similar to that of the second embodiment.

According to the present embodiment, a coil having the larger outline size when viewed from the coil axial direction X is referred to as the first coil 31. The outline size of coil (i.e. first coil, second coil) when viewed from the coil axial direction Z refers to an area of a region inside the outer periphery edge of the coil when viewed from the coil axial direction Z.

According to the present embodiment, the maximum length of the first coil 31 in the vertical direction Y is longer than that of the second coil 32. When viewed from the coil axial direction Z, both ends of the first coil 31 in the vertical direction Y protrude from the second coil 32 towards both sides in the vertical direction Y.

According to the present embodiment, the power flowing through the first coil 31 is smaller than the power flowing through the second coil 32. That is, for the first coil 31 and the second coil 32, one having smaller power value has larger outline size when viewed from the Z direction. For a coil, since the voltage applied to the coil has a correlation with the number of windings of the coil and the current flowing through the coil has a correlation with the line width of the coil, the power flowing through the coil can be evaluated based on a product between the number of windings and the line width of the coil. According to the present embodiment, effects and advantages similar to those in the second embodiment can be obtained.

According to the present embodiment, for the first coil 31 and the second coil 32, one having smaller power value has larger outline size when viewed from the Z direction. For a coil having smaller power value in the power flowing therethrough, an amount of leakage flux which can be formed therearound is likely to be smaller so that leakage flux is difficult to be secured. In this respect, a coil having smaller power value is designed such that the outline when viewed from the coil axial direction is set to be larger, whereby a coil around which a leakage flux is difficult to form can readily be isolated from other coils. Hence, portions which are unlikely to be coupled with other coils can be produced easily. Therefore, leakage flux can readily be formed around respective coils effectively. According to the present embodiment, effects and advantages similar to those in the second embodiment can be obtained.

Sixth Embodiment

Figure 32:
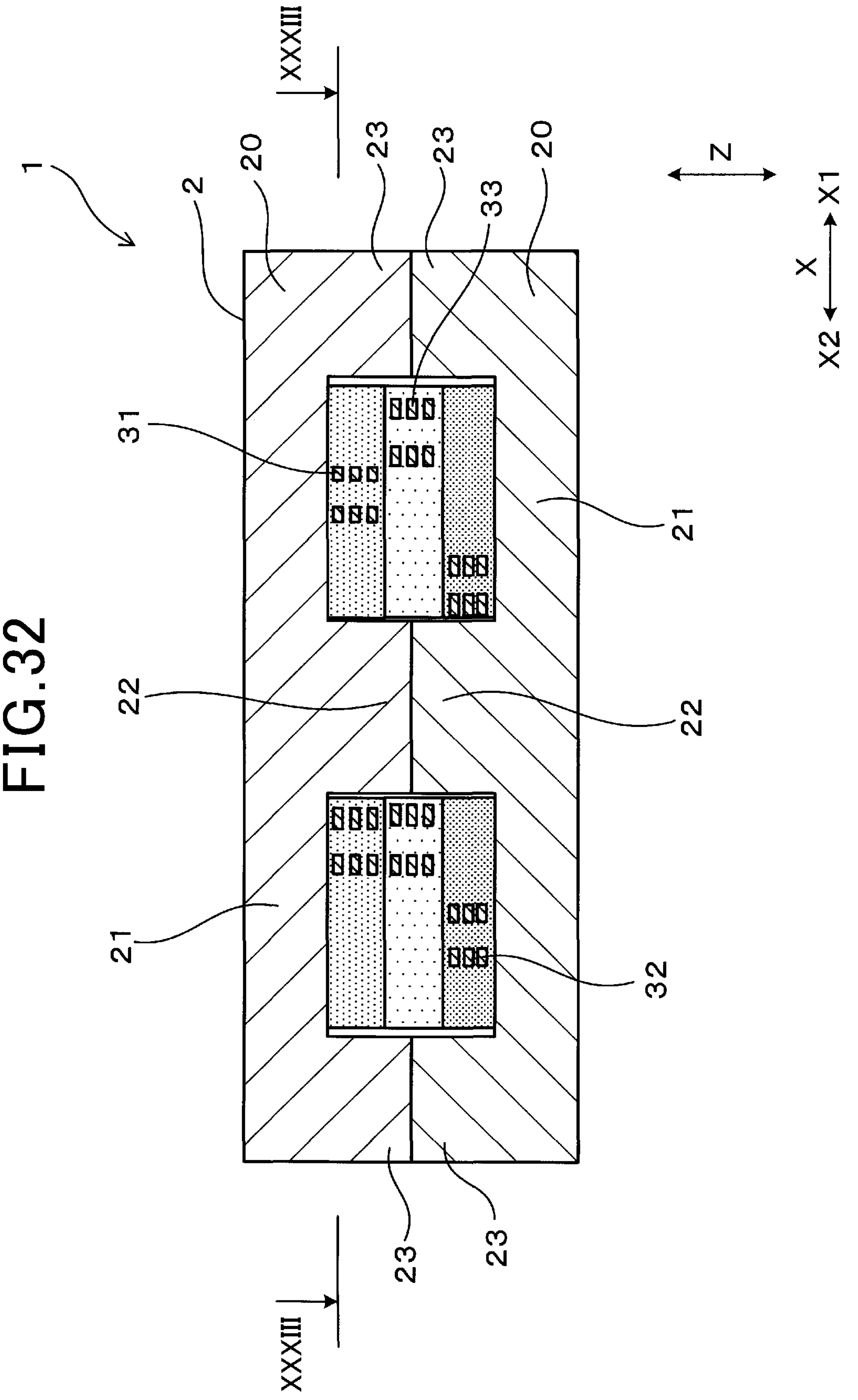
FIG. 32 is a cross-sectional view of a magnetic component disposed parallel to a coil axial direction according to a sixteenth embodiment.
Figure 33:
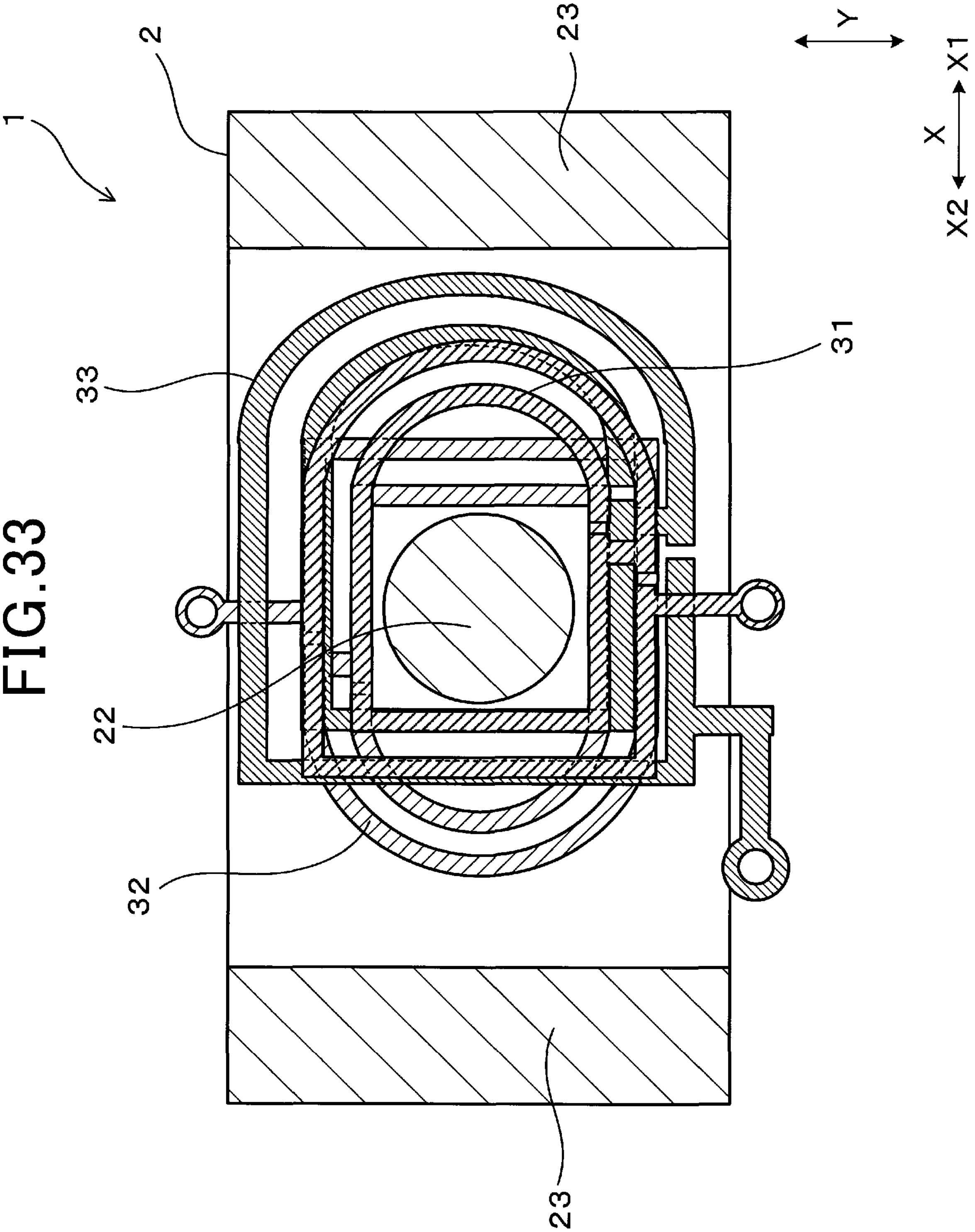
FIG. 33 is a cross-sectional view sectioned in XXXIII-XXXIII line shown in FIG. 32 showing a core, a first coil, a second coil and a third coil.
Figure 34:
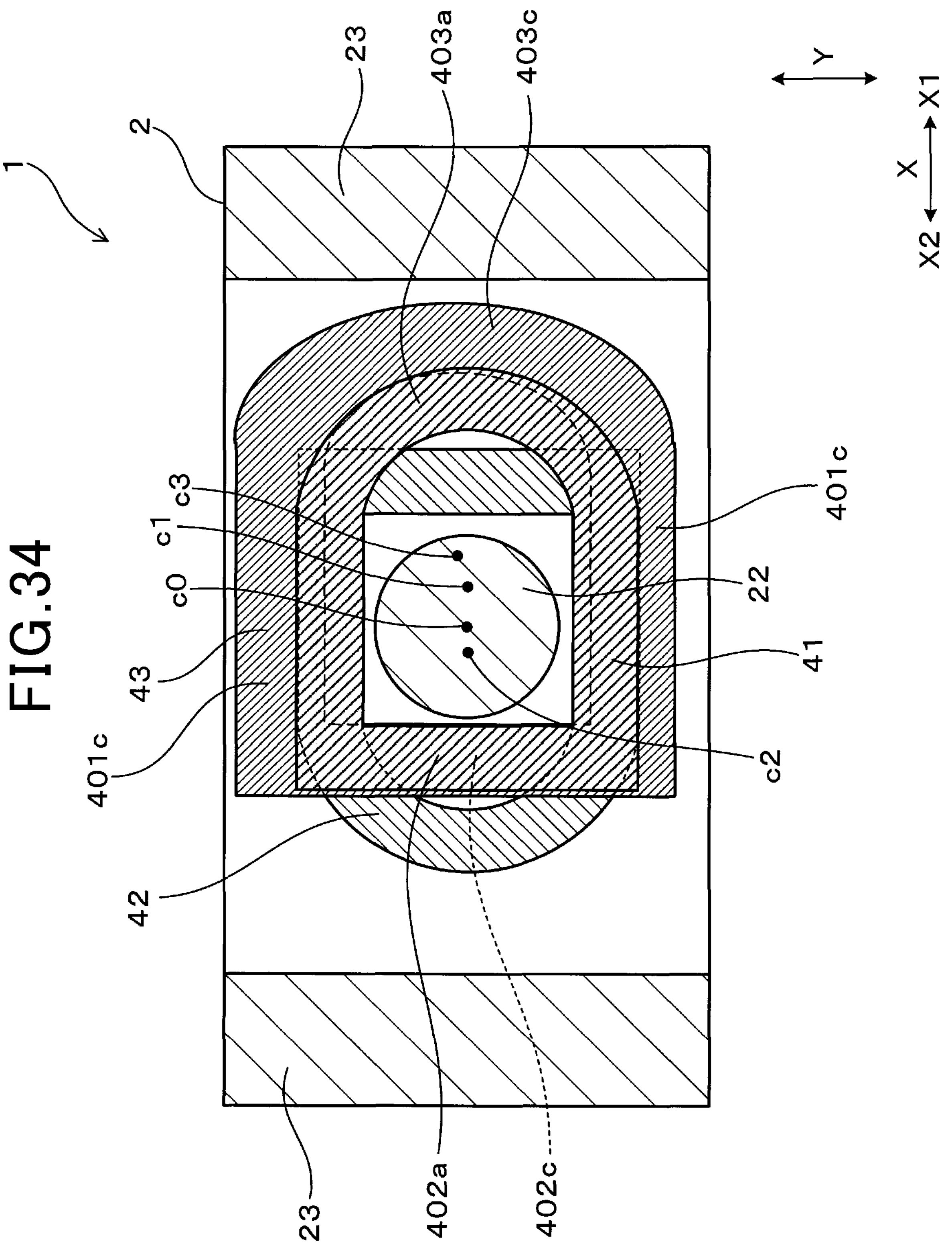
FIG. 34 is the cross-sectional view as the same as that of FIG. 33, showing a core, a first coil region, a second coil region and a third coil region.

According to the present embodiment, as shown in FIGS. 32 to 34, a third coil 33 is added to the configuration of the second embodiment. The third coil 33 is positioned to be eccentric towards a side the same as the side to which the first coil 31 is eccentric with respect to the inner leg portion 22.

As shown in FIGS. 33 and 34, the configuration of the first coil 31 and the second coil 32 are the same as that of the second embodiment, having mutually the same shape and being disposed in a state of being mutually rotated by 180 degrees in the coil circumferential direction.

The third coil 33 has the outline larger than those of the first coil 31 and the second coil 32 when viewed from the coil axial direction Z. The shape of the third coil 33 is substantially similar to that of the first coil 31. For respective name of portions in the third coil 33, the same name as those in the first coil 31 and the second coil 32 having similar configuration are used.

As shown in FIG. 32, the third coil 33 is disposed between the first coil 31 and the second coil 32 in the coil axial direction Z.

When viewed from the coil axial direction Z, a region of the third coil 33 from an inner periphery edge to an outer periphery edge in the coil radial direction is defined as a third coil region 43. As shown in FIG. 34, a pair of first linear regions 401*c* of the third coil region 43 is formed along the lateral direction X and facing with each other in the vertical direction X. The second linear region 402*c* of the third coil region 43 couples end portions in the X2 side of the pair of first linear region 401*c* straight in the vertical direction Y. Then, the protruded region 403*c* of the third coil region 43 couples the end portions in the X1 side of the pair of first linear region 401*c* and is protruded towards the X1 side.

When viewed from the coil axial direction Z, a third gravity-center c3 defined as a center of gravity of two-dimensional figure formed in the inner periphery side of the third coil 33 is provided close to the X1 side relative to the inner leg gravity-center c0. In other words, the third coil 33 is eccentric towards the X1 side with respect to the inner leg portion 22. That is, a portion where the third gravity-center c3 with respect to the inner gravity-center c0 is positioned, is the same as a portion where the first gravity-center c1 is positioned with respect to the inner leg portion c0.

When viewed from the coil axial direction Z, each of the first gravity-center c1 and the third gravity-center c3 is provided being shifted towards the X1 side with respect to the second gravity-center c2. That is, the first coil 31 and the third coil 33 are positioned to be eccentric towards X1 side relative to the second coil 32. Also, when viewed from the coil axial direction Z, the first gravity-center c1 side and the third gravity-center c3 side with respect to the inner gravity-center c0, are positioned as an opposite side of the second gravity-center c2 side with respect to the inner leg gravity-center c0.

When viewed from the coil axial direction Z, the third coil region 43 is formed protruding from both sides of the first coil region 41 and the second coil region 42 in the vertical direction Y. Also, the maximum length in the lateral direction X as the longitudinal direction of the third coil 33 is longer than the maximum length in the longitudinal direction (i.e. lateral direction X) of each of the first coil 31 and the second coil 32.

The second linear region 402*c* of the third coil region 43 is provided at a portion overlapping with the first coil region 41 and the second linear region 402*a* in the coil axial direction Z. On the other hand, the protruded region 403*c* of the third coil region 43 protrudes towards X1 side with respect to the protruded region 403*a* of the first coil region 41.

According to the present embodiment, the power flowing through the third coil 33 is smaller than the power flowing through the first coil 31 and the second coil 32. According to the present embodiment, for the plurality of coils, the smaller the power flowing through the coils, the longer the maximum length in the longitudinal direction is, when viewed from the coil axial direction Z. Also, according to the present embodiment, similar to the fifteenth embodiment, for the plurality of coils, one having smaller power value has larger outline size when viewed from the Z direction.

The third coil region 43 has a portion which is not overlapped with the second coil region 42 in the coil axial direction Z in a region from the inner periphery edge to the outer periphery edge in the coil radial direction. The third coil region 43 is a specific coil region and the third coil is a specific coil. Other configurations are the same as the second embodiment.

According to the present embodiment, for the plurality of coils, the smaller the power flowing through the coils, the longer the maximum length in the longitudinal direction is, when viewed from the coil axial direction Z. For a coil having smaller power value in the power flowing therethrough, an amount of leakage flux which can be formed therearound is likely to be smaller so that leakage flux is difficult to be secured. In this respect, a coil having smaller power value is designed such that the maximum length in the longitudinal direction when viewed from the coil axial direction is set to be longer, whereby a coil around which leakage flux is difficult to form can readily be isolated from other coils. Hence, portions which is unlikely to be coupled with other coils can be produced easily. Therefore, leakage flux can readily be formed around respective coils effectively.

Further, for the plurality of coils, since one having smaller power value has larger outline size when viewed from the Z direction, similar to the fifteenth embodiment, leakage flux can readily be formed around respective coils effectively. Thus, effects and advantages similar to those in the second embodiment can be obtained.

Seventeenth Embodiment

Figure 35:
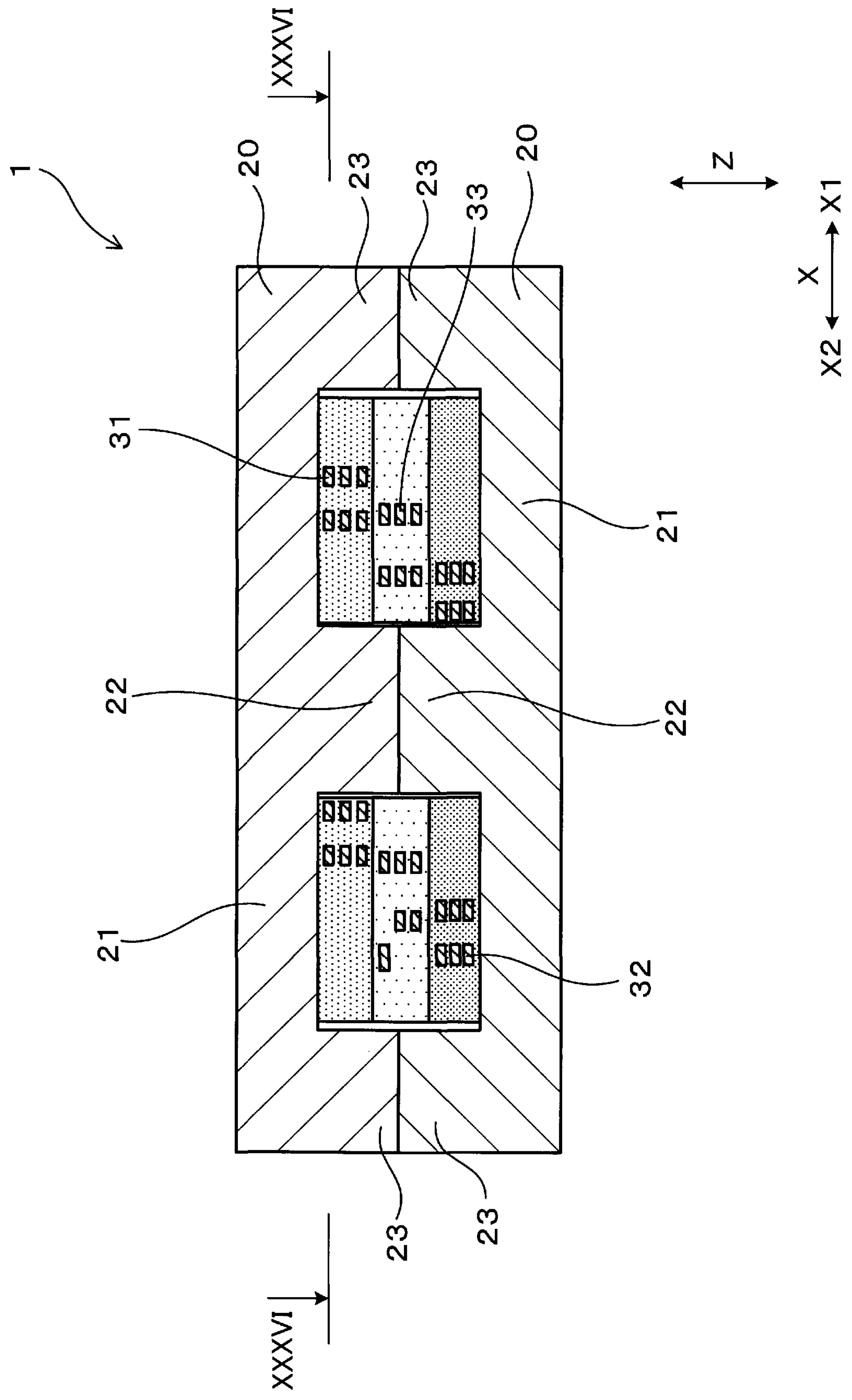
FIG. 35 is a cross-sectional view of a magnetic component disposed parallel to a coil axial direction according to a seventeenth embodiment.
Figure 36:
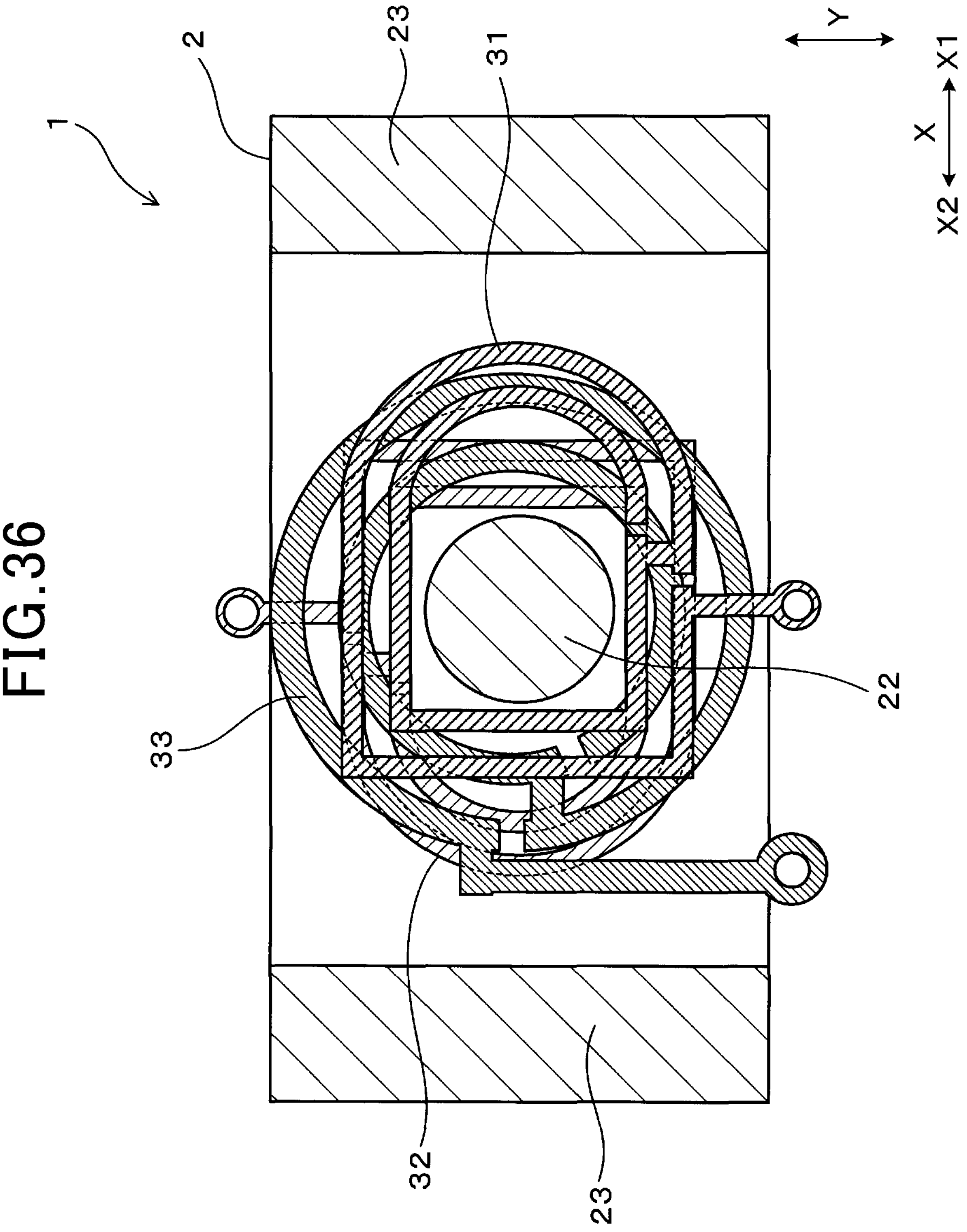
FIG. 36 is a cross-sectional view sectioned in XXXIII-XXXIII line shown in FIG. 35 showing a core, a first coil, a second coil and a third coil.
Figure 37:
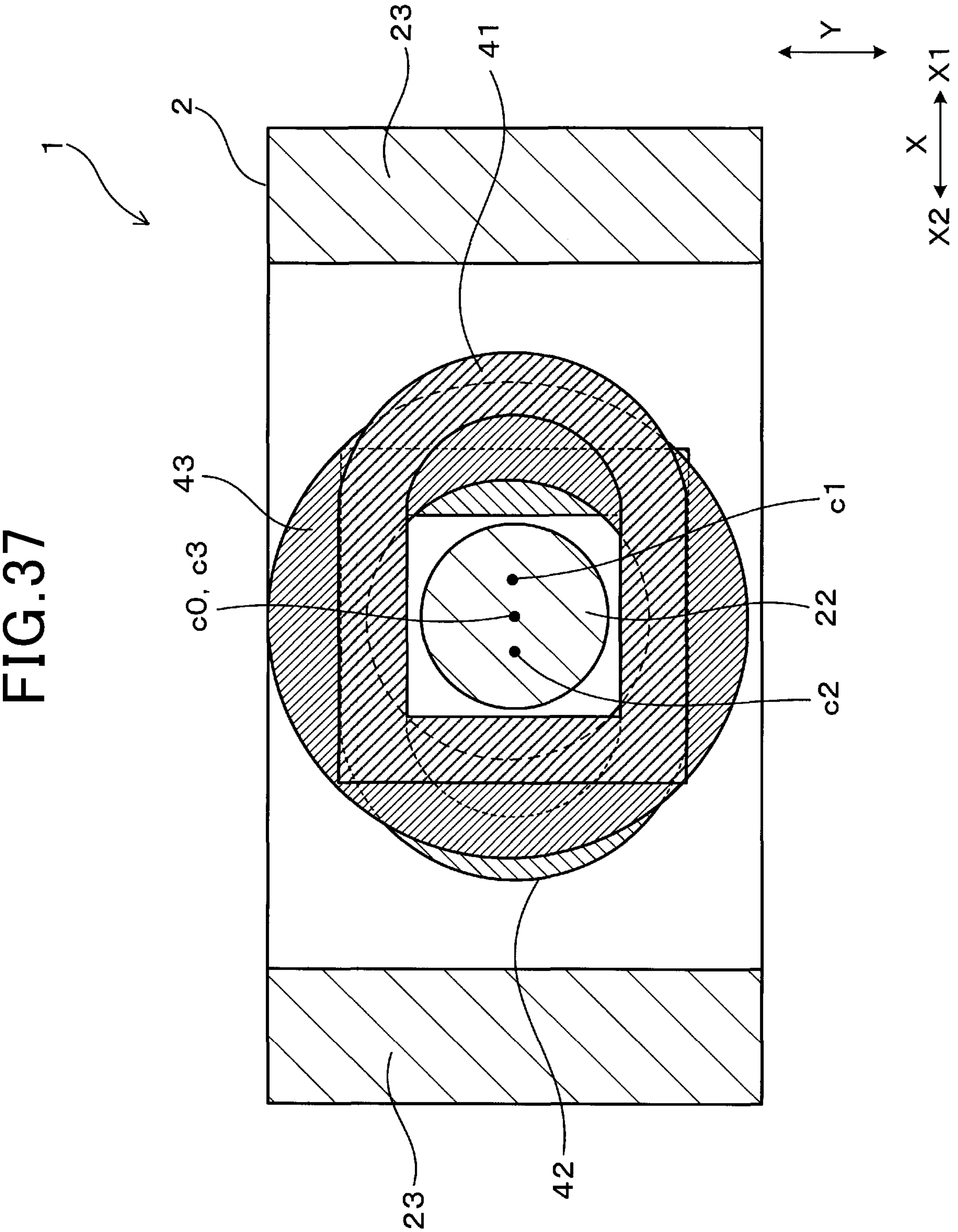
FIG. 37 is the cross-sectional view as the same as that of FIG. 36, showing a core, a first coil region, a second coil region and a third coil region.

According to the present embodiment, as shown in FIGS. 35 to 37, the third coil 33 having substantially circular shape is added to the configuration of the second embodiment. As shown in FIG. 36, the configuration of the first coil 31 and the second coil 32 are the same as that of the second embodiment, having mutually the same shape and being disposed in a state of being mutually rotated by 180 degrees in the coil circumferential direction.

The third coil 33 is a concentric coil. For the concentric coil, when viewed from the coil axial direction Z, the gravity-center of the two-dimensional figure formed in the inner periphery side thereof is provided at the same position as the inner leg gravity-center c0 is positioned. In other words, when viewed from the coil axial direction Z, the third gravity-center c3 as the gravity-center of the two-dimensional figure formed in the inner periphery side of the third coil 33 is formed at substantially the same position as the inner leg gravity-center c0 is positioned.

As shown in FIG. 35, the third coil 33 is disposed between the first coil 31 and the second coil 32 in the coil axial direction Z. When viewed from the coil axial direction Z, a region of the third coil 33 from an inner periphery edge to an outer periphery edge in the coil radial direction is defined as a third coil region 43. As shown in FIG. 37, the third coil region 43 is formed in an annular shape. When viewed from the coil axial direction Z, the third coil region 43 protrudes from the first coil region 41 and the second coil region 42 towards both sides in the vertical direction Y.

Also, when viewed from the coil axial direction Z, the maximum length of the third coil 33 in the longitudinal direction is longer than the maximum length of each of the first coil 31 and the second coil 32 in the longitudinal direction. That is, the diameter of the third coil 33 is longer than the maximum length of each of the first coil 31 and the second coil 32 in the lateral direction X.

According to the present embodiment, the power flowing through the third coil 33 is smaller than the power flowing through the first coil 31 and the second coil 32. According to the present embodiment, for the plurality of coils, the smaller the power flowing through the coils, the longer the maximum length in the longitudinal direction is, when viewed from the coil axial direction Z. Other configurations are the same as the second embodiment.

According to the present embodiment, for the third coil 33 as a concentric coil, the length in the longitudinal direction, that is, the maximum length in the radial direction, is longer than the length in the longitudinal direction of each of the first coil 31 and the second coil 32, that is longer than the maximum length in the lateral direction X. Thus, the size of the concentric coil is set to be larger, whereby at least a part of the concentric coil can readily be provided at a portion not overlapping with other coils, and leakage flux can be increased around the part of the concentric coil.

Moreover, for the plurality of coils, the smaller the power flowing through the coils, the longer the maximum length in the longitudinal direction is, when viewed from the coil axial direction Z. Therefore, similar to the sixteenth embodiment, leakage flux can readily be formed around respective coils effectively. Further, effects and advantages similar to those in the second embodiment can be obtained.

Eighteenth Embodiment

Figure 38:
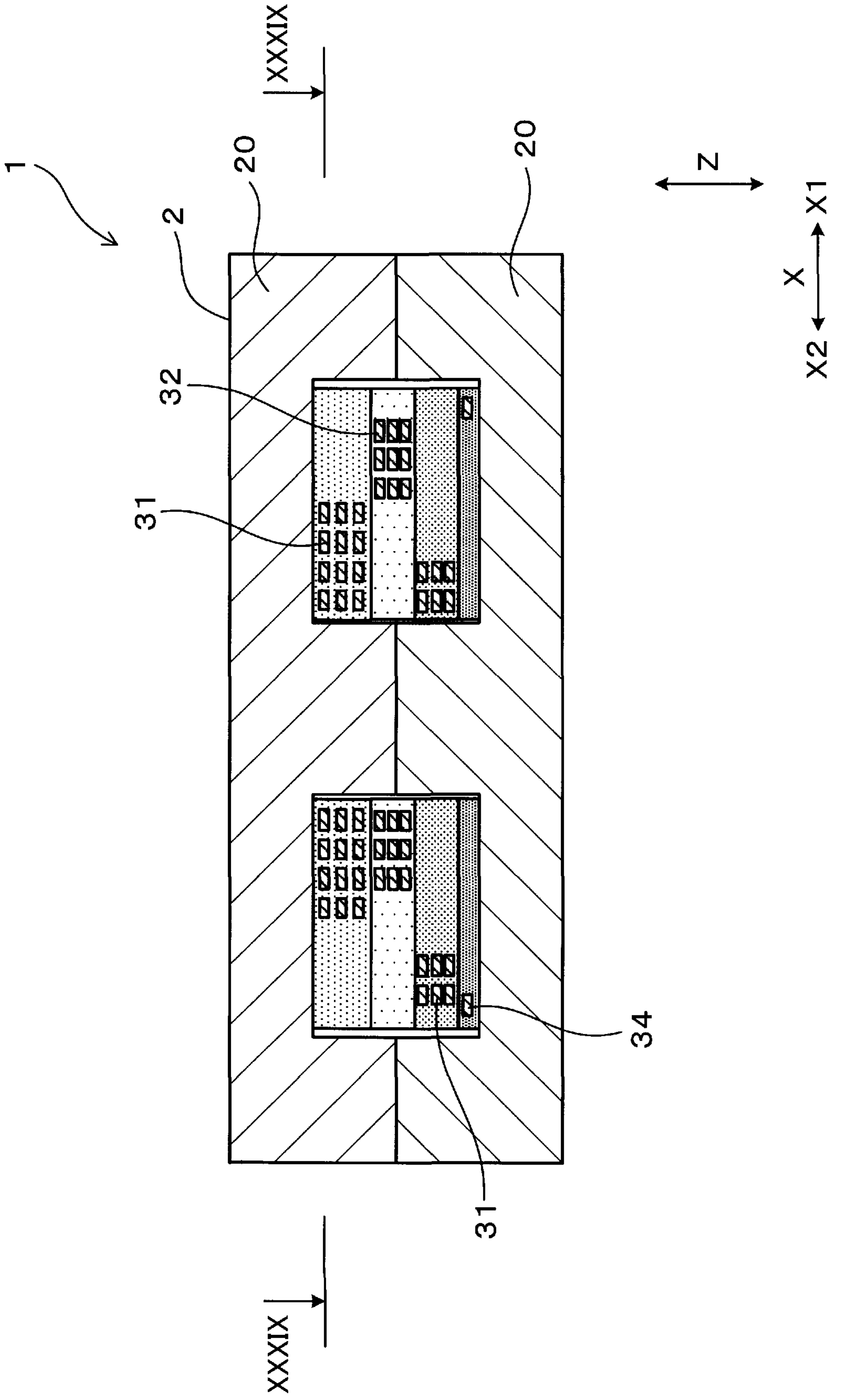
FIG. 38 is a cross-sectional view of a magnetic component disposed parallel to a coil axial direction according to an eighteenth embodiment.
Figure 39:
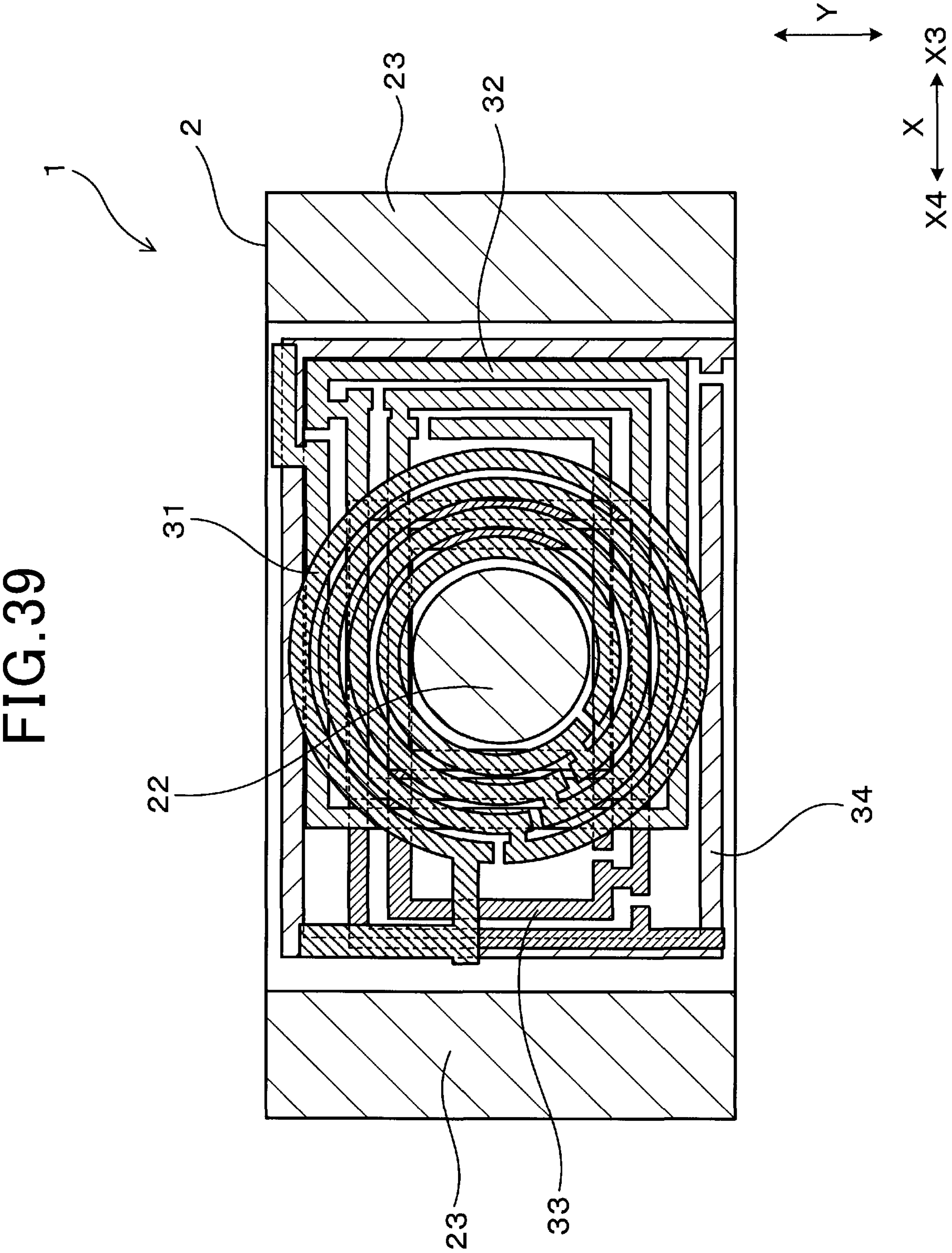
FIG. 39 is a cross-sectional view sectioned in XXXIX-XXXIX line shown in FIG. 38 showing a core, a first coil, a second coil and a fourth coil.
Figure 40:
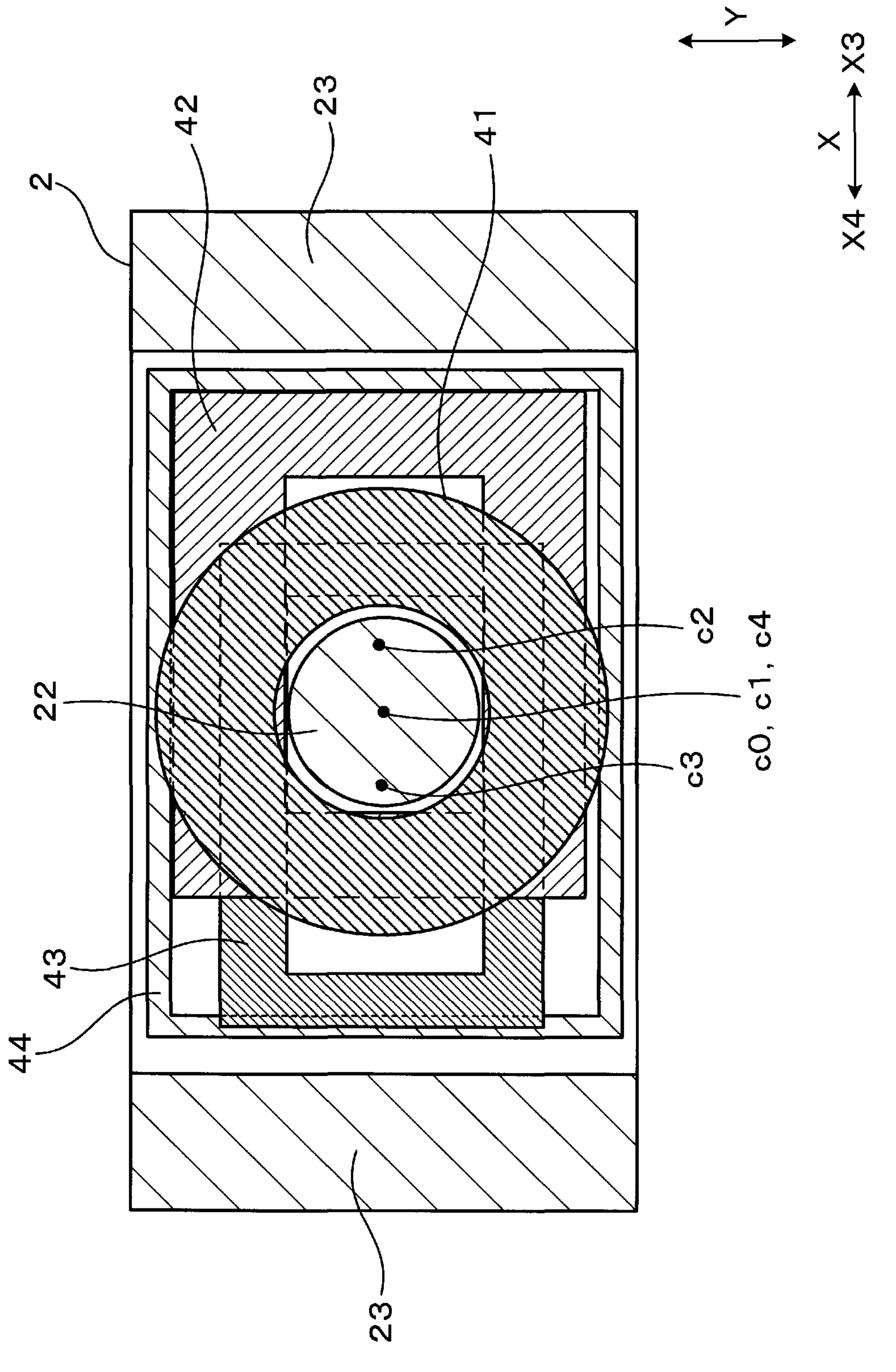
FIG. 40 is the cross-sectional view the same as that of FIG. 39, showing a core, a first coil region, a second coil region, a third coil region and a fourth coil region.

According to the present embodiment, as shown in FIGS. 38 to 40, four coils which are mutually magnetically coupled are included. The four coils are the first coil 31, the second coil 32, the third coil 33 and the fourth coil 34 in the order from onside in the coil axial direction Z.

As shown in FIG. 38, the first coil 31 is formed in three conductor layers. Also, as shown in FIG. 39, the first coil 31 is formed in a quad spiral shape in respective conductor layers. When viewed from the coil axial direction Z, a region of the first coil 31 from an inner periphery edge to an outer periphery edge in the coil radial direction is defined as a first coil region 41. At this moment, as shown in FIG. 40, the first coil region 41 is formed in an annular shape.

When viewed from the coil axial direction Z, a gravity-center of the two-dimensional figure formed in the inner periphery side of the first coil 31, where the mass per unit area of respective portions in the surface direction orthogonal to the coil axial direction Z are mutually the same, is defined as a first gravity-center c1. At this moment, when viewed from the coil axial direction Z, the first coil 31 is a concentric coil in which the first gravity center c1 is at a position same as the inner leg gravity-center c0.

As shown in FIG. 38, the second coil 32 is formed in three conductor layers. As shown in FIG. 39, the second coil 32 is formed in a triple spiral shape in respective conductor layers. When viewed from the coil axial direction Z, a region of the second coil 32 from an inner periphery edge to an outer periphery edge in the coil radial direction is defined as a second coil region 42. At this moment, as shown in FIG. 40, the second coil region 42 is formed in a rectangularly annular shape having longitudinal sides along the lateral direction X.

When viewed from the coil axial direction Z, a gravity-center of the two-dimensional figure formed in the inner periphery side of the second coil 32, where the mass per unit area of respective portions in the surface direction orthogonal to the coil axial direction Z are mutually the same, is defined as a second gravity-center c2. The second gravity-center c2 is present in the X3 side which is close to one side in the lateral direction X relative to the inner leg gravity-center c0 when viewed from the coil axial direction Z. In other words, the second coil 32 is positioned eccentrically in the X3 side relative to the inner leg portion 22. The second gravity-center c2 is present in the X3 side with respect to the first gravity-center c1.

As shown in FIG. 38, the third coil 33 is formed in three conductor layers. As shown in FIG. 39, the third coil 33 is formed in a dual spiral shape in respective conductor layers. When viewed from the coil axial direction Z, a region of the third coil 33 from an inner periphery edge to an outer periphery edge in the coil radial direction is defined as a third coil region 43. At this moment, as shown in FIG. 40, the third coil region 43 is formed in a rectangularly annular shape having longitudinal side in the lateral direction X.

When viewed from the coil axial direction Z, a gravity-center of the two-dimensional figure formed in the inner periphery side of the third coil 33, where the mass per unit area of respective portions in the surface direction orthogonal to the coil axial direction Z are mutually the same, is defined as a third gravity-center c3. The third gravity-center c3 is present in the X4 side which is an opposite side of the X3 side in the lateral direction X relative to the inner leg gravity-center c0 when viewed from the coil axial direction Z. In other words, the third coil 33 is positioned eccentrically in an opposite side (i.e. X4 side) opposite to a side (i.e. X3 side) where the first coil 31 is positioned eccentrically relative to the inner leg portion 22.

As shown in FIG. 38, the fourth coil 34 is formed in a single conductor layer. As shown in FIG. 39, in the single conductor layer, the fourth coil 34 is wound around the rectangular having longitudinal side in the lateral direction X. As shown in FIGS. 39 and 40, when viewed from the coil axial direction Z, a fourth coil region 44 which is a region from the inner periphery edge to the outer periphery edge of the fourth coil 34 equals to a region where the fourth coil 34 is formed.

When viewed from the coil axial direction Z, a gravity-center of the two-dimensional figure formed in the inner periphery side of the fourth coil 34, where the mass per unit area of respective portions in the surface direction orthogonal to the coil axial direction Z are mutually the same, is defined as a fourth gravity-center c4. At this moment, when viewed from the coil axial direction Z, the fourth coil 34 is a concentric coil in which the first gravity center c1 is at a position same as the inner leg gravity-center c0.

When viewed from the coil axial direction Z, for the fourth coil 34 as a concentric coil, the length in the longitudinal direction (i.e. outer diameter) is longer than the length in the longitudinal direction (i.e. lateral direction X) of each of the first coil 31 and the second 32.

When viewed from the coil axial direction Z, the fourth coil 34 as a concentric coil has larger outline size than that of the first coil 31 as the other concentric coil. Also, the outer diameter of the fourth coil 34 is larger than the outer diameter of the first coil 31. For the fourth coil 34, the power value is smaller than that of the first coil 31.

The first coil region 41, the second coil region 42, the third coil region 43 and the fourth coil region 44 each includes a portion not overlapping with any other coil region in a region from the inner periphery edge to the outer periphery edge in the coil radial direction. That is, each of the first coil region 41, the second coil region 42, the third coil region 43 and the fourth coil region is the specific coil region, and each of the first coil 31, the second coil 32, the third coil 33 and the fourth coil 34 is the specific coil. Other configurations are the same as those in the first embodiment.

According to the present embodiment, even in the case where a part of coil is provided to be eccentric to the inner leg portion 22 among the plurality of coils and other coils are provided not to be eccentric to the inner leg portion 22, leakage flux can readily be secured. In particular, according to the present embodiment, the fourth coil 34 has an outer diameter longer than the maximum length in the longitudinal direction of each of the second coil 32 and the third coil 33 provided to be eccentric to the inner leg portion 22. Thus, the size of the concentric coil is set to be larger, whereby at least a part of the concentric coil can readily be provided at a portion not overlapping with other coils in the coil axial direction Z, and leakage flux can be increased around the part of the concentric coil.

Further, the plurality of concentric coils have lengths in the longitudinal direction such that the smaller the power consumption, the longer the maximum length in the longitudinal direction is, when viewed from the coil axial direction. For a coil having smaller power value, an amount of leakage flux to be formed around the coil tens to be smaller, and leakage flux is unlikely to be secured. In this respect, the length in the longitudinal direction the concentric coil is set such that the smaller the power value of the concentric coil, the longer the maximum length in the longitudinal direction is, when viewed from the coil axial direction, whereby a coil where leakage flux is difficult to be formed therearound can readily be isolated from other coils. Hence, portions which is unlikely to be coupled with other coils can be produced easily. Therefore, leakage flux can readily be formed around respective coils effectively. In addition to this, effects and advantages similar to the first embodiment can be obtained.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

Figure 41:
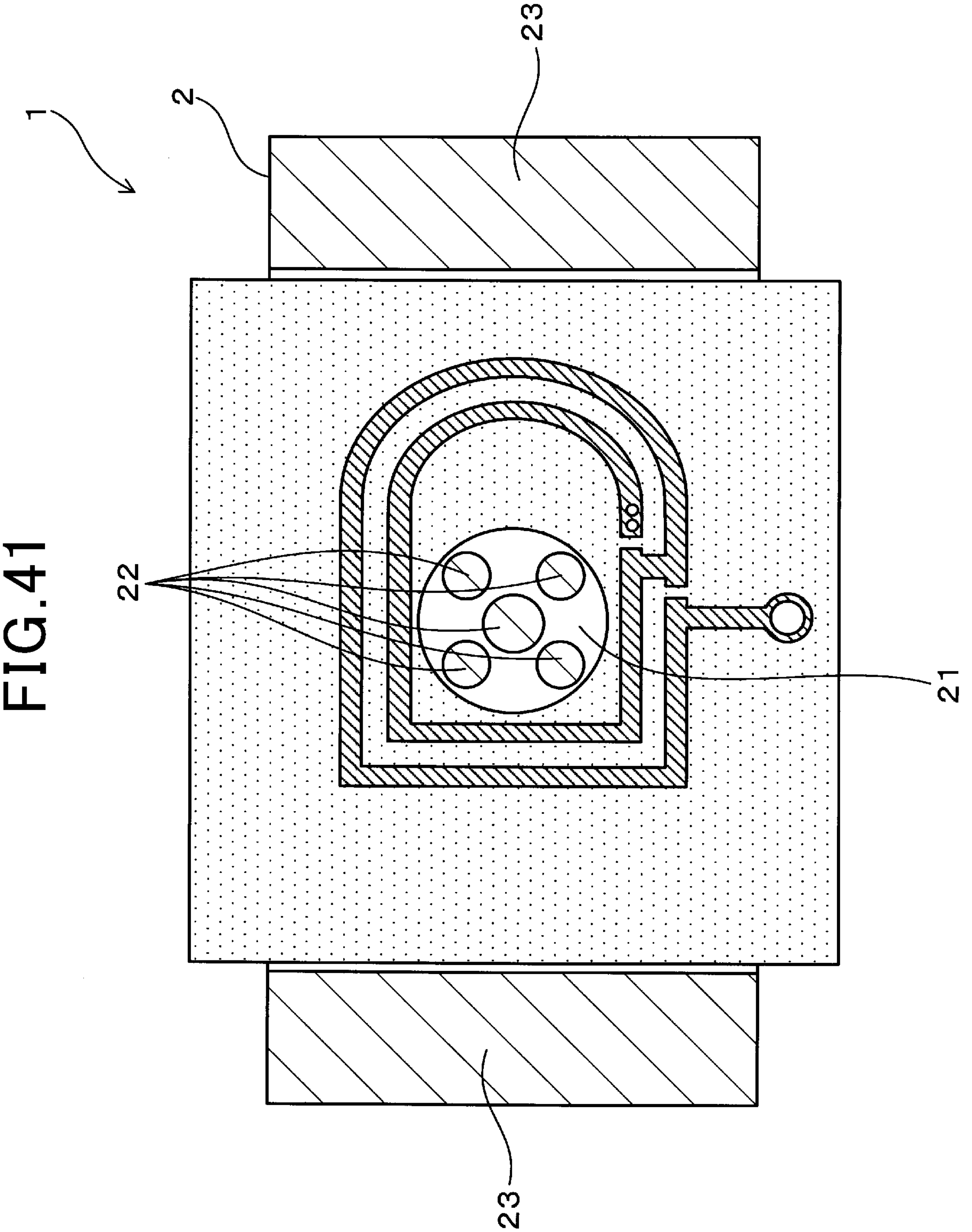
FIG. 41 is a cross-sectional view corresponding to FIG. 11 according to a modification embodiment.

For example, since the inner leg portion 22 is required to be extended from the base portion 21 and provided at inner periphery side of the plurality of coils when viewed from the coil axial direction Z, as shown in FIG. 41, the inner leg portion 22 may be configured of a plurality of columnar members extended from the base portion 21.

Further, the plurality of coils may not be eccentrically positioned with each other and may not be eccentrically positioned with respect to the inner leg portion. In this case, the plurality of coils may be configured as specific coils as long as the inner diameter and the outer diameter are mutually different.

Moreover, according to the first embodiment, the magnetic component 1 is provided between the AC power source as a voltage unit and a battery. However, the present disclosure is not limited to this configuration, but may utilize various power sources and loads. For example, batteries having various voltages thereof, a solar power source, or a load such as heaters.

As a battery, a battery having a voltage of 200 V which is used for driving a vehicle, a battery used for an auxiliary equipment of the vehicle a voltage of 7V, 12V, 38V and the like can be utilized.

The solar power source serves as a type of power supply unit for supplying power to the battery from outside the vehicle. For example, the solar power source may be configured as a solar power generator including a solar panel disposed on the ceiling of the vehicle. The solar power source may be configured as a solar power generation apparatus provided with a maximum power point tracking function (MPPT). Further, the solar power source may be configured as a solar power generation apparatus provided with PWM (pulse width control) control function.

Since the available operation condition of the solar power source is limited depending on time of day and weather and the like, the solar power source is often used together with other power sources. Hence, the solar power source is configured to be capable of connecting with a plurality of voltage units via a single magnetic component, whereby the number of components and the size can be reduced as a whole system such as vehicle power source system.

As a heater, there is a heater for heating electrical heating catalyst provided in the exhaust system in a hybrid vehicle. Also, as a heater, there is a heater for heating seats or the like or heating a battery such as high battery. Alternatively, a heater referred to as a water-heating heater for heating a cooling water of the high voltage battery can be employed.

As a load, for example, an active body control (e.g. air suspension), an electrical super charger, an engine cooling fan, air-conditioner compressor can be employed other than the heater. Note that the voltage of the load can be higher than that of the battery.

Conclusion

The present disclosure provides a magnetic component capable of achieving functions of a transformer and a reactor and a power conversion apparatus provided with the magnetic component.

One aspect of the present disclosure is a magnetic component including: a plurality of coils magnetically coupled with each other and a core forming a closed magnetic circuit, in which at least part of portions in inner periphery side regions of respective plurality of coils are arranged overlapping with each other in a coil axial direction; when viewed from the coil axial direction, at least one of the plurality of coils is defined as a specific coil, and a region of the specific coil from an inner periphery edge to an outer periphery edge thereof in a coil radial direction is defined as a specific coil region; and the specific coil region has a portion which is not overlapped with at least one coil in the coil axial direction other than the specific coil that constitutes the specific coil region, in a region from the inner periphery edge to the outer periphery edge thereof in the coil radial direction.

Another aspect of the present disclosure is a power conversion apparatus provided with the above-described magnetic component, including a plurality of voltage units and a plurality of power conversion circuits each connected to a corresponding voltage unit of the plurality of voltage units. The magnetic component includes the plurality of coils each connected to corresponding power conversion circuit of the plurality of power conversion circuits.

According to one aspect of the above-described magnetic component, the plurality of coils are magnetically connected with each other. Hence, the plurality of coils serve as a transformer. The specific coil region has a portion which is not overlapped with at least one coil in the coil axial direction other than the specific coil that constitutes the specific coil region, in a region from the inner periphery edge to the outer periphery edge thereof in the coil radial direction. Thus, magnetic flux flowing around this portion can be secured easily. Therefore, leakage inductance of the magnetic component can readily be secured and the magnetic component fulfills the function of the reactor.

As described, according to the above-described each aspect, a magnetic component capable of achieving both of a transformer and a reactor function can be provided.

What is claimed is:

1. A magnetic component comprising:

a plurality of coils magnetically coupled with each other; and a core forming a closed magnetic circuit, wherein at least part of portions in inner periphery side regions of respective plurality of coils are arranged overlapping with each other in a coil axial direction;

when viewed from the coil axial direction, at least one of the plurality of coils is defined as a specific coil, and a region of the specific coil from an inner periphery edge to an outer periphery edge thereof in a coil radial direction is defined as a specific coil region;

the specific coil region has a portion which is not overlapped with at least one coil in the coil axial direction other than the specific coil that constitutes the specific coil region, in a region from the inner periphery edge to the outer periphery edge thereof in the coil radial direction; and the plurality of coils are provided on a printed wiring board, wherein when viewed from the coil axial direction, a specific gravity-center defined as a gravity-center of a two-dimensional figure formed in the inner periphery side of the specific coil, where a mass per unit area of respective portions in a surface direction orthogonal to the coil axial direction are mutually the same, and a gravity-center of a two-dimensional figure formed in the inner periphery side of at least one coil other than the specific coil, where a mass per unit area of respective portions in the surface direction orthogonal to the coil axial direction are mutually the same, are arranged at mutually shifted positions, the core includes a pair of base portions facing with each other in the coil axial direction, an inner leg portion extending from the base portions and provided in an inner periphery side of the plurality of coils when viewed from the coil axial direction, and a pair of outer leg portions extending from the base portions and provided in both sides of the plurality of coils in a lateral direction orthogonal to the coil axial direction; and when viewed from the coil axial direction, an inner periphery edge of the specific coil includes:

a pair of first linear edges formed in an arrangement direction along which the specific gravity-center and an inner leg gravity-center are arranged, facing with each other in a direction orthogonal to the arrangement direction, the inner leg gravity-center being a gravity-center of a two-dimensional figure formed in an existing region of the inner leg portion, where mass per unit area of respective portions in a surface direction orthogonal to the coil axial direction are mutually the same;

a second linear edge that couples first end portions of the pair of first linear edges, the first end portions being in an anti-eccentric side as an inner leg gravity-center side with respect to the specific gravity-center; and a protruded edge that couples second end portions of the pair of first linear edges, the second end portion being in an eccentric side opposite to the anti-eccentric side in the arrangement direction.

2. The magnetic component according to claim 1, wherein when viewed from the coil axial direction, the specific gravity-center is present at one side in the lateral direction with respect to an inner leg portion, the inner leg portion being a gravity-center of a two-dimensional figure formed in an existing region of the inner leg portion, where mass per unit area of respective portions in a surface direction orthogonal to the coil axial direction are mutually the same.

3. The magnetic component according to claim 1, wherein the core includes a pair of base portions facing with each other in the coil axial direction, and an inner leg portion extending from the base portions and provided in an inner periphery side of the plurality of coils when viewed from the coil axial direction;

when viewed from the coil axial direction, the specific coil satisfies a relationship $r/L \geq 0.25$, where r [mm] is an amount of eccentricity defined as the shortest distance between the specific gravity-center and an inner leg gravity-center (c0) which is a gravity-center of a two-dimensional figure formed in an existing region of the inner leg portion, where mass per unit area of respective portions in a surface direction orthogonal to the coil axial direction are mutually the same; and a variable length L is defined as $L=(D1-D2)/2$ in which D1 [mm] is defined as the shortest distance between cross points where inner periphery edges thereof cross a virtual line (VL) passing through both the specific gravity-center and the inner leg gravity-center; and D2 [mm] is defined as a distance between cross points at which the outer periphery edges of the inner leg portion cross the virtual line.

4. The magnetic component according to claim 1, wherein for the plurality of coils, the smaller power flowing through the coils, the longer the maximum length in a longitudinal direction when viewed from the coil axial direction is.

5. The magnetic component according to claim 1, wherein for the plurality of coils, one having smaller power value has larger outline size when viewed from the direction.

6. The magnetic component according to claim 1, wherein the plurality of coils are provided with a concentric coil;

the core includes a pair of base portions facing with each other in the coil axial direction, and an inner leg portion extending from the base portions and provided in an inner periphery side of the plurality of coils when viewed from the coil axial direction;

when viewed from a coil axial direction, a gravity-center of a two-dimensional figure formed in an inner periphery side of the concentric coil, where mass per unit area of respective portions in a surface direction orthogonal to the coil axial direction are mutually the same, is provided at the same position as an inner leg gravity-center is positioned, the inner leg gravity-center being a gravity-center of a two-dimensional figure formed in an existing region of the inner leg portion, where mass per unit area of respective portions in a surface direction orthogonal to the coil axial direction are mutually the same.

7. The magnetic component according to claim 6, wherein the magnetic component is provided with a plurality of the concentric coils;

the plurality of concentric coils have lengths in a longitudinal direction such that the smaller a power consumption, the longer the maximum length in the longitudinal direction is, when viewed from the coil axial direction.

8. The magnetic component according to claim 1, wherein the core includes a pair of base portions facing with each other in the coil axial direction, an inner leg portion extending from the base portions and provided in an inner periphery side of the plurality of coils when viewed from the coil axial direction, and a pair of outer leg portions extending from the base portions and provided in both sides of the plurality of coils in a lateral direction orthogonal to the coil axial direction; and a flux forming portion is provided between the pair of base portions in the coil axial direction and between the pair of outer leg portions in the lateral direction X.

9. The magnetic component according to claim 8, wherein the flux forming portion is provided at a portion overlapping with at least one of the coils in the coil radial direction.

10. A power conversion apparatus comprising:

a magnetic component comprising a plurality of coils magnetically coupled with each other; and a core forming a closed magnetic circuit, wherein at least part of portions in inner periphery side regions of respective plurality of coils are arranged overlapping with each other in a coil axial direction;

when viewed from the coil axial direction, at least one of the plurality of coils is defined as a specific coil, and a region of the specific coil from an inner periphery edge to an outer periphery edge thereof in a coil radial direction is defined as a specific coil region;

the specific coil region has a portion which is not overlapped with at least one coil in the coil axial direction other than the specific coil that constitutes the specific coil region, in a region from the inner periphery edge to the outer periphery edge thereof in the coil radial direction;

a plurality of voltage units; and a plurality of power conversion circuits each connected to corresponding voltage unit of the plurality of voltage units, wherein the magnetic component includes the plurality of coils each connected to corresponding power conversion circuit of the plurality of power conversion circuits, wherein when viewed from the coil axial direction, a specific gravity-center defined as a gravity-center of a two-dimensional figure formed in the inner periphery side of the specific coil, where a mass per unit area of respective portions in a surface direction orthogonal to the coil axial direction are mutually the same, and a gravity-center of a two-dimensional figure formed in the inner periphery side of at least one coil other than the specific coil, where a mass per unit area of respective portions in the surface direction orthogonal to the coil axial direction are mutually the same, are arranged at mutually shifted positions, the core includes a pair of base portions facing with each other in the coil axial direction, an inner leg portion extending from the base portions and provided in an inner periphery side of the plurality of coils when viewed from the coil axial direction, and a pair of outer leg portions extending from the base portions and provided in both sides of the plurality of coils in a lateral direction orthogonal to the coil axial direction; and when viewed from the coil axial direction, an inner periphery edge of the specific coil includes:

a pair of first linear edges formed in an arrangement direction along which the specific gravity-center and an inner leg gravity-center are arranged, facing with each other in a direction orthogonal to the arrangement direction, the inner leg gravity-center being a gravity-center of a two-dimensional figure formed in an existing region of the inner leg portion, where mass per unit area of respective portions in a surface direction orthogonal to the coil axial direction are mutually the same;

a second linear edge that couples first end portions of the pair of first linear edges, the first end portions being in an anti-eccentric side as an inner leg gravity-center side with respect to the specific gravity-center; and a protruded edge that couples second end portions of the pair of first linear edges, the second end portion being in an eccentric side opposite to the anti-eccentric side in the arrangement direction.

* * * * *